(12) United States Patent
Kneissl et al.

(10) Patent No.: US 11,258,477 B2
(45) Date of Patent: Feb. 22, 2022

(54) SPECIFIC HOPPING PATTERNS FOR REPEATED TRANSMISSION AND RECEPTION OF DATA AND METHODS FOR GENERATING THE SAME

(71) Applicant: Fraunhofer-Gesellschaft zur Foerderung der angewandten Forschung e.V., Munich (DE)

(72) Inventors: Jakob Kneissl, Fuerth (DE); Josef Bernhard, Nabburg (DE); Gerd Kilian, Erlangen (DE); Johannes Wechsler, Spalt (DE); Raimund Meyer, Fuerth (DE); Frank Obernosterer, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 107 days.

(21) Appl. No.: 16/719,906

(22) Filed: Dec. 18, 2019

(65) Prior Publication Data
US 2020/0177233 A1    Jun. 4, 2020

Related U.S. Application Data

(63) Continuation of application No. PCT/EP2018/067891, filed on Jul. 3, 2018.

(30) Foreign Application Priority Data

Jul. 4, 2017   (DE) .................. 10 2017 211 375.8

(51) Int. Cl.
*H04B 1/7143*    (2011.01)
*H04B 1/7136*    (2011.01)
(Continued)

(52) U.S. Cl.
CPC ........... *H04B 1/7143* (2013.01); *H04B 1/715* (2013.01); *H04B 1/7136* (2013.01); *H04B 1/7156* (2013.01)

(58) Field of Classification Search
CPC .............................. H04B 1/7143; H04B 1/715
See application file for complete search history.

(56) References Cited

U.S. PATENT DOCUMENTS 5,907,545 A * 5/1999 Arai ..................... H04B 7/2621
370/342
6,212,221 B1   4/2001 Wakayama et al.
(Continued)

FOREIGN PATENT DOCUMENTS

DE            10211235 A1    10/2003
DE         102011082098 B4    3/2013
(Continued)

OTHER PUBLICATIONS

Kilian, G et al., "Improved coverage for low-power telemetry systems using telegram splitting", in Proceedings of 2013 European Conference on Smart Objects, Systems and Technologies (SmartSysTech), 2013, Jun. 11, 2013.
(Continued)

*Primary Examiner* — Zhiren Qin
(74) *Attorney, Agent, or Firm* — Perkins Coie LLP; Michael A. Glenn

(57) ABSTRACT

In embodiments, data transmitters and data receivers use, in a first mode, a first hopping pattern and a second hopping pattern for a repeated transfer of data, and, in a second mode, a third hopping pattern for the single transfer of data, wherein the hopping patterns of the first mode and the second mode are different so that a collision probability in the repeated transmission of data by a further data transmit-
(Continued)

ter in a respectively different mode may be decreased and the transmission reliability may therefore be increased.

61 Claims, 14 Drawing Sheets

(51) Int. Cl.
*H04B 1/715* (2011.01)
*H04B 1/7156* (2011.01)

(56) References Cited

U.S. PATENT DOCUMENTS

| | | | | |
|---|---|---|---|---|
| 8,797,986 | B2* | 8/2014 | Iwai | H04B 1/713 370/329 |
| 9,450,664 | B2* | 9/2016 | Jia | H04L 1/0069 |
| 2005/0176371 | A1 | 8/2005 | Palin et al. | |
| 2009/0046693 | A1 | 2/2009 | Nory et al. | |
| 2009/0086791 | A1* | 4/2009 | Bienas | H04L 5/0039 375/132 |
| 2009/0225810 | A1* | 9/2009 | Sugaya | H04L 5/003 375/132 |
| 2010/0110929 | A1 | 5/2010 | Li et al. | |
| 2012/0014330 | A1* | 1/2012 | Damnjanovic | H04L 5/003 370/329 |
| 2012/0113967 | A1* | 5/2012 | Smith | H04L 27/2613 370/338 |
| 2014/0176341 | A1 | 6/2014 | Bernhard et al. | |
| 2016/0044729 | A1 | 2/2016 | Tu et al. | |
| 2017/0214500 | A1* | 7/2017 | Hreha | H04L 5/0023 |
| 2018/0124711 | A1* | 5/2018 | Hosseini | H04W 52/146 |
| 2018/0131483 | A1* | 5/2018 | Somichetty | H04B 1/713 |
| 2019/0173522 | A1* | 6/2019 | Sun | H04W 74/0841 |
| 2019/0253101 | A1 | 8/2019 | Kilian et al. | |
| 2019/0253102 | A1 | 8/2019 | Kilian et al. | |
| 2020/0044687 | A1 | 2/2020 | Wechsler et al. | |

FOREIGN PATENT DOCUMENTS

| | | |
|---|---|---|
| DE | 102016220882 A1 | 4/2018 |
| DE | 102016220883 A1 | 4/2018 |
| DE | 102017206236 A1 | 10/2018 |
| EP | 2015465 A2 | 1/2009 |
| JP | 2012507974 A | 3/2012 |
| RU | 2481739 C2 | 5/2013 |
| WO | 2015128385 A1 | 9/2015 |
| WO | 2015182949 A1 | 12/2015 |
| WO | 2016022716 A1 | 2/2016 |
| WO | 2016192048 A1 | 12/2016 |

OTHER PUBLICATIONS

Kilian, Gerd et al., "Increasing Transmission Reliability for Telemetry Systems Using Telegram Splitting", IEEE Transactions on Communications, vol. 63, No. 3, pp. 949-961, Mar. 2015, Mar. 2015, pp. 949-961.

Lam, Alex W. et al., "Time-Hopping and Frequency-Hopping Multiple-Access Packet Communications", IEEE Transactions on Communications, IEEE Service Center, Piscataway, NJ. USA, vol. 38, No. 6, Jun. 1, 1990 (Jun. 1, 1990), pp. 875-888, XP002671768, Jun. 1, 1990, pp. 875-888.

\* cited by examiner

SPECIFIC HOPPING PATTERNS FOR REPEATED TRANSMISSION AND RECEPTION OF DATA AND METHODS FOR GENERATING THE SAME

CROSS-REFERENCES TO RELATED APPLICATIONS

This application is a continuation of copending International Application No. PCT/EP2018/067891, filed Jul. 3, 2018, which is incorporated herein by reference in its entirety, and additionally claims priority from German Application No. DE 10 2017 211 375.8, filed Jul. 4, 2017, which is incorporated herein by reference in its entirety.

BACKGROUND OF THE INVENTION

Embodiments refer to a data transmitter and a method for operating the same. Further embodiments refer to a data receiver and a method for operating the same. Further embodiments refer to generating specific hopping patterns for a repeated transmission of data. Further embodiments refer to repeatedly transmitting and receiving data using specific hopping patterns. Some embodiments refer to an optimization process for generating hopping patterns to be used in interleaved repetitions.

The telegram splitting method is known from DE 10 2011 082 098 B4, according to which a telegram (or data packet) is divided onto a plurality of sub-data packets that are transferred distributed in time and optionally in frequency using a hopping pattern.

WO 2015/128385 A1 describes a data transmission array comprising an energy-harvesting element as an energy source. In this case, the data transmission array is configured to transmit data using the telegram splitting method, wherein a partial packet to be transmitted is either transmitted, buffered and transmitted at a later time, or discarded in dependence on an amount of electrical energy provided by the energy supply unit.

The publication [G. Kilian, H. Petkov, R. Psiuk, H. Lieske, F. Beer, J. Robert, and A. Heuberger, "Improved coverage for low-power telemetry systems using telegram splitting," in Proceedings of 2013 European Conference on Smart Objects, Systems and Technologies (SmartSysTech), 2013] describes an improved range for low-energy telemetric systems which use the telegram splitting method.

The publication [G. Kilian, M. Breiling, H. H. Petkov, H. Lieske, F. Beer, J. Robert, and A. Heuberger, "Increasing Transmission Reliability for Telemetry Systems Using Telegram Splitting," IEEE Transactions on Communications, vol. 63, no. 3, pp. 949-961, March 2015] describes an improved transfer reliability of low-energy telemetric systems which use the telegram splitting method.

The telegram splitting method uses specific time hopping patterns/frequency hopping patterns in order to transfer data via the radio channel. In order to be able to successfully decode a data packet, the hopping pattern used for the transmission has to be known at the receiver. In order to ensure this, global time hopping patterns and frequency hopping patterns known to all participants are defined for telegram splitting networks.

The communication of several participants by means of telegram splitting in the same band results in a deteriorated interference immunity of the transfer if the same time hopping pattern and/or frequency hopping pattern is used for the data transfer of several nodes. If two nodes start a transfer with the same hopping pattern within a short time window (e.g. the duration of a sub-data packet), all sub-data packets of the telegram overlap and, in the worst case, cancel each other out.

SUMMARY

An embodiment may have a data transmitter configured to, in a first mode, transmit data repeatedly using a first hopping pattern and a second hopping pattern; wherein the data transmitter is configured to, in a second mode, transmit data once using a third hopping pattern; wherein the hopping patterns of the first mode and the second mode are different so that hops of the hopping patterns of the first mode and hops of the hopping pattern of the second mode are differently distributed in time and/in frequency; wherein the data transmitter is configured to select the first hopping pattern and the second hopping pattern from a first set of hopping patterns, and to select the third hopping pattern from a second set of hopping patterns; wherein hopping patterns of the first set of hopping patterns and hopping patterns of the second set of hopping patterns are different.

Another embodiment may have a data receiver configured to, in a first mode, receive data repeatedly using a first hopping pattern and a second hopping pattern; wherein the data receiver is configured to, in a second mode, receive data once using a third hopping pattern; wherein the hopping patterns of the first mode and the second mode are different so that hops of the hopping patterns of the first mode and hops of the hopping pattern of the second mode are differently distributed in time and/in frequency; wherein the data receiver is configured to select the first hopping pattern and the second hopping pattern from a first set of hopping patterns, and to select the third hopping pattern from a second set of hopping patterns; wherein hopping patterns of the first set of hopping patterns and hopping patterns of the second set of hopping patterns are different.

According to another embodiment, a system may have a data transmitter configured to, in a first mode, transmit data repeatedly using a first hopping pattern and a second hopping pattern; wherein the data transmitter is configured to, in a second mode, transmit data once using a third hopping pattern; wherein the hopping patterns of the first mode and the second mode are different so that hops of the hopping patterns of the first mode and hops of the hopping pattern of the second mode are differently distributed in time and/in frequency; wherein the data transmitter is configured to select the first hopping pattern and the second hopping pattern from a first set of hopping patterns, and to select the third hopping pattern from a second set of hopping patterns; wherein hopping patterns of the first set of hopping patterns and hopping patterns of the second set of hopping patterns are different; and a data receiver configured to, in a first mode, receive data repeatedly using a first hopping pattern and a second hopping pattern; wherein the data receiver is configured to, in a second mode, receive data once using a third hopping pattern; wherein the hopping patterns of the first mode and the second mode are different so that hops of the hopping patterns of the first mode and hops of the hopping pattern of the second mode are differently distributed in time and/in frequency; wherein the data receiver is configured to select the first hopping pattern and the second hopping pattern from a first set of hopping patterns, and to select the third hopping pattern from a second set of hopping patterns; wherein hopping patterns of the first set of hopping patterns and hopping patterns of the second set of hopping patterns are different.

According to another embodiment, a method for transmitting data may have the steps of: transmitting, in a first mode, data repeatedly using a first hopping pattern and a second hopping pattern; transmitting, in a second mode, data once using a third hopping pattern; wherein the hopping patterns of the first mode and the second mode are different so that hops of the hopping patterns of the first mode and hops of the hopping pattern of the second mode are differently distributed in time and/or frequency, wherein the first hopping pattern and the second hopping pattern are selected from a first set of hopping patterns, and wherein the third hopping pattern is selected from a second set of hopping patterns, wherein hopping patterns of the first set of hopping patterns and hopping patterns of the second set of hopping patterns are different.

According to another embodiment, a method for receiving data may have the steps of: receiving, in a first mode, data repeatedly using a first hopping pattern and a second hopping pattern; receiving, in a second mode, data once using a third hopping pattern; wherein the hopping patterns of the first mode and the second mode are different so that hops of the hopping patterns of the first mode and hops of the hopping pattern of the second mode are differently distributed in time and/or frequency, wherein the first hopping pattern and the second hopping pattern are selected from a first set of hopping patterns, and wherein the third hopping pattern is selected from a second set of hopping patterns, wherein hopping patterns of the first set of hopping patterns and hopping patterns of the second set of hopping patterns are different.

Another embodiment may have a non-transitory digital storage medium having a computer program stored thereon to perform the method for transmitting data having the steps of: transmitting, in a first mode, data repeatedly using a first hopping pattern and a second hopping pattern; transmitting, in a second mode, data once using a third hopping pattern; wherein the hopping patterns of the first mode and the second mode are different so that hops of the hopping patterns of the first mode and hops of the hopping pattern of the second mode are differently distributed in time and/or frequency, wherein the first hopping pattern and the second hopping pattern are selected from a first set of hopping patterns, and wherein the third hopping pattern is selected from a second set of hopping patterns, wherein hopping patterns of the first set of hopping patterns and hopping patterns of the second set of hopping patterns are different, when said computer program is run by a computer.

Another embodiment may have a non-transitory digital storage medium having a computer program stored thereon to perform the method for receiving data having the steps of: receiving, in a first mode, data repeatedly using a first hopping pattern and a second hopping pattern; receiving, in a second mode, data once using a third hopping pattern; wherein the hopping patterns of the first mode and the second mode are different so that hops of the hopping patterns of the first mode and hops of the hopping pattern of the second mode are differently distributed in time and/or frequency, wherein the first hopping pattern and the second hopping pattern are selected from a first set of hopping patterns, and wherein the third hopping pattern is selected from a second set of hopping patterns, wherein hopping patterns of the first set of hopping patterns and hopping patterns of the second set of hopping patterns are different, when said computer program is run by a computer.

According to another embodiment, a method for generating a first set of hopping patterns and a second set of hopping patterns may have the steps of: randomly generating a plurality of hopping patterns for the first set of hopping patterns and a plurality of hopping patterns for the second set of hopping patterns, wherein the hopping patterns have at least two hops that are distributed in time and frequency, wherein the hopping patterns for the first set of hopping patterns and the hopping patterns for the second set of hopping patterns are different; selecting, from the plurality of hopping patterns for the first set of hopping patterns, the hopping patterns whose autocorrelation functions have preset autocorrelation characteristics in order to acquire hopping patterns with preset autocorrelation characteristics for the first set of hopping patterns, and selecting, from the plurality of hopping patterns for the second set of hopping patterns, the hopping patterns whose autocorrelation functions have preset autocorrelation characteristics in order to acquire hopping patterns with preset autocorrelation properties for the second set of hopping patterns; calculating cross-correlation functions between the hopping patterns with preset autocorrelation characteristics for the first set of hopping patterns and cross-correlation functions between the hopping patterns with preset autocorrelation characteristics for the second set of hopping patterns; and selecting, from the hopping patterns with preset autocorrelation characteristics for the first set of hopping patterns, the hopping patterns whose cross-correlation functions have preset cross-correlation characteristics in order to acquire hopping patterns with preset autocorrelation characteristics and preset cross-correlation characteristics for the first set of hopping patterns, and, selecting, from the hopping patterns with preset autocorrelation characteristics for the second set of hopping patterns, the hopping patterns whose cross-correlation functions have preset cross-correlation characteristics in order to acquire hopping patterns with preset autocorrelation characteristics and preset cross-correlation characteristics for the second set of hopping patterns; wherein, in calculating cross-correlation functions, cross-correlation functions between the hopping patterns for the first set of hopping patterns and the second hopping patterns are also calculated; wherein, in selecting the hopping patterns, only the hopping patterns for the first set of hopping patterns and/or the second set of hopping patterns whose cross-correlation functions between the hopping patterns for the first set of hopping patterns and the second set of hopping patterns also have preset cross-correlation characteristics are selected; wherein the first set of hopping patterns is used for a repeated transfer of data to a data receiver, wherein the second set of hopping patterns is used for a non-repeated transfer of data to the data receiver.

Another embodiment may have transmitting data using a first hopping pattern and a second hopping pattern; wherein the data is transmitted using the first hopping pattern, and wherein the data is transmitted repeatedly using the second hopping pattern; wherein the first hopping pattern and the second hopping pattern are a time hopping pattern, a frequency hopping pattern or a combination of the time hopping pattern and the frequency hopping pattern, respectively; wherein the time hopping pattern is one of the following eight time hopping patterns having 24 hops each:

| | # of sub-data packets in the core frame SC | | | | | | | | | | | | | | | | | | | | | | |
|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 373 | 319 | 545 | 373 | 319 | 443 | 373 | 319 | 349 | 373 | 319 | 454 | 373 | 319 | 578 | 373 | 319 | 436 | 373 | 319 | 398 | 373 | 319 |
| 2 | 373 | 319 | 371 | 373 | 319 | 410 | 373 | 319 | 363 | 373 | 319 | 354 | 373 | 319 | 379 | 373 | 319 | 657 | 373 | 319 | 376 | 373 | 319 |
| 3 | 373 | 319 | 414 | 373 | 319 | 502 | 373 | 319 | 433 | 373 | 319 | 540 | 373 | 319 | 428 | 373 | 319 | 467 | 373 | 319 | 409 | 373 | 319 |
| 4 | 373 | 319 | 396 | 373 | 319 | 516 | 373 | 319 | 631 | 373 | 319 | 471 | 373 | 319 | 457 | 373 | 319 | 416 | 373 | 319 | 354 | 373 | 319 |
| 5 | 373 | 319 | 655 | 373 | 319 | 416 | 373 | 319 | 367 | 373 | 319 | 400 | 373 | 319 | 415 | 373 | 319 | 342 | 373 | 319 | 560 | 373 | 319 |
| 6 | 373 | 319 | 370 | 373 | 319 | 451 | 373 | 319 | 465 | 373 | 319 | 593 | 373 | 319 | 545 | 373 | 319 | 380 | 373 | 319 | 365 | 373 | 319 |
| 7 | 373 | 319 | 393 | 373 | 319 | 374 | 373 | 319 | 344 | 373 | 319 | 353 | 373 | 319 | 620 | 373 | 319 | 503 | 373 | 319 | 546 | 373 | 319 |
| 8 | 373 | 319 | 367 | 373 | 319 | 346 | 373 | 319 | 584 | 373 | 319 | 579 | 373 | 319 | 519 | 373 | 319 | 351 | 373 | 319 | 486 | 373 | 319 | wherein each line in the table is a time hopping pattern, wherein each column in the table is a hop of the respective time hopping pattern starting from a second hop so that each time hopping pattern has 24 hops, wherein each cell in the table indicates a time interval of a reference point of the respective hop to a same reference point of an immediately subsequent hop in—multiples of—symbol durations; wherein the frequency hopping pattern is one of the following eight frequency hopping patterns having 24 hops each:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 4 | 20 | 12 | 0 | 16 | 8 | 3 | 19 | 11 | 5 | 21 | 13 | 1 | 17 | 9 | 7 | 23 | 15 | 2 | 18 | 10 | 6 | 22 | 14 |
| 2 | 3 | 19 | 11 | 7 | 23 | 15 | 2 | 18 | 10 | 5 | 21 | 13 | 4 | 20 | 12 | 0 | 16 | 8 | 1 | 17 | 9 | 6 | 22 | 14 |
| 3 | 6 | 22 | 14 | 0 | 16 | 8 | 1 | 17 | 9 | 4 | 20 | 12 | 3 | 19 | 11 | 5 | 21 | 13 | 2 | 18 | 10 | 7 | 23 | 15 |
| 4 | 3 | 19 | 11 | 1 | 17 | 9 | 4 | 20 | 12 | 5 | 21 | 13 | 2 | 18 | 10 | 7 | 23 | 15 | 6 | 22 | 14 | 0 | 16 | 8 |
| 5 | 5 | 21 | 13 | 2 | 18 | 10 | 0 | 16 | 8 | 6 | 22 | 14 | 7 | 23 | 15 | 1 | 17 | 9 | 4 | 20 | 12 | 3 | 19 | 11 |
| 6 | 1 | 17 | 9 | 3 | 19 | 11 | 4 | 20 | 12 | 6 | 22 | 14 | 7 | 23 | 15 | 5 | 21 | 13 | 2 | 18 | 10 | 0 | 16 | 8 |
| 7 | 5 | 21 | 13 | 1 | 17 | 9 | 2 | 18 | 10 | 4 | 20 | 12 | 3 | 19 | 11 | 0 | 16 | 8 | 6 | 22 | 14 | 7 | 23 | 15 |
| 8 | 3 | 19 | 11 | 6 | 22 | 14 | 5 | 21 | 13 | 1 | 17 | 9 | 7 | 23 | 15 | 2 | 18 | 10 | 0 | 16 | 8 | 4 | 20 | 12 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_23.

Another embodiment may have receiving data using a first time hopping pattern and a second time hopping pattern; wherein the data is received using the first hopping pattern, and wherein the data is received repeatedly using the second hopping pattern; wherein the first hopping pattern and the second hopping pattern are a time hopping pattern, a frequency hopping pattern or a combination of the time hopping pattern and the frequency hopping pattern, respectively; wherein the time hopping pattern is one of the following eight time hopping patterns having 24 hops each:

| | # of sub-data packets in the core frame SC | | | | | | | | | | | | | | | | | | | | | | |
|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 373 | 319 | 545 | 373 | 319 | 443 | 373 | 319 | 349 | 373 | 319 | 454 | 373 | 319 | 578 | 373 | 319 | 436 | 373 | 319 | 398 | 373 | 319 |
| 2 | 373 | 319 | 371 | 373 | 319 | 410 | 373 | 319 | 363 | 373 | 319 | 354 | 373 | 319 | 379 | 373 | 319 | 657 | 373 | 319 | 376 | 373 | 319 |
| 3 | 373 | 319 | 414 | 373 | 319 | 502 | 373 | 319 | 433 | 373 | 319 | 540 | 373 | 319 | 428 | 373 | 319 | 467 | 373 | 319 | 409 | 373 | 319 |
| 4 | 373 | 319 | 396 | 373 | 319 | 516 | 373 | 319 | 631 | 373 | 319 | 471 | 373 | 319 | 457 | 373 | 319 | 416 | 373 | 319 | 354 | 373 | 319 |
| 5 | 373 | 319 | 655 | 373 | 319 | 416 | 373 | 319 | 367 | 373 | 319 | 400 | 373 | 319 | 415 | 373 | 319 | 342 | 373 | 319 | 560 | 373 | 319 |
| 6 | 373 | 319 | 370 | 373 | 319 | 451 | 373 | 319 | 465 | 373 | 319 | 593 | 373 | 319 | 545 | 373 | 319 | 380 | 373 | 319 | 365 | 373 | 319 |
| 7 | 373 | 319 | 393 | 373 | 319 | 374 | 373 | 319 | 344 | 373 | 319 | 353 | 373 | 319 | 620 | 373 | 319 | 503 | 373 | 319 | 546 | 373 | 319 |
| 8 | 373 | 319 | 367 | 373 | 319 | 346 | 373 | 319 | 584 | 373 | 319 | 579 | 373 | 319 | 519 | 373 | 319 | 351 | 373 | 319 | 486 | 373 | 319 | wherein each line in the table is a time hopping pattern, wherein each column in the table is a hop of the respective time hopping pattern starting from a second hop so that each time hopping pattern has 24 hops, wherein each cell in the table indicates a time interval of a reference point of the respective hop to a same reference point of an immediately subsequent hop in—multiples of—symbol durations; wherein the frequency hopping pattern is one of the following eight frequency hopping patterns having 24 hops each:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 4 | 20 | 12 | 0 | 16 | 8 | 3 | 19 | 11 | 5 | 21 | 13 | 1 | 17 | 9 | 7 | 23 | 15 | 2 | 18 | 10 | 6 | 22 | 14 |
| 2 | 3 | 19 | 11 | 7 | 23 | 15 | 2 | 18 | 10 | 5 | 21 | 13 | 4 | 20 | 12 | 0 | 16 | 8 | 1 | 17 | 9 | 6 | 22 | 14 |
| 3 | 6 | 22 | 14 | 0 | 16 | 8 | 1 | 17 | 9 | 4 | 20 | 12 | 3 | 19 | 11 | 5 | 21 | 13 | 2 | 18 | 10 | 7 | 23 | 15 |
| 4 | 3 | 19 | 11 | 1 | 17 | 9 | 4 | 20 | 12 | 5 | 21 | 13 | 2 | 18 | 10 | 7 | 23 | 15 | 6 | 22 | 14 | 0 | 16 | 8 |
| 5 | 5 | 21 | 13 | 2 | 18 | 10 | 0 | 16 | 8 | 6 | 22 | 14 | 7 | 23 | 15 | 1 | 17 | 9 | 4 | 20 | 12 | 3 | 19 | 11 |
| 6 | 1 | 17 | 9 | 3 | 19 | 11 | 4 | 20 | 12 | 6 | 22 | 14 | 7 | 23 | 15 | 5 | 21 | 13 | 2 | 18 | 10 | 0 | 16 | 8 |
| 7 | 5 | 21 | 13 | 1 | 17 | 9 | 2 | 18 | 10 | 4 | 20 | 12 | 3 | 19 | 11 | 0 | 16 | 8 | 6 | 22 | 14 | 7 | 23 | 15 |
| 8 | 3 | 19 | 11 | 6 | 22 | 14 | 5 | 21 | 13 | 1 | 17 | 9 | 7 | 23 | 15 | 2 | 18 | 10 | 0 | 16 | 8 | 4 | 20 | 12 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_C23.

Another embodiment may have a data receiver configured to, in a first mode, receive data repeatedly using a first hopping pattern and a second hopping pattern; wherein the data receiver is configured to, in a second mode, receive data once using a third hopping pattern; wherein the hopping patterns of the first mode and the second mode are different, wherein the data receiver 8110) is configured to detect one of the first hopping pattern and of the second hopping pattern in a reception data stream in order to receive the data transferred with the one hopping pattern; wherein the data receiver is configured to determine the other one of the first hopping pattern and the second hopping pattern in the reception data stream using the previously detected hopping pattern in order to receive the data transferred with the other hopping pattern.

Another embodiment may have a data receiver configured to, in a first mode, receive data repeatedly using a first hopping pattern and a second hopping pattern; wherein the data receiver is configured to, in a second mode, receive data once using a third hopping pattern; wherein the data receiver is configured to detect a repeated transfer of data based on the first hopping pattern and/or the second hopping pattern; or wherein the data receiver is configured to detect a single transfer of data based on the third hopping pattern.

Another embodiment may have a data transmitter configured to, in a first mode, transmit data repeatedly using a first hopping pattern and a second hopping pattern; wherein the data transmitter is configured to, in a second mode, transmit data once using a third hopping pattern; wherein the hopping patterns of the first mode and the second mode are different so that hops of the hopping patterns of the first mode and hops of the hopping pattern of the second mode are differently distributed in time and/in frequency; wherein the first hopping pattern and the second hopping pattern are shifted relative to each other in frequency and/or time, and wherein the first hopping pattern and the second hopping pattern are at least partially interleaved.

Another embodiment may have a data receiver configured to, in a first mode, receive data repeatedly using a first hopping pattern and a second hopping pattern; wherein the data receiver is configured to, in a second mode, receive data once using a third hopping pattern; wherein the hopping patterns of the first mode and the second mode are different so that hops of the hopping patterns of the first mode and hops of the hopping pattern of the second mode are differently distributed in time and/in frequency; wherein the first hopping pattern and the second hopping pattern are shifted relative to each other in frequency and/or time, and wherein the first hopping pattern and the second hopping pattern are at least partially interleaved.

Embodiments provide a data transmitter configured to, in a first mode, transmit data repeatedly using a first hopping pattern and a second hopping pattern, wherein the data transmitter is configured to, in a second mode, transmit data once using a third hopping pattern, wherein the hopping patterns of the first mode and the second mode are different.

Further embodiments provide a data receiver configured to, in a first mode, receive data repeatedly using a first hopping pattern and a second hopping pattern, wherein the data receiver is configured to, in a second mode, receive data once using a third hopping pattern, wherein the hopping patterns of the first mode and the second mode are different.

In embodiments, in a first mode (=repeated transmission mode), a data transmitter and a data receiver use a first hopping pattern and a second hopping pattern for a repeated transfer of data, and, in a second mode (=single transmission mode), they use a third hopping pattern for a single transfer of data, wherein the hopping patterns of the first mode and the second mode are different. With this, a collision probability in the simultaneous transfer of data by a further data transmitter in another mode may be decreased, and the transfer reliability may therefore be increased.

In embodiments, the data receiver may be configured to detect a repeated transfer of data based on the first hopping pattern and/or the second hopping pattern, and to detect a single transfer of data based on the third hopping pattern.

In embodiments, the data receiver may be configured to detect one of the two hopping patterns (e.g. the first hopping pattern) in a reception data stream in order to receive the data transferred with the first hopping pattern, wherein the data receiver may be configured to determine the other hopping pattern (e.g. the second hopping pattern) in the reception data stream using the previously detected hopping pattern (e.g. the first hopping pattern) in order to receive the data transferred with the other hopping pattern (e.g. the second hopping pattern). Due to the repetition, the data transferred with the first hopping pattern and the data transferred with the second hopping pattern is the same.

In embodiments, the first hopping pattern and the second hopping pattern may be selected from a first set of hopping patterns, whereas the third hopping pattern may be selected from a second set of hopping patterns. The first set of hopping patterns and the second set of hopping patterns may be different.

For example, for the transfer of data in the first mode, the data transmitter of a data receiver may select the first hopping pattern and the second hopping pattern from the first class of hopping patterns, whereas, for the transfer of data in a second mode, a further data transmitter may select a hopping pattern from the second class of hopping patterns. The first class of hopping patterns being different from the second class of hopping patterns may ensure that even in a simultaneous or at least temporarily overlapping transfer of data by the data transmitter and the further data transmitter, the collision probability may be kept as low as possible.

In embodiments, in order to establish a connection between the data transmitter and the data receiver, in the first mode, the first hopping pattern and the second hopping pattern and, in the second mode, the third hopping pattern may all be selected from a third set of hopping patterns. The third set of hopping patterns may be a subset of the first set of hopping patterns or of the second set of hopping patterns, or may differ from them.

In embodiments, the first hopping pattern and the second hopping pattern may be shifted relative to each other in frequency and/or time so that the first hopping pattern and the second hopping pattern are at least partially interleaved.

For example, the first hopping pattern and the second hopping pattern may comprise hops that are distributed in time and/or in frequency so that the hops of a hopping pattern are spaced apart in time and/or in frequency, wherein the first hopping pattern and the second hopping pattern may be shifted relative to each other in time and/or in frequency such that at least one part of the hops of the second hopping pattern is arranged between at least one part of the hops of the first hopping pattern. For example, the hops of the first hopping pattern and the hops of the second hopping pattern may be arranged alternately in time.

In embodiments, the first hopping pattern and the second hopping pattern may be different. For example, hops of the first hopping pattern and hops of the second hopping pattern may be distributed differently in time and/or in frequency. For example, two successive hops (e.g. a first hop and a second hop) of the first hopping pattern may have a different time interval and/or frequency interval than two successive hops (e.g. a first hop and a second hop) of the second hopping pattern.

In embodiments, the second hopping pattern may be a frequency-shifted and/or time-shifted version of the first hopping pattern. For example, the first hopping pattern and the second hopping pattern may be the same and may only be shifted in frequency and/or time. For example, hops of the first hopping pattern and hops of the second hopping pattern may have the same relative time interval and frequency interval.

In embodiments, the data transmitter may be configured to transmit the first hopping pattern and the second hopping pattern in only partially overlapping frequency bands or in different frequency bands.

In embodiments, the data transmitter may be configured to randomly transmit the first hopping pattern or the second hopping pattern in one of at least two different frequency bands and to transmit the other hopping pattern in the other frequency band.

In embodiments, the data transmitter may be configured to determine a time offset and/or a frequency offset between the first hopping pattern and the second hopping pattern in dependence on an operation parameter of the data transmitter. In this case, the operation parameter of the data transmitter may either be known to the data receiver, or the data receiver is configured to determine the operation parameter, e.g. to estimate or to calculate the same by means of a hypothesis test.

For example, the operation parameter of the data transmitter may be an intrinsic parameter of the data transmitter itself, e.g. addressing information, identification information, a quartz tolerance, a frequency offset or available transmission energy.

For example, the operation parameter of the data transmitter 100 may be a parameter assigned to the data transmitter 100, e.g. an assigned frequency offset, an assigned time offset, a radio cell, a geographical position, a system time or a priority of the data transmitter or of the data to be transmitted by the data transmitter.

For example, the operation parameter of the data transmitter 100 may be at least a part of payload data or error protection data.

For example, the operation parameter of the data transmitter 100 may be a random frequency offset or a random time offset.

Further embodiments provide a method for transmitting data. The method includes, in a first mode, transmitting data repeatedly using a first hopping pattern and a second hopping pattern. Furthermore, the method includes, in a second mode, transmitting data once using a third hopping pattern, wherein the hopping patterns of the first mode and the second mode are different.

Further embodiments provide a method for receiving data according to an embodiment. The method includes, in a first mode, receiving data repeatedly using a first hopping pattern and a second hopping pattern. Furthermore, the method includes, in a second mode, receiving data once using a third hopping pattern, wherein the hopping patterns of the first mode and the second mode are different.

Further embodiments provide a method for generating a first set of hopping patterns and a second set of hopping patterns. The method includes randomly generating a plurality of hopping patterns for the first set of hopping patterns and a plurality of hopping patterns for the second set of hopping patterns, wherein the hopping patterns comprise at least two hops that are distributed in time and frequency, wherein the hopping patterns for the first set of hopping patterns and the hopping patterns for the second set of hopping patterns are different. Furthermore, the method includes selecting, from the plurality of hopping patterns for the first set of hopping patterns, the hopping patterns whose autocorrelation functions comprise preset autocorrelation characteristics in order to obtain hopping patterns with preset autocorrelation characteristics for the first set of hopping patterns, and selecting, from the plurality of hopping patterns for the second set of hopping patterns, the hopping patterns whose autocorrelation functions comprise preset autocorrelation characteristics in order to obtain hopping patterns with preset autocorrelation properties for the second set of hopping patterns.

In embodiments, a time interval of the hops of the hopping patterns for the second set of hopping patterns may be at least equal to a temporal length of one of the hops of the hopping patterns for the first set of hopping patterns.

In embodiments, time intervals between the hops of the hopping patterns may be equidistant with a deviation of ±20% within a preset hopping pattern length.

In embodiments, the method may comprise mapping the plurality of hopping patterns for the first set of hopping patterns respectively into a two-dimensional time/frequency occupancy matrix, wherein a calculation of the autocorrelation functions is applied thereto, and mapping the plurality of hopping patterns for the second set of hopping patterns respectively into a two-dimensional time/frequency occupancy matrix, wherein a calculation of the autocorrelation functions is applied thereto.

In embodiments, the mapping the plurality of hopping patterns for the first set of hopping patterns and/or mapping the plurality of hopping patterns for the second set of hopping patterns may be respectively carried out under consideration of possibly occurring influences of neighboring frequency positions (neighboring channel interference).

In embodiments, the autocorrelation functions may be two-dimensional autocorrelation functions.

In embodiments, in selecting the hopping patterns for the first set of hopping patterns, the preset autocorrelation characteristics may be fulfilled by the hopping patterns whose autocorrelation function secondary maximums do not exceed a preset maximum first amplitude threshold value, and, in selecting the hopping patterns for the second set of hopping patterns, the present autocorrelation characteristics are fulfilled by the hopping patterns whose autocorrelation function secondary maximums do not exceed a preset maximum second amplitude threshold value.

In embodiments, the first amplitude threshold value may be the same as the second amplitude threshold value.

In embodiments, the first amplitude threshold value may be equal to a number of hops that form a repeating and time-shifted and/or frequency-shifted sub-hopping pattern of the respective hopping patterns for the first set of hopping patterns, and the second amplitude threshold value may be equal to a number of hops that form a repeating and time-shifted and/or frequency-shifted sub-hopping pattern of the respective hopping patterns for the second set of hopping patterns.

In embodiments, in selecting the hopping patterns for the first set of hopping patterns, the preset autocorrelation characteristics may be fulfilled by the hopping patterns whose subtotal formed across a preset number of largest amplitude values of the respective autocorrelation function is smaller than a preset first threshold value, and, in selecting the hopping patterns for the second set of hopping patterns, the preset autocorrelation characteristics may be fulfilled by the hopping patterns whose subtotal formed across a preset number of largest amplitude threshold values of the respective autocorrelation function is smaller than a preset second threshold value.

In embodiments, the first threshold values may be selected such that at least two hopping patterns for the first set of hopping patterns fulfil the preset autocorrelation characteristics, and the second threshold value may be selected such that at least two hopping patterns for the second set of hopping patterns fulfil the preset autocorrelation characteristics, or the first threshold value and/or the second threshold value may be selected in dependence on respective edge parameters.

In embodiments, the method may further comprise calculating cross-correlation functions between the hopping patterns with preset autocorrelation characteristics for the first set of hopping patterns and cross-correlation functions between the hopping patterns with preset autocorrelation characteristics for the second set of hopping patterns. Furthermore, the method may comprise selecting, from the hopping patterns with preset autocorrelation characteristics for the first set of hopping patterns, the hopping patterns whose cross-correlation functions comprise preset cross-correlation characteristics in order to obtain hopping patterns with preset autocorrelation characteristics and preset cross-correlation characteristics for the first set of hopping patterns, and selecting, from the hopping patterns with preset autocorrelation characteristics for the second set of hopping patterns, the hopping patterns whose cross-correlation functions comprise preset cross-correlation characteristics in order to obtain hopping patterns with preset autocorrelation characteristics and preset cross-correlation characteristics for the second set of hopping patterns.

In embodiments, in calculating cross-correlation functions, cross-correlation functions between the hopping patterns for the first set of hopping patterns and the second hopping patterns may also be calculated, and, in selecting the hopping patterns, only the hopping patterns for the first set of hopping patterns and/or the second set of hopping patterns whose cross-correlation functions between the hopping patterns for the first set of hopping patterns and the second set of hopping patterns also comprise preset cross-correlation characteristics may be selected.

In embodiments, the cross-correlation functions may be two-dimensional cross-correlation functions.

In embodiments, in selecting the hopping patterns from the hopping patterns with preset autocorrelation characteristics for the first set of hopping patterns, the preset cross-correlation characteristics may be fulfilled by the hopping patterns whose subtotals formed across a preset number of largest amplitude values of the respective cross-correlation function are the smallest, and, in selecting the hopping patterns from the hopping patterns with preset autocorrelation characteristics for the second set of hopping patterns, the preset cross-correlation characteristics may be fulfilled by the hopping patterns whose subtotals formed across a preset number of largest amplitude values of the respective cross-correlation function are the smallest.

In embodiments, in randomly generating the plurality of hopping patterns for the first set of hopping patterns and the second set of hopping patterns, the hopping patterns may be generated such that the hops of the respective hopping patterns are within a preset frequency band.

Further embodiments refer to transmitting data using a first hopping pattern and a second hopping pattern, wherein the data is transmitted using the first hopping pattern, and wherein the data is transmitted repeatedly using the second hopping pattern, wherein the first hopping pattern and the second hopping pattern are a time hopping pattern, a frequency hopping pattern or a combination of the time hopping pattern and the frequency hopping pattern, respectively, wherein the time hopping pattern is one of the following eight time hopping patterns having 24 hops each:

| | # of sub-data packets in the core frame SC | | | | | | | | | | | | | | | | | | | | | | |
|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 373 | 319 | 545 | 373 | 319 | 443 | 373 | 319 | 349 | 373 | 319 | 454 | 373 | 319 | 578 | 373 | 319 | 436 | 373 | 319 | 398 | 373 | 319 |
| 2 | 373 | 319 | 371 | 373 | 319 | 410 | 373 | 319 | 363 | 373 | 319 | 354 | 373 | 319 | 379 | 373 | 319 | 657 | 373 | 319 | 376 | 373 | 319 |
| 3 | 373 | 319 | 414 | 373 | 319 | 502 | 373 | 319 | 433 | 373 | 319 | 540 | 373 | 319 | 428 | 373 | 319 | 467 | 373 | 319 | 409 | 373 | 319 |

| | # of sub-data packets in the core frame SC | | | | | | | | | | | | | | | | | | | | | | |
|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 4 | 373 | 319 | 396 | 373 | 319 | 516 | 373 | 319 | 631 | 373 | 319 | 471 | 373 | 319 | 457 | 373 | 319 | 416 | 373 | 319 | 354 | 373 | 319 |
| 5 | 373 | 319 | 655 | 373 | 319 | 416 | 373 | 319 | 367 | 373 | 319 | 400 | 373 | 319 | 415 | 373 | 319 | 342 | 373 | 319 | 560 | 373 | 319 |
| 6 | 373 | 319 | 370 | 373 | 319 | 451 | 373 | 319 | 465 | 373 | 319 | 593 | 373 | 319 | 545 | 373 | 319 | 380 | 373 | 319 | 365 | 373 | 319 |
| 7 | 373 | 319 | 393 | 373 | 319 | 374 | 373 | 319 | 344 | 373 | 319 | 353 | 373 | 319 | 620 | 373 | 319 | 503 | 373 | 319 | 546 | 373 | 319 |
| 8 | 373 | 319 | 367 | 373 | 319 | 346 | 373 | 319 | 584 | 373 | 319 | 579 | 373 | 319 | 519 | 373 | 319 | 351 | 373 | 319 | 486 | 373 | 319 | wherein each line in the table is a time hopping pattern, wherein each column in the table is a hop of the respective time hopping pattern starting from a second hop so that each time hopping pattern comprises 24 hops, wherein each cell in the table indicates a time interval of a reference point of the respective hop to a same reference point of an immediately subsequent hop in—advantageously multiples of—symbol durations; wherein the frequency hopping pattern is one of the following eight frequency hopping patterns having 24 hops each:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 4 | 20 | 12 | 0 | 16 | 8 | 3 | 19 | 11 | 5 | 21 | 13 | 1 | 17 | 9 | 7 | 23 | 15 | 2 | 18 | 10 | 6 | 22 | 14 |
| 2 | 3 | 19 | 11 | 7 | 23 | 15 | 2 | 18 | 10 | 5 | 21 | 13 | 4 | 20 | 12 | 0 | 16 | 8 | 1 | 17 | 9 | 6 | 22 | 14 |
| 3 | 6 | 22 | 14 | 0 | 16 | 8 | 1 | 17 | 9 | 4 | 20 | 12 | 3 | 19 | 11 | 5 | 21 | 13 | 2 | 18 | 10 | 7 | 23 | 15 |
| 4 | 3 | 19 | 11 | 1 | 17 | 9 | 4 | 20 | 12 | 5 | 21 | 13 | 2 | 18 | 10 | 7 | 23 | 15 | 6 | 22 | 14 | 0 | 16 | 8 |
| 5 | 5 | 21 | 13 | 2 | 18 | 10 | 0 | 16 | 8 | 6 | 22 | 14 | 7 | 23 | 15 | 1 | 17 | 9 | 4 | 20 | 12 | 3 | 19 | 11 |
| 6 | 1 | 17 | 9 | 3 | 19 | 11 | 4 | 20 | 12 | 6 | 22 | 14 | 7 | 23 | 15 | 5 | 21 | 13 | 2 | 18 | 10 | 0 | 16 | 8 |
| 7 | 5 | 21 | 13 | 1 | 17 | 9 | 2 | 18 | 10 | 4 | 20 | 12 | 3 | 19 | 11 | 0 | 16 | 8 | 6 | 22 | 14 | 7 | 23 | 15 |
| 8 | 3 | 19 | 11 | 6 | 22 | 14 | 5 | 21 | 13 | 1 | 17 | 9 | 7 | 23 | 15 | 2 | 18 | 10 | 0 | 16 | 8 | 4 | 20 | 12 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_23.

In embodiments, the hopping pattern may be a combination of the time hopping pattern and the frequency hopping pattern, wherein the time hopping pattern and the frequency hopping pattern have the same line number in the respective table.

In embodiments, a data packet may be transmitted divided into a plurality of sub-data packets according to the hopping patterns so that a sub-data packet of the plurality of sub-data packets is transmitted in each hop of the hopping pattern.

Further embodiments, refer to receiving data using a first time hopping pattern and a second time hopping pattern, wherein the data is received using the first hopping pattern, and wherein the data is received repeatedly using the second hopping pattern, wherein the first hopping pattern and the second hopping pattern are a time hopping pattern, a frequency hopping pattern or a combination of the time hopping pattern and the frequency hopping pattern, respectively, wherein the time hopping pattern is one of the following eight time hopping patterns having 24 hops each:

| | # of sub-data packets in the core frame SC | | | | | | | | | | | | | | | | | | | | | | |
|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 373 | 319 | 545 | 373 | 319 | 443 | 373 | 319 | 349 | 373 | 319 | 454 | 373 | 319 | 578 | 373 | 319 | 436 | 373 | 319 | 398 | 373 | 319 |
| 2 | 373 | 319 | 371 | 373 | 319 | 410 | 373 | 319 | 363 | 373 | 319 | 354 | 373 | 319 | 379 | 373 | 319 | 657 | 373 | 319 | 376 | 373 | 319 |
| 3 | 373 | 319 | 414 | 373 | 319 | 502 | 373 | 319 | 433 | 373 | 319 | 540 | 373 | 319 | 428 | 373 | 319 | 467 | 373 | 319 | 409 | 373 | 319 |
| 4 | 373 | 319 | 396 | 373 | 319 | 516 | 373 | 319 | 631 | 373 | 319 | 471 | 373 | 319 | 457 | 373 | 319 | 416 | 373 | 319 | 354 | 373 | 319 |
| 5 | 373 | 319 | 655 | 373 | 319 | 416 | 373 | 319 | 367 | 373 | 319 | 400 | 373 | 319 | 415 | 373 | 319 | 342 | 373 | 319 | 560 | 373 | 319 |
| 6 | 373 | 319 | 370 | 373 | 319 | 451 | 373 | 319 | 465 | 373 | 319 | 593 | 373 | 319 | 545 | 373 | 319 | 380 | 373 | 319 | 365 | 373 | 319 |
| 7 | 373 | 319 | 393 | 373 | 319 | 374 | 373 | 319 | 344 | 373 | 319 | 353 | 373 | 319 | 620 | 373 | 319 | 503 | 373 | 319 | 546 | 373 | 319 |
| 8 | 373 | 319 | 367 | 373 | 319 | 346 | 373 | 319 | 584 | 373 | 319 | 579 | 373 | 319 | 519 | 373 | 319 | 351 | 373 | 319 | 486 | 373 | 319 | wherein each line in the table is a time hopping pattern, wherein each column in the table is a hop of the respective time hopping pattern starting from a second hop so that each time hopping pattern comprises 24 hops, wherein each cell in the table indicates a time interval of a reference point of the respective hop to a same reference point of an immediately subsequent hop in—advantageously multiples of—symbol durations; wherein the frequency hopping pattern is one of the following eight frequency hopping patterns having 24 hops each:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 4 | 20 | 12 | 0 | 16 | 8 | 3 | 19 | 11 | 5 | 21 | 13 | 1 | 17 | 9 | 7 | 23 | 15 | 2 | 18 | 10 | 6 | 22 | 14 |
| 2 | 3 | 19 | 11 | 7 | 23 | 15 | 2 | 18 | 10 | 5 | 21 | 13 | 4 | 20 | 12 | 0 | 16 | 8 | 1 | 17 | 9 | 6 | 22 | 14 |
| 3 | 6 | 22 | 14 | 0 | 16 | 8 | 1 | 17 | 9 | 4 | 20 | 12 | 3 | 19 | 11 | 5 | 21 | 13 | 2 | 18 | 10 | 7 | 23 | 15 |
| 4 | 3 | 19 | 11 | 1 | 17 | 9 | 4 | 20 | 12 | 5 | 21 | 13 | 2 | 18 | 10 | 7 | 23 | 15 | 6 | 22 | 14 | 0 | 16 | 8 |
| 5 | 5 | 21 | 13 | 2 | 18 | 10 | 0 | 16 | 8 | 6 | 22 | 14 | 7 | 23 | 15 | 1 | 17 | 9 | 4 | 20 | 12 | 3 | 19 | 11 |
| 6 | 1 | 17 | 9 | 3 | 19 | 11 | 4 | 20 | 12 | 6 | 22 | 14 | 7 | 23 | 15 | 5 | 21 | 13 | 2 | 18 | 10 | 0 | 16 | 8 |
| 7 | 5 | 21 | 13 | 1 | 17 | 9 | 2 | 18 | 10 | 4 | 20 | 12 | 3 | 19 | 11 | 0 | 16 | 8 | 6 | 22 | 14 | 7 | 23 | 15 |
| 8 | 3 | 19 | 11 | 6 | 22 | 14 | 5 | 21 | 13 | 1 | 17 | 9 | 7 | 23 | 15 | 2 | 18 | 10 | 0 | 16 | 8 | 4 | 20 | 12 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_C23.

In embodiments, the hopping pattern may be a combination of the time hopping pattern and the frequency hopping pattern, wherein the time hopping pattern and the frequency hopping pattern have the same line number in the respective table.

In embodiments, a data packet may be received divided into a plurality of sub-data packets according to the hopping patterns so that a sub-data packet of the plurality of sub-data packets is received in each hop of the hopping pattern.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
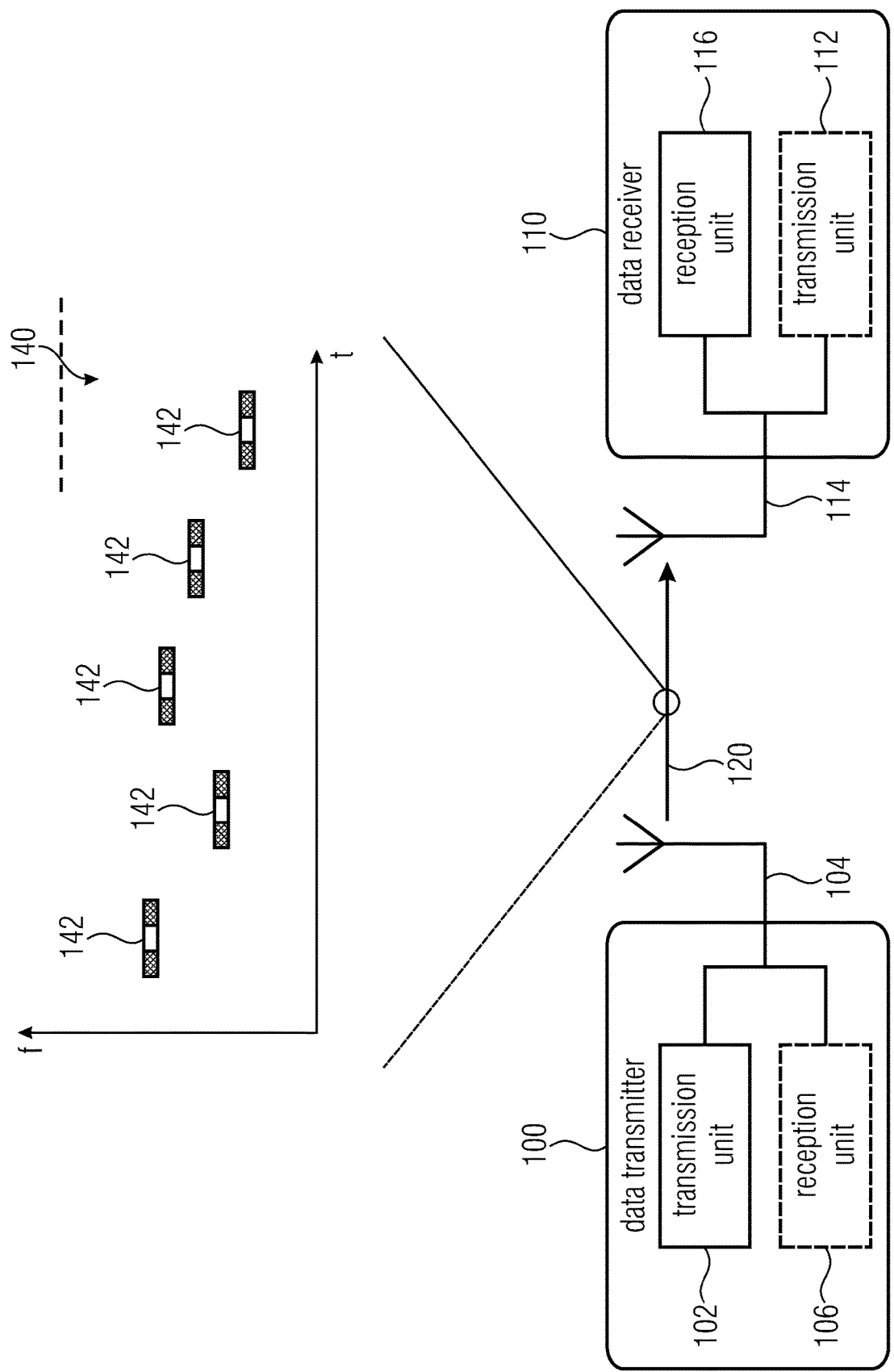
FIG. 1 shows a schematic block circuit diagram of a system having a data transmitter and a data receiver according to an embodiment of the present invention.

In the subsequent description of the embodiments of the present invention, the same elements or elements having the same effect are provided in the figures with the same reference numerals so that their description is interchangeable.

1. Single (Non-Repeated) Transmission of Data Using a Hopping Pattern

FIG. 1 shows a schematic block circuit diagram of a system having a data transmitter 100 and a data receiver 110 according to an embodiment of the present invention.

The data transmitter 100 is configured to transmit data 120 using a hopping pattern.

The data receiver 110 is configured to receive data 120 from the data transmitter 100 using a hopping pattern.

As is indicated in FIG. 1, the hopping pattern 140 may have a plurality of hops 142 that are distributed in time and/or in frequency.

In embodiments, the data transmitter 100 may be configured to transmit data 120 distributed in time and/or in frequency according to the hopping pattern 140. Accordingly, the data receiver 110 may be configured to receive data 120 that is transmitted distributed in time and/or in frequency according to the hopping pattern 140.

As is exemplarily shown in FIG. 1, the data transmitter 100 may comprise a transmission unit (or transmission module, or transmitter) 102 configured to transmit the data 120. The transmission unit 102 may be connected to an antenna 104 of the data transmitter 100. In addition, the data transmitter 100 may comprise a reception unit (or reception module, or a receiver) 106 configured to receive data. The reception unit 106 may be connected to the antenna 104 or to a further (separate) antenna of the data transmitter 100. The data transmitter 100 may also comprise a combined transmission/reception unit (transceiver).

The data receiver 110 may comprise a reception unit (or reception module, or receiver) 116 configured to receive data 120. The reception unit 116 may be connected to an antenna 114 of the data receiver 110. In addition, the data receiver 110 may comprise a transmission unit (or transmission module, or transmitter) 112 configured to transmit data. The transmission unit 112 may be connected to the antenna 114 or a further (separate) antenna of the data receiver 110. The data receiver 110 may also comprise a combined transmission/reception unit (transceiver).

In embodiments, the data transmitter 100 may be a sensor node, whereas the data receiver 110 may be a base station. Typically, a communication system comprises at least one data receiver 110 (base station) and a multitude of data transmitters (sensor nodes, e.g. heating meters). Obviously, it is also possible for the data transmitter 100 to be a base station, whereas the data receiver 110 is a sensor node. In addition, it is possible for the data transmitter 100 and the data receiver 110 to be sensor nodes. In addition, it is possible for the data transmitter 100 and the data receiver 110 to be base stations.

The data transmitter 100 and the data receiver 110 may optionally be configured to transmit, or receive, data 120 using the telegram splitting method. In this case, a telegram, or data packet 120, is divided into a plurality of sub-data packets (or partial data packets, or partial packets) 142, and the sub-data packets 142 are transferred distributed in time and/or in frequency from the data transmitter 100 to the data receiver 110 according to the hopping pattern 140, wherein the data receiver 110 recombines the sub-data packets in order to obtain the data packet 120. Each of the sub-data packets 142 only contains a part of the data packet 120. The data packet 120 may further be channel-coded so that not all sub-data packets 142 but only a part of the sub-data packets 142 is needed in order to faultlessly decode the data packet 120.

As previously mentioned, the temporal distribution of the plurality of sub-data packets 142 may be done according to a time hopping pattern and/or a frequency hopping pattern.

A time hopping pattern may indicate a sequence of transmission times or transmission time intervals with which the sub-data packets are transmitted. For example, a first sub-data packet may be transmitted at a first transmission time (or in a first transmission time slot) and a second sub-data packet may be transmitted at a second transmission time (or in a second transmission time slot), wherein the first transmission time and the second transmission time are different. Here, the time hopping pattern may be define (or specify or indicate) the first transmission time and the second transmission time. Alternatively, the time hopping pattern may indicate the first transmission time or a temporal interval between the first transmission time and the second transmission time. Obviously, the time hopping pattern may also just indicate the temporal interval between the first time and the second transmission time. Between the sub-data packets, there may be transmission pauses in which no transmission takes place. The sub-data packets may also temporally overlap.

A frequency hopping pattern may indicate a sequence of transmission frequencies or transmission frequency hops with which the sub-data packets are transmitted. For example, a first sub-data packet may be transmitted with a first transmission frequency (or in a first frequency channel) and a second sub-data packet may be transmitted with a second transmission frequency (or in a second frequency channel), wherein the first transmission frequency and the second transmission frequency are different. The frequency hopping pattern may define (or specify or indicate) the first transmission frequency and the second transmission frequency. Alternatively, the frequency hopping pattern may indicate the first transmission frequency and a frequency interval (transmission frequency hop) between the first transmission frequency and the second transmission frequency. Obviously, the frequency hopping pattern may also just indicate the frequency interval (transmission frequency hop) between the first transmission frequency and the second transmission frequency.

Obviously, the plurality of sub-data packets 142 may also be transferred from the data transmitter 100 to the data receiver 110 distributed both in time and in frequency. The distribution of the plurality of sub-data packets in time and in frequency may be done according to a time/frequency hopping pattern. A time/frequency hopping pattern may be a combination of a time hopping pattern and a frequency hopping pattern, i.e. a sequence of transmission times or transmission time intervals with which the sub-data packets are transmitted, wherein transmission frequencies (or transmission frequency hops) are assigned to the transmission times (or transmission time intervals).

Figure 2:
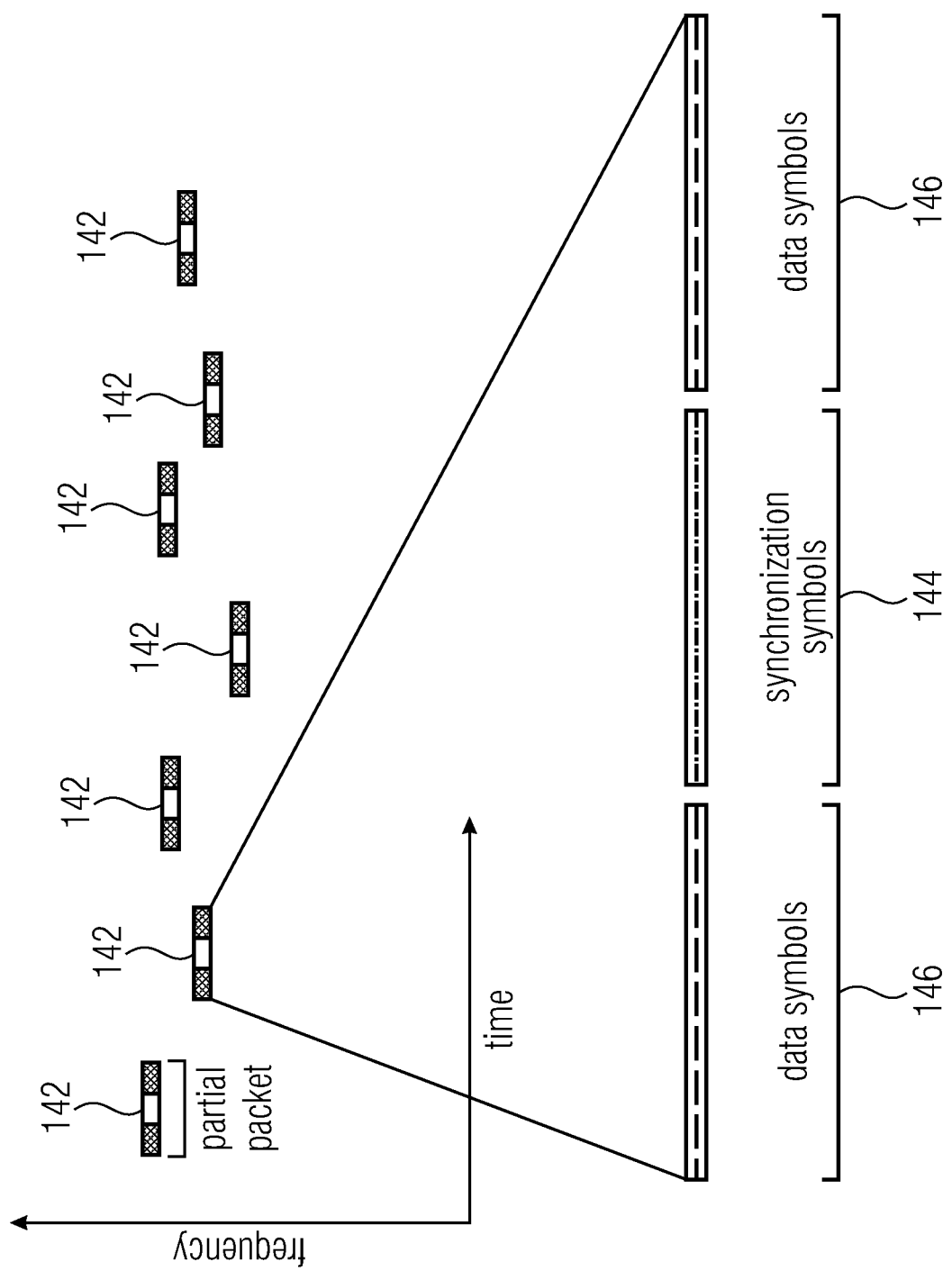
FIG. 2 shows in a diagram an occupancy of the transfer channel in the transfer of a plurality of sub-data packets according to a time and frequency hopping pattern.

FIG. 2 shows in a diagram an occupancy of the transfer channel during the transfer of a plurality of sub-data packets 142 according to a time/frequency hopping pattern. Here, the ordinate describes the frequency and the abscissa describes the time.

As can be seen in FIG. 2, the data packet 120 may be exemplarily divided among n=7 sub-data packets 142 and may be transferred from the data transmitter 100 to the data receiver 110 distributed in time and in frequency according to a time/frequency hopping pattern.

As can further be seen in FIG. 2, a synchronization sequence 144 may also be divided among the plurality of sub-data packets 142 so that, beside data (data symbols in FIG. 2) 146, the plurality of sub-data packets 142 each contain a part of the synchronization sequence (synchronization symbols in FIG. 2) 144.

2. Repeated Transmission of Data Using Two Hopping Patterns

The data transmitter 100 described above and exemplarily shown in FIG. 1 may be augmented by a repeated transmission mode in which the data transmitter 100 transmits the data 120 using a first hopping pattern and repeatedly (i.e. again) using a second hopping pattern. The data transmitter 100 may be operated in the repeated transmission mode and in a single transmission mode, i.e. as previously described. Obviously, the data transmitter 100 may also be operated in both modes.

Similarly, the data receiver 110 described above and exemplarily shown in FIG. 1 may be augmented by a repeated transmission mode in which the data receiver 110 receives the data 120 using a first hopping pattern and repeatedly (i.e. again) using a second hopping pattern. The data transmitter 110 may be operated in the repeated transmission mode and in a single transmission mode, i.e. as previously described. Obviously, the data receiver 110 may also be operated in both modes.

The subsequent description is primarily directed to the repeated transmission mode, whereas reference is made to the description above with respect to the single transmission mode. In addition, it is to be noted that the above-described aspects of the single transmission mode may also be applied to the repeated transmission mode.

Figure 3:
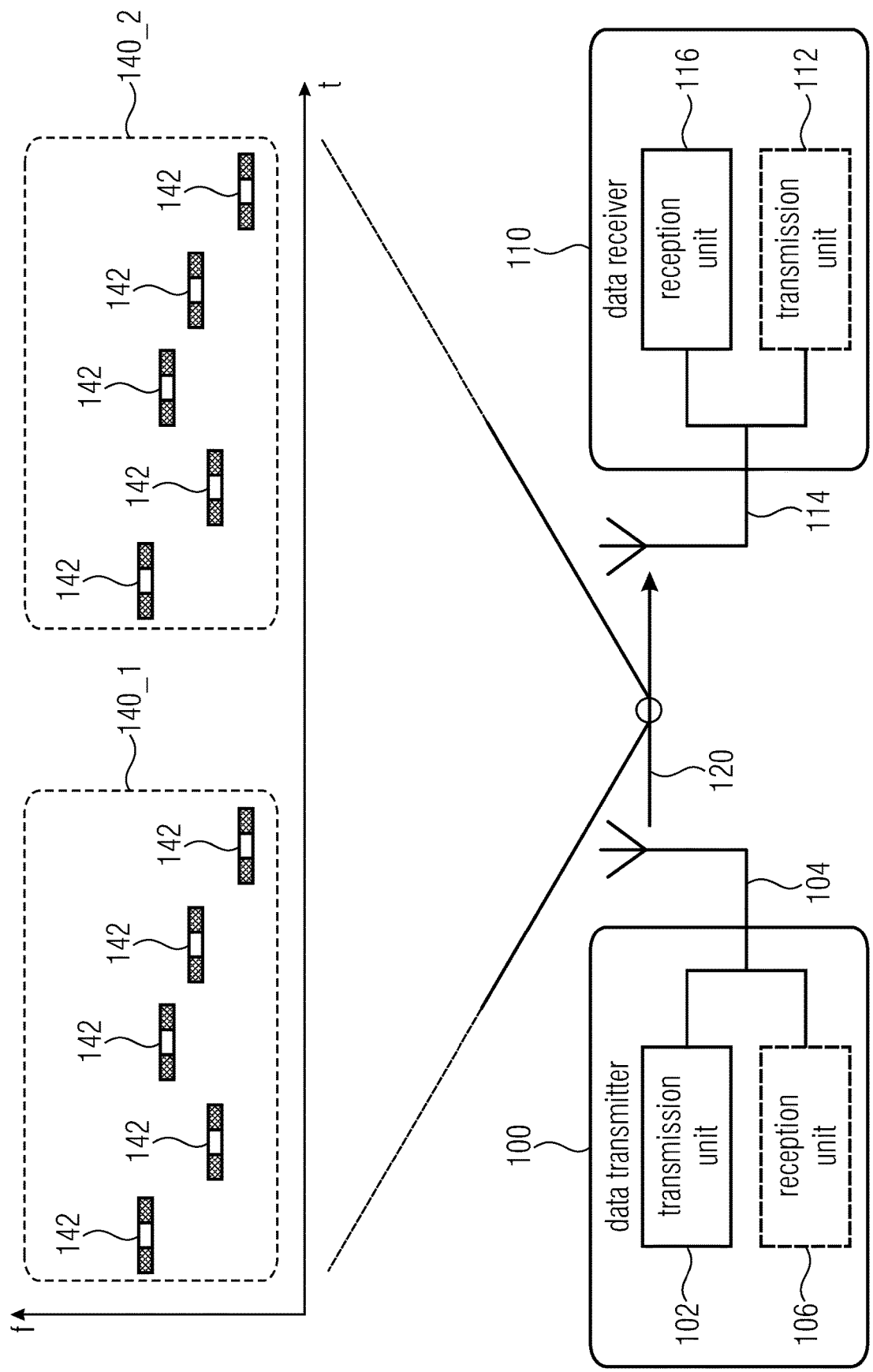
FIG. 3 shows a schematic block circuit diagram of a system having a data transmitter and a data receiver according to an embodiment of the present invention.

FIG. 3 shows a schematic block circuit diagram of a system having a data transmitter 100 and a data receiver 110 according to an embodiment of the present invention.

The data transmitter 100 is configured to, in a first mode (=repeated transmission mode), transmit data 120 repeatedly using a first hopping pattern 140_1 and a second hopping pattern 140_2. Furthermore, the data transmitter 100 is configured to, in a second mode (=single transmission mode), transmit data 120 once (i.e. one time, not repeatedly) using a third hopping pattern 142 (cf. FIG. 1), wherein the hopping patterns of the first mode and the second mode are different.

The data receiver 110 is configured to, in a first mode, receive data 120 repeatedly using a first hopping pattern 140_1 and a second hopping pattern 140_2. Furthermore, the data receiver 110 is configured to, in a second mode, receive data 120 once (i.e. one time, not repeatedly) using a third hopping pattern 142 (cf. FIG. 1), wherein the hopping patterns of the first mode and the second mode are different.

For example, the data receiver 110 may be configured to detect a repeated transmission of data based on the first hopping pattern 140_1 and/or the second hopping pattern 140_2, and to detect a single transmission of data based on the third hopping pattern.

In embodiments, the data receiver may be configured to detect one of the two hopping patterns (e.g. the first hopping pattern) in a reception data stream in order to receive the data transferred with the one hopping pattern, wherein the data receiver may be configured to determine the other hopping pattern (e.g. the second hopping pattern) in the reception data stream using the previously detected hopping pattern (e.g. the first hopping pattern) in order to receive the data transferred with the other hopping pattern (e.g. the second hopping pattern).

For example, this has the advantage for the data receiver that the detection and synchronization (e.g. time/frequency estimation) only has to be performed once, or that it is sufficient to detect one of the two hopping patterns. For example, the detection may be designed such that it detects almost all hopping patterns (e.g. telegrams) up to a specified Es/N0 (e.g. approximately −3 dB). Thus, at a lower Es/N0, it may not be guaranteed that the detection is triggered in both transmissions. Due to the time/frequency coherence between the two transmissions (first hopping pattern and second hopping pattern), it is sufficient to only detect one of the two transmissions.

For example, the data receiver 110 may look for the hopping patterns 140_1 and 140_2, although it should find at least one of the two hopping patterns 140_1 and 140_2. Then, the data receiver 110 may decode this hopping pattern and may determine whether it is faultless. If it is not faultless, the data receiver 110 may look for the other hopping pattern, although the data receiver 110 does not know whether the previously found hopping pattern was the first or second transmission (the first hopping pattern 140_1 or the second hopping pattern 140_2). Since it was more difficult to find, a single decoding will probably not help in this case. Therefore, MRC (maximum ratio combining) is performed: The data receiver 110 may calculate the LLRs of the data from the two transmissions and add these (weighting according to the individual C/Is) in order to then go through the decoder. Here, compared to the single emission, achieve.

The first hopping pattern 140_1 and the second hopping pattern 140_2 may be selected from a first set of hopping patterns, whereas the third hopping pattern may be selected from a second set of hopping patterns. The first set of hopping patterns and the second set of hopping patterns may be different.

For example, for the transfer of data in the first mode, the data transmitter 100 (or the data receiver 110) may select the first hopping pattern 142_1 and the second hopping pattern 142_2 from the first class of hopping patterns (e.g. from the eight hopping patterns illustrated in section 3.3), whereas, for the transfer of data in the second mode, a further data transmitter may select a hopping pattern from the second class of hopping patterns (e.g. from the eight hopping patterns indicated in section 3.2). The first class of hopping patterns and the second class of hopping patterns being different may be ensured that even in a simultaneous or at least temporally overlapping transfer of data by the data transmitter and the further data transmitter, a collision probability may be kept as low as possible.

In order to establish a connection between the data transmitter and the data receiver, in the first mode, the first hopping pattern 140_1 and the second hopping pattern 140_2 and, in the second mode, the third hopping pattern may all be selected from a third set of hopping patterns. The third set of hopping patterns may be a subset of the first set of hopping patterns or of the second set of hopping patterns, or it may differ from them.

The first hopping pattern 140_1 and the second hopping pattern 140_2 may be shifted relative to each other in frequency and/or time so that the first hopping pattern 142_0 and the second hopping pattern 142_0 are at least partially interleaved.

For example, the first hopping pattern 140_1 and the second hopping pattern 140_2 may comprise hops 142 that are distributed in time and/or in frequency so that the hops 142 of a hopping pattern are spaced apart in time and/or in frequency, wherein the first hopping pattern 140_1 and the second hopping pattern 140_2 may be shifted relative to each other in time and/or in frequency such that at least one part of the hops 142 of the second hopping pattern 140_2 is arranged between at least one part of the hops 142 of the first hopping pattern 140_1. For example, the hops 142 of the first hopping pattern 140_1 and the hops 142 of the second hopping pattern 140_1 may be arranged alternately in time.

The first hopping pattern 140_1 and the second hopping pattern 140_2 may be different.

For example, hops 142 of the first hopping pattern 140_1 and hops 142 of the second hopping pattern 140_2 may be distributed differently in time and/or in frequency. For example, two successive hops (e.g. a first hop and a second hop) of the first hopping pattern 140_1 may have a different time interval and/or frequency interval than two successive hops (e.g. a first hop and a second hop) of the second hopping pattern 140_2.

The second hopping pattern 140_2 may be a frequency-shifted and/or time-shifted version of the first hopping pattern 140_1. For example, the first hopping pattern 140_1 and the second hopping pattern 140_2 may be the same and may only be shifted in time and/or in frequency. For example, hops 142 of the first hopping pattern 140_1 and hops 142 of the second hopping pattern 140_2 may have the same relative time interval and frequency interval.

The data transmitter 100 may be configured to transmit the first hopping pattern 140_1 and the second hopping pattern 140_2 in only partially overlapping or different frequency bands.

Furthermore, the data transmitter 100 may be configured to randomly transmit the first hopping pattern 140_1 or the second hopping pattern 140_2 in one of at least two different frequency bands and to transmit the other hopping pattern in the other frequency band.

The data transmitter 100 may be configured to determine a time offset and/or frequency offset between the first hopping pattern 140_1 and the second hopping pattern 140_2 in dependence on an operation parameter of the data transmitter 100. In this case, the operation parameter of the data transmitter 100 may either be known to the data receiver 110, or the data receiver 110 is configured to determine the operation parameter, e.g. to estimate or to calculate the same by means of a hypothesis test. In addition, the data receiver 110 may be configured to try all possible time offsets until the correct offset has been found. In addition, the data receiver 110 may be configured to try all possible frequency offsets until the correct frequency offset has been found.

For example, the operation parameter of the data transmitter 100 may be an intrinsic parameter of the data transmitter itself, e.g. addressing information, identification information, a quartz tolerance, a frequency offset or available transmission energy.

For example, the operation parameter of the data transmitter 100 may be a parameter assigned to the data transmitter 100, e.g. an assigned frequency offset, an assigned time offset, a radio cell, a geographical position, a system time or a priority of the data transmitter or of the data.

For example, the operation parameter of the data transmitter 100 may be at least a part of payload data or error protection data.

For example, the operation parameter of the data transmitter 100 may be a random frequency offset or a random time offset.

Figure 4:
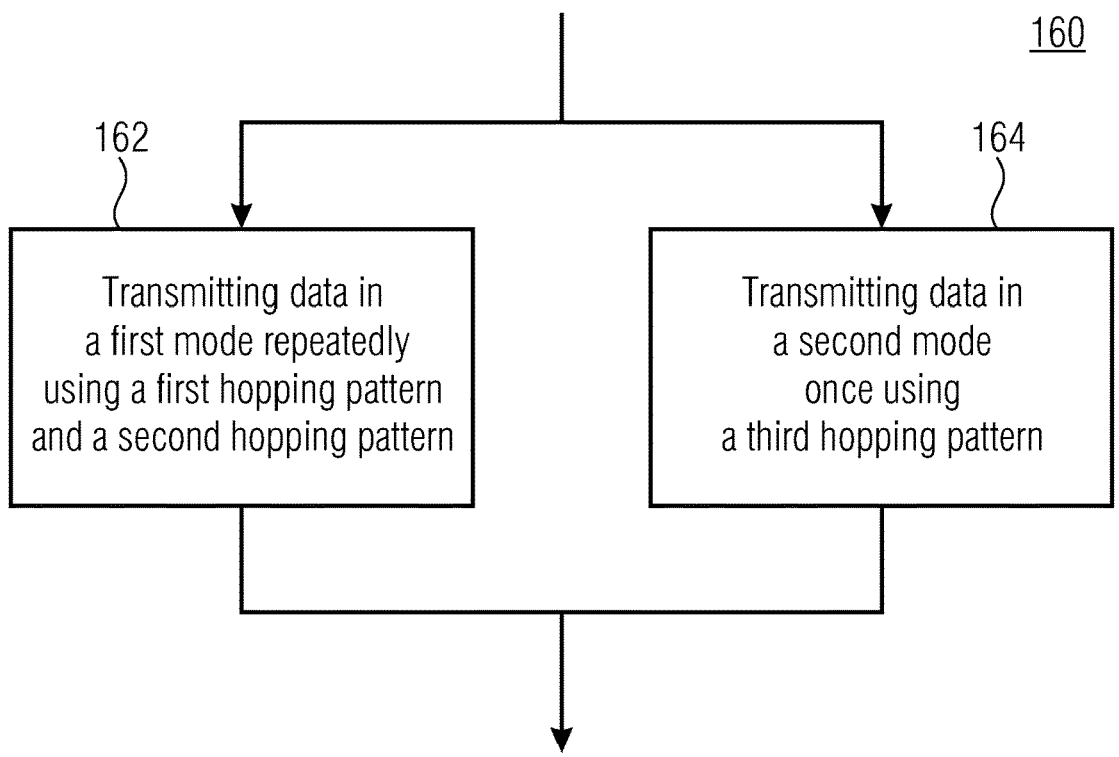
FIG. 4 shows a flow diagram of a method for transmitting data according to an embodiment.

FIG. 4 shows a flow diagram of a method 160 for transmitting data according to an embodiment. The method 160 includes, in a first mode, transmitting 162 data repeatedly using a first hopping pattern and a second hopping pattern. Furthermore, the method 160 includes, in a second mode, transmitting 164 data once using a third hopping pattern, wherein the hopping patterns of the first mode and the second mode are different.

Figure 5:
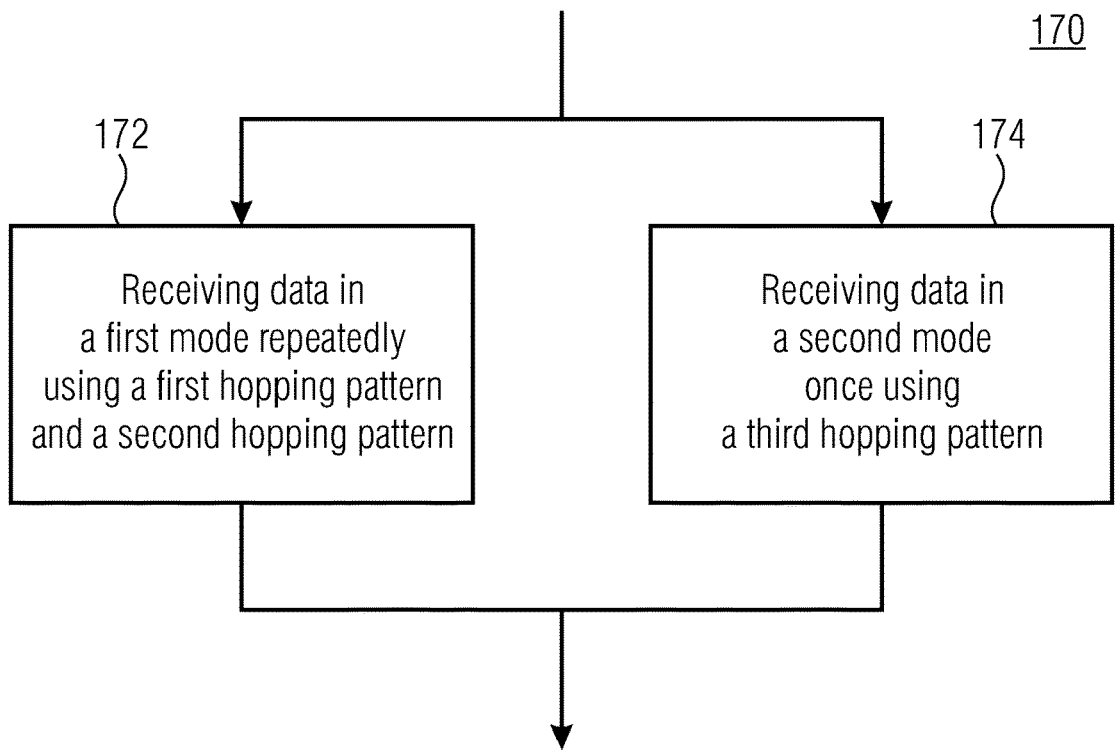
FIG. 5 shows a flow diagram of a method for receiving data according to an embodiment.

FIG. 5 shows a flow diagram of a method 170 for receiving data according to an embodiment. The method 170 includes, in a first mode, receiving 172 data repeatedly using a first hopping pattern and a second hopping pattern. Furthermore, the method 170 includes, in a second mode, receiving 174 data once using a third hopping pattern, wherein the hopping patterns of the first mode and the second mode are different.

3. Generation of Hopping Patterns

In the following, embodiments of a method for generating hopping patterns are described in more detail. In detail, FIG. 6 shows a method for generating hopping patterns for a single (i.e. one time) transfer of data by means of a hopping pattern, whereas FIG. 7 shows a method for generating hopping patterns for a repeated transfer of data by means of two hopping patterns.

Figure 6:
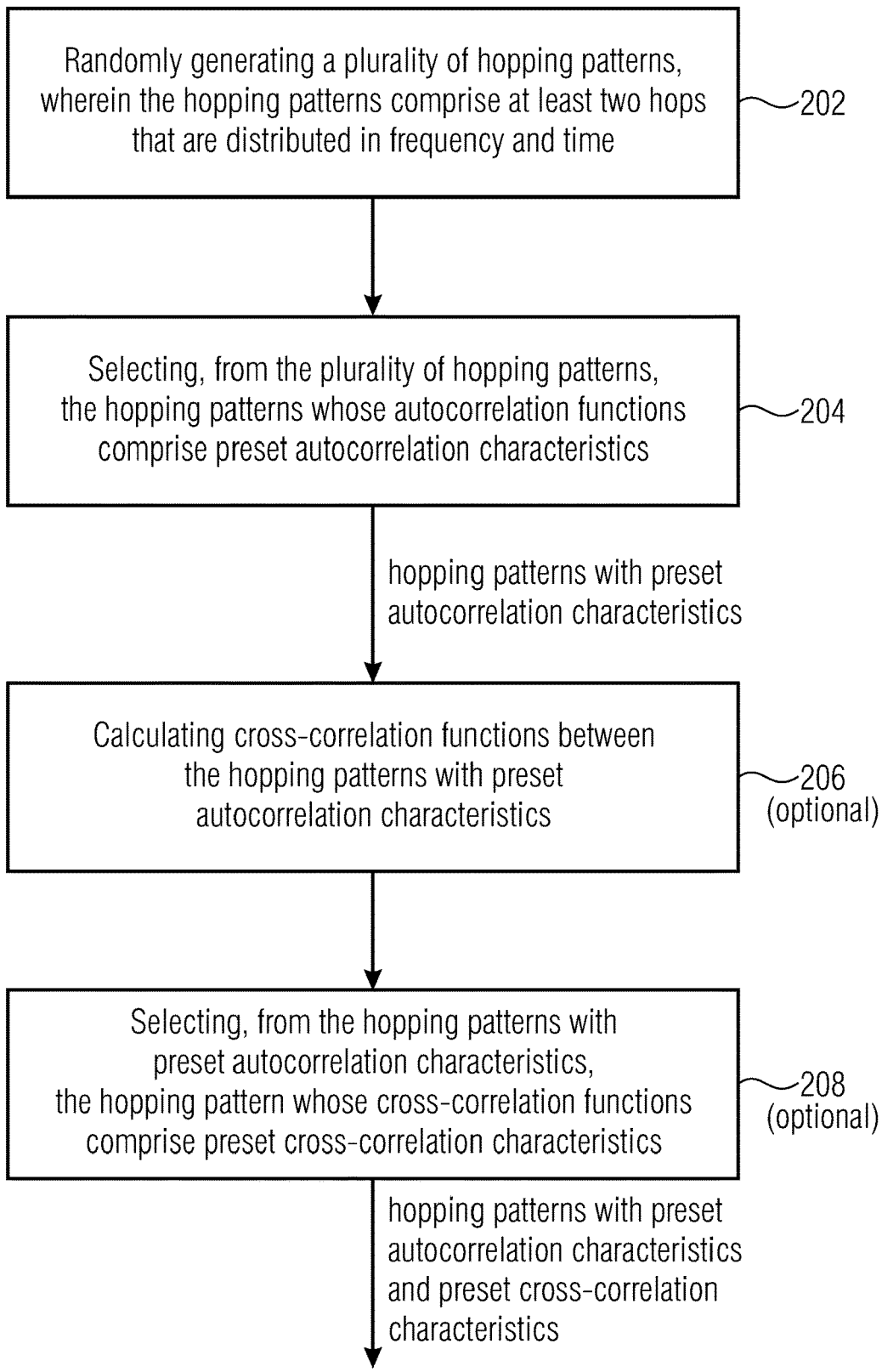
FIG. 6 shows a flow diagram of a method for generating a set of hopping patterns according to an embodiment.
Figure 7:
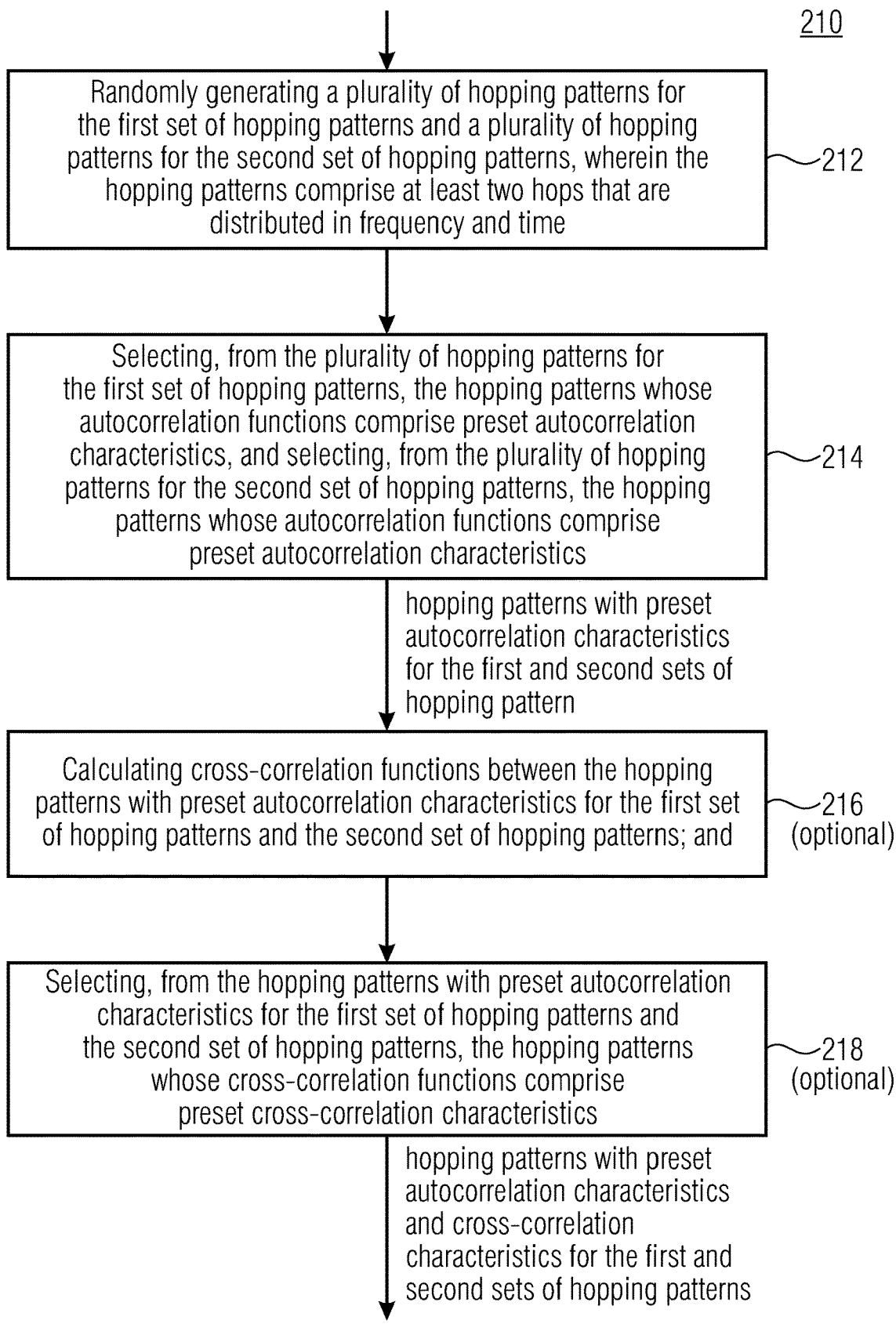
FIG. 7 shows a flow diagram of a method for generating two sets of hopping patterns according to an embodiment.

FIG. 6 shows a flow diagram of a method 200 for generating a set of hopping patterns according to an embodiment. The method 200 includes randomly generating 202 a plurality of hopping patterns, wherein the hopping patterns comprise at least two hops that are distributed in time and frequency. The method 200 further includes selecting 204, from the plurality of hopping patterns, the hopping patterns whose autocorrelation functions comprise preset autocorrelation characteristics in order to obtain hopping patterns with preset autocorrelation characteristics.

In embodiments, the preset autocorrelation characteristics may be fulfilled by the hopping patterns whose autocorrelation function secondary maximums do not exceed a preset minimal amplitude threshold value. For example, the amplitude threshold value may be equal to a number of hops of a cluster of a plurality of clusters into which the hopping pattern is divided. For example, a cluster may be a number of hops comprising the same time and/or frequency interval relative to each other.

In embodiments, the preset autocorrelation characteristics may be fulfilled by the hopping patterns whose subtotal formed across a preset number of largest amplitude values of the respective autocorrelation function is smaller than a preset threshold value. Here, the threshold value may be selected such that at least two hopping patterns (or a preset number of hopping patterns) fulfil the preset autocorrelation characteristics.

As can be seen in FIG. 6, the method 200 may further comprise calculating 206 cross-correlation functions between the hopping patterns with preset autocorrelation characteristics. Furthermore, the method 200 may comprise selecting 208, from the hopping patterns with preset autocorrelation characteristics, the hopping patterns whose cross-correlation functions comprise preset cross-correlation characteristics in order to obtain hopping patterns with preset autocorrelation characteristics and preset cross-correlation characteristics.

In embodiments, the preset cross-correlation characteristics may be fulfilled by the hopping patterns whose subtotals formed across a preset number of largest amplitude values of the respective cross-correlation function are the smallest.

FIG. 7 shows a flow diagram of a method 210 for generating a first set of hopping patterns and a second set of hopping patterns. The method 210 includes randomly generating 212 a plurality of hopping patterns for the first set of hopping patterns and a plurality of hopping patterns for the second set of hopping patterns, wherein the hopping patterns comprise at least two hops that are distributed in frequency and in time, wherein the hopping patterns for the first set of hopping patterns and the hopping patterns for the second set of hopping patterns are different. In addition, the method 210 includes selecting 214, from the plurality of hopping patterns for the first set of hopping patterns, the hopping patterns whose autocorrelation functions comprise preset autocorrelation characteristics in order to obtain hopping patterns with preset autocorrelation characteristics for the first set of hopping patterns, and selecting, from the plurality of hopping patterns for the second set of hopping patterns, the hopping patterns whose autocorrelation functions comprise preset autocorrelation characteristics in order to obtain hopping patterns with preset autocorrelation characteristics for the second set of hopping patterns.

In embodiments, a time interval of the hops of the hopping patterns for the second set of hopping patterns may be at least as large as a temporal length of one of the hops of the hopping patterns for the first set of hopping patterns.

For example, in order to be able to interleave as many repetitions as possible, the shortest time interval between two sub-data packets (or bursts) may be maximized. This would be (T_Frame−N*T_Burst)/(N−1), i.e. an equidistant temporal distribution of the bursts (within the clusters and between the clusters). Obviously, since this regularity would not be optimal for the design process, a slight jitter may be introduced.

In embodiments, the preset autocorrelation characteristics may be fulfilled by the hopping patterns whose autocorrelation functions secondary maximums do not exceed a preset minimum amplitude threshold value. For example, the amplitude threshold value may be equal to a number of hops of a cluster of a plurality of clusters into which the hopping pattern is divided. For example, a cluster may be a number of hops having the same time and/or frequency interval relative to each other.

In embodiments, the preset autocorrelation characteristics may be fulfilled by the hopping patterns whose subtotal formed across a preset number of largest amplitude values of the respective autocorrelation function is smaller than a preset threshold value. Here, the threshold value may be selected such that at least two hopping patterns (or a preset number of hopping patterns) fulfil the preset autocorrelation characteristics.

As can be seen in FIG. 7, the method 210 may further comprise calculating 216 cross-correlation functions between the hopping patterns with preset autocorrelation characteristics for the first set of hopping patterns and cross-correlation functions between the hopping patterns with preset autocorrelation characteristics for the second set of hopping patterns. Furthermore, the method may comprise selecting 218, from the hopping patterns with preset autocorrelation characteristics for the first set of hopping patterns, the hopping patterns whose cross-correlation functions comprise preset cross-correlation characteristics in order to obtain hopping patterns with preset autocorrelation characteristics and preset cross-correlation characteristics for the first set of hopping patterns, and, from the hopping patterns with preset autocorrelation characteristics for the second set of hopping patterns, the hopping patterns whose cross-correlation functions comprise preset cross-correlation characteristics in order to obtain hopping patterns with preset autocorrelation characteristics and preset cross-correlation characteristics for the second set of hopping patterns.

In embodiments, the preset cross-correlation characteristics may be fulfilled by the hopping patterns whose subtotals formed across a preset number of largest amplitude values of the respective cross-correlation function are the smallest.

3.1 Generation of Hopping Patterns for TSMA

For example, hopping patterns generated with the method shown in FIG. 6 or FIG. 7 may be employed in a system for the unidirectional or bidirectional data transmission from many sensor nodes to a base station using the so-called "telegram splitting multiple access (TSMA)" method.

In TSMA, the transmission of a message is subdivided into a multitude of short bursts (=hops, or sub-data packets) 142 between which there are transmission-free time intervals of different lengths each. Here, the bursts 142 may be distributed across time and also across available frequencies according to a real and a pseudo-random principle.

This approach of telegram splitting provides a particularly large robustness against interferences of other sensor nodes, regardless of whether they come from their own or external systems. In particular, the interference robustness in the own sensor nodes is achieved by distributing the various user signal bursts as uniformly as possible across the time domain and also the frequency domain.

This random-like distribution may be achieved by various means, for example, (1) by unavoidable tolerable deviations of the crystal reference oscillator with respect to the frequency, (2) arbitrary granularity in the time domain results through the random asynchronous channel access, and (3) by different burst arrangements of the different sensor nodes to different hopping patterns.

In order to achieve a further increase of the failure probability in the data transfer, time/frequency diversity may be used when transmitting the payload data. The sub-data packets (bursts) may be transmitted at least twice in a temporally offset manner in, e.g., hopping patterns that are as different as possible and, e.g., in frequency bands that are as different as possible. Since only one transmitter in the sensor node is available for the transfer of the signal, certain restrictions with respect to the temporal burst arrangement in the hopping pattern result for the interleaved repetition. The interleaved arrangement of the first and second transmissions in the case of repetitions will be explained in more detail below.

The divers-redundant signals may be combined on the receiver side in all possible ways, e.g. maximal-ratio combining (MRC), equal-gain combining, scanning/switching combining or selection combining. However, when designing such diverse-redundant hopping patterns, the combiner is to detect in as simple a way as possible that a repetition has been transmitted instead of a first transmission.

The design and the optimization of such hopping patterns are described in detail in the following.

Figure 8A:
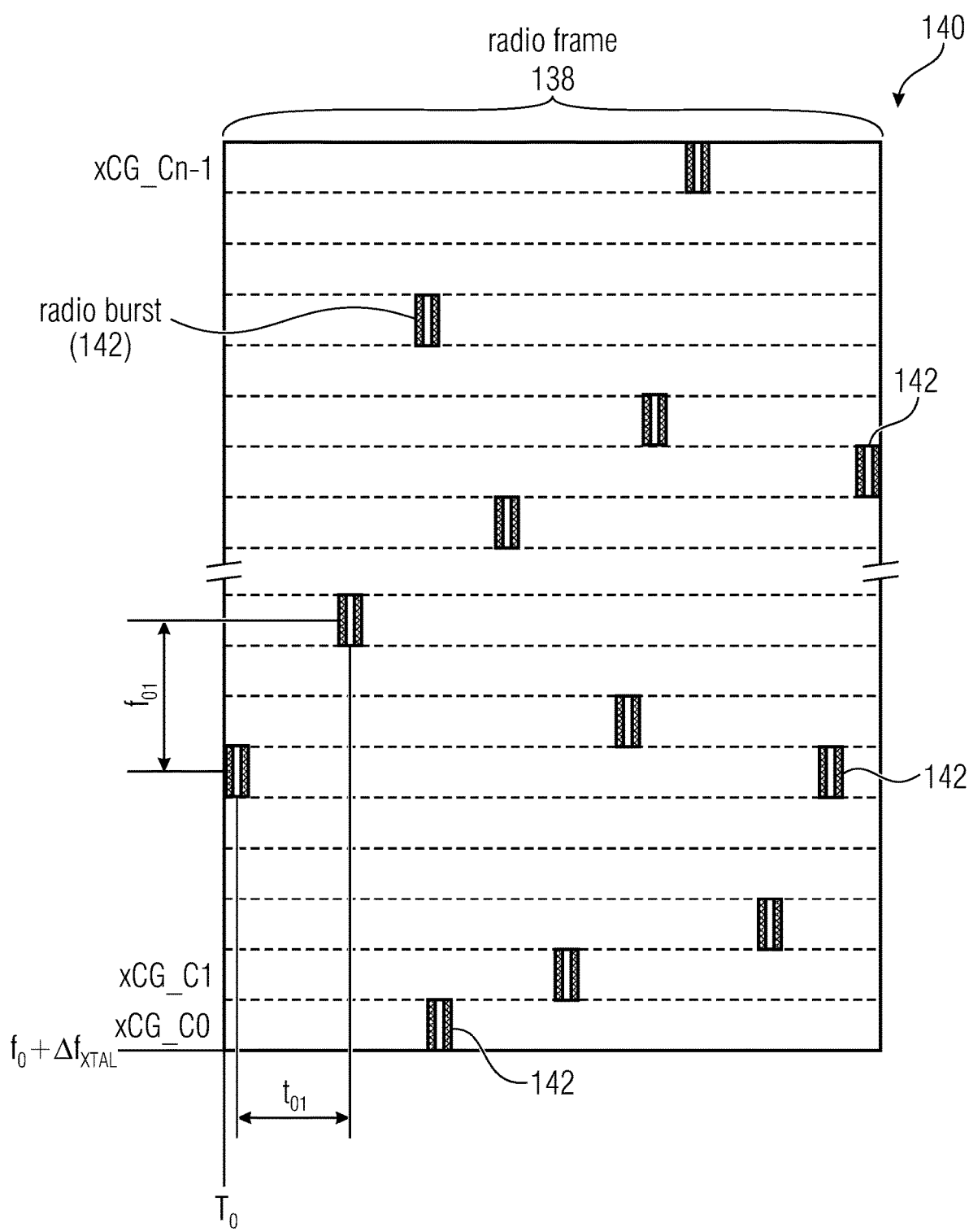
FIG. 8*a* shows in a diagram a structure of a frame in a TSMA hopping pattern.

In the transmission method TSMA, individual bursts of a data packet 120 (in the following also referred to as frame), as is illustrated in FIG. 8a, are distributed across time and also across the frequencies.

In detail, FIG. 8a shows in a diagram a structure of a frame 120 having a TSMA hopping pattern 140. In this case, the ordinate describe the frequency, or channels (frequency channels), and the abscissa describes the time.

The start time $T_0$ of a frame 120 with the total duration $T_{frame}$ is selected by the sensor node 100 randomly due to the asynchronous transmission. The duration $T_{burst}$ of a burst 142 may vary, but is assumed to be constant in the following without restriction of the general validity, whereas the time intervals $t_{n,(n+1)}$, which each designate the distance of two neighboring burst centers (here of the two bursts having the indices n and n+1), are random quantities that are all within a specifiable range $T_{A\_min} \leq t_{n,(n+1)} \leq T_{A\_max}$ for n∈{1, 2, ..., N−1}. N is the number of the bursts 142 within a frame 120. For the frequencies used for the transmission, it is assumed that they are present in form of discrete frequency channels which are within a specifiable frequency channel grid. The frequency separation $f_{n,(n+1)}$ between 2 bursts 142 is a multiple of the carrier distance $B_C$ used in TSMA, and is therefore independent of the symbol rate $S_R$. ($S_R \leq B_C$) used. The relative starting frequency of a frame is to be denoted with $f_0$.

The number of the available frequency channels is given with L and N≤L applies. In this respect, there are usually more or exactly as many frequency channels as are needed by the N bursts 142 and, therefore, each of the N bursts 142 is located in a different frequency channel within a frame 120. The frequencies used by the N bursts do not have to be connected, but may be arbitrarily distributed within the L present frequencies.

In the following, the arrangement of the N bursts 142 in time and frequency is referred to as TSMA pattern (TSMA hopping pattern). If this hopping pattern is known to the receiver, it may synchronize with respect to the same based on the pilot sequences located in some or in every burst 142 and it may subsequently decode the reception data.

The following system assumptions and limitations may be considered with respect to the design of one or several TSMA patterns.

Figure 9:
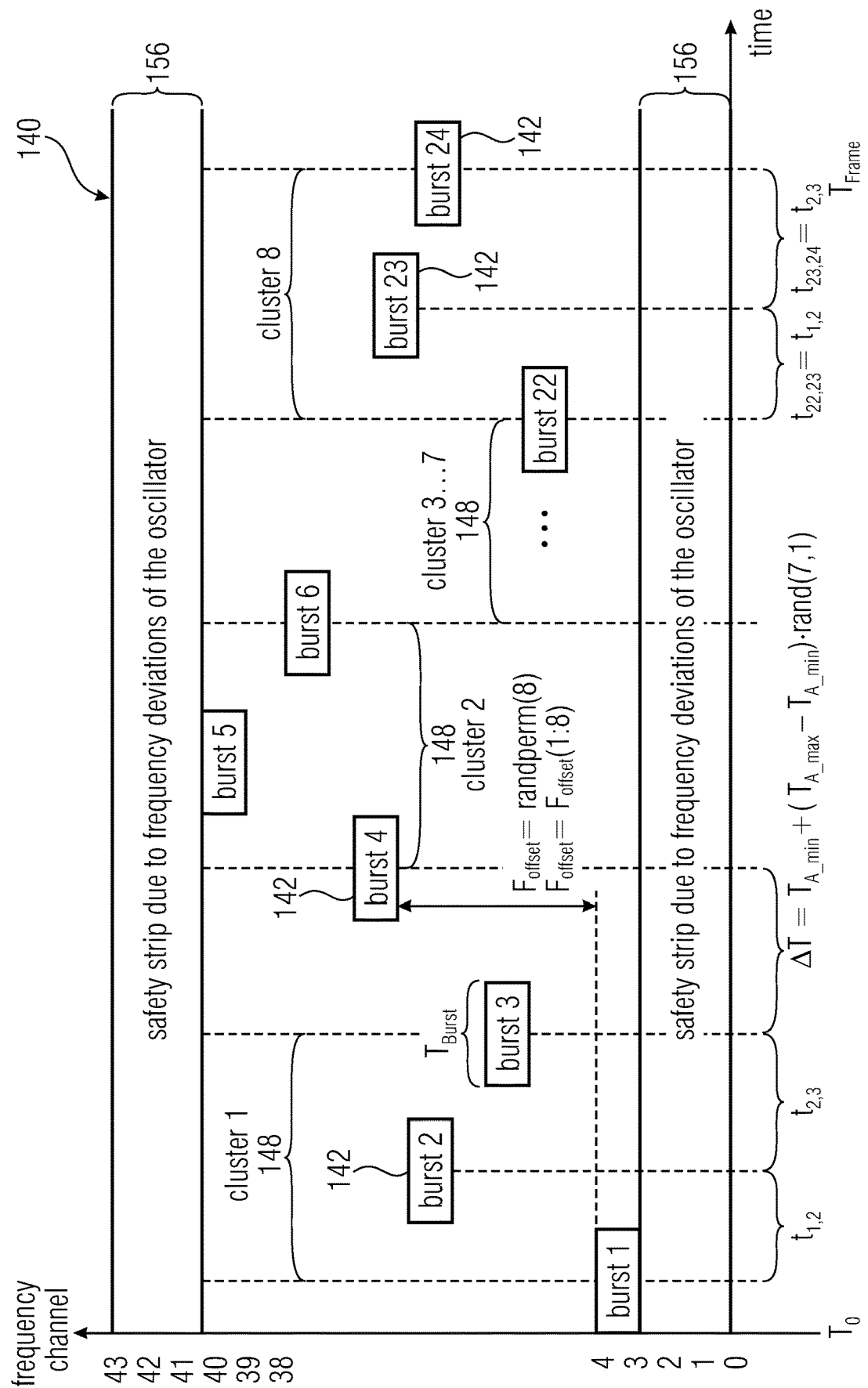
FIG. 9 shows in a diagram a schematic view of a structure of a TSMA hopping pattern.

(1) The frequency deviation of the oscillator from its nominal frequency may be considered. Depending on the system parameters and hardware requirements, the frequency deviation may be a multiple of the carrier distance $B_c$. Since this frequency offset may have both positive and negative values, a guard strip 156 of S frequency channels in which there is no burst (cf. FIG. 9) may be provided accordingly at both edges of the frequency range that is considered for use. In this respect, the degree of freedom for the individual bursts of the hopping pattern is reduced to (L−2·S) frequencies, wherein N≤(L−2·S) still applies. (2) Due to the temporarily asynchronous transfer, the receiver 110 does not know when a transmitter 100 transmits and the receiver also does not know which transmitter transmits with which hopping pattern. In this respect, the detection of a signal would go along with a considerable additional effort if the pattern arrangement, i. e. the grouping of the N bursts 142 within the time range $T_{frame}$ and across the (L−2·S) frequencies, would be completely random. In this respect, for example, C subsequent bursts 142 that are relative, e. g. identical, to each other with respect to their time and frequency intervals may be combined to a so-called cluster 148. Thus, a hopping pattern 140 consists of N/C clusters 148 with C bursts 142 each. C may advantageously be selected such that it is an integer divider of N. Thus, N/C|N⇔∃k∈ℤ :k·N/C=N applies. Details are discussed as shown in FIG. 9. However, it should already be mentioned here that a hopping pattern construction consisting of N/C clusters 148 that are entirely identical in their internal structure has certain disadvantages with respect to their correlation characteristics (occurrence of strongly pronounced side maximums with an amplitude of N/C each in the 2D autocorrelation function). All first bursts 142 in the N/C clusters comprise repetition patterns that are identical in a frequency-offset manner (and possibly in a time-offset manner). Accordingly, it happens that N/C bursts 142 simultaneously interfere with each other. However, this disadvantage may be accepted in view of the simplifications that may be achieved in the receiver as a result. A cluster size of C=1 (and therefore no cluster at all) is the most advantageous with respect to the correlation characteristics. (3) Due to the telegram splitting, the duration $T_{burst}$ of a burst 142 is relatively short as compared to the transfer time $T_{Frame}$ of the entire frame 120. If a certain minimum time $T_{A\_min}$ is allowed to elapse after the transmission of the first burst 142, this may have certain advantages with regard to the current consumption of the battery-powered sensor nodes (regeneration time of the battery after a comparatively energy-intensive transmission process). This minimum distance $T_{A\_min}$ should also be adhered to within the cluster and between the clusters as a design guideline.

The above mentioned points 1) to 3) may be used as a basis for the design of hopping patterns for data (payload data) transmitted one time (=once or non-repeatedly).

Figure 8B:
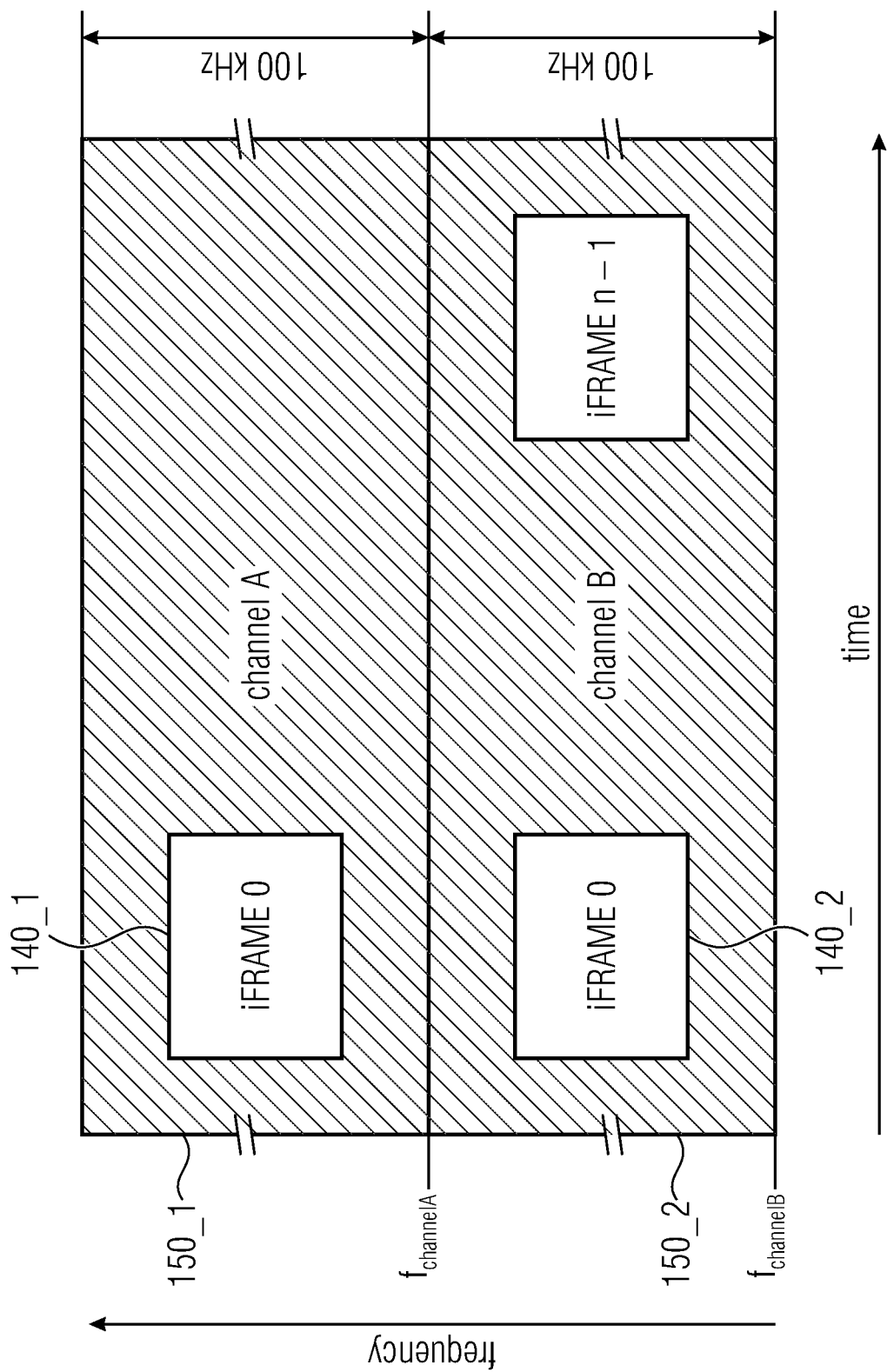
FIG. 8*b* shows in a diagram an occupancy of two frequency channels and in the repeated transfer of data by means of a first hopping pattern and a second hopping pattern.

In order to further increase the failure probability in the data transfer, time/frequency diversity in the form of interleaved repetitions may optionally be used when transmitting the payload data. In this case, the bursts (=hops or sub-data packets) 142 of the two hopping patterns to be repeated may be temporally interleaved, e.g. frame by frame, as is indicated in FIG. 8b. In order for the transmission time needed for the two repetitions to remain as short as possible, an alternating interleaved arrangement may be used, where the bursts of the first/second transmissions alternate.

The following describes which further requirements exist for the hopping patterns to be newly designed. The new hopping patterns for repeatedly transmitted data may optionally match the hopping patterns for data transmitted once, i.e. have a lowest possible cross-correlation.

(4) Selection of the frequency hopping pattern. The TSMA hopping patterns should be robust a) against external interferences from other systems (neither the bandwidth nor the duration of the interference is known here) and b) against interferences from its own system. Optionally, it may be c) be made easy as possible for the receiver to differentiate between transmissions with and without repetition, in particular when using maximal-ratio combining. The aspects a) and c) do not depend on the design process and may be determined in advance. For example, improved or even maximum interference robustness against external interferences may be achieved by putting the two frames to be repeated into two different frequency bands (with their respective L frequency channels). The larger the frequency distance (cf. FIG. 8b), the lower the lower the probability that an external interferer can simultaneously interfere with both frames. In detail, FIG. 8b shows in a diagram an occupancy of two frequency channels 150_1 and 150_2 in the repeated transfer of data by means of a first hopping pattern 140_1 and a second hopping pattern 140_2. Here, the ordinate describes the frequency and the abscissa describes the time. In other words, FIG. 8b shows an interleaved frame transfer with a repetition when using two different frequency bands.

For example, the receiver (data receiver) may differentiate between transmissions with and without repetition based on the hopping pattern if different hopping patterns are used for the two transmission types. Without restricting the general applicability, the hopping patterns shown in section 3.2 may be used for transfers without repetition, and the hopping patterns shown in section 3.3 may be used for transfers with repetition, for example. In principle, a different (new) hopping pattern may be used in the first transfer in the repetition mode as compared to the second transfer. However, it has been shown that the use of a single hopping pattern is sufficient for all transmissions in the repetition mode when using corresponding, below-described measures. In addition, this measure also makes it easier for the receiver to simultaneously detect the individual bursts in the same patterns in the repetition mode.

The following explains how an improved or even maximum robustness against interferences from the own system may be achieved when using the same hopping patterns in the first and second transmissions in the case of repetitions (point 4b)). According to an embodiment, since different hopping patterns are used for the single transmission (e.g. the hopping patterns from section 3.2) than for the first and second transmissions in the case of the repetition (e.g. the hopping patterns from section 3.2), a full interference with the hopping patterns in the case of the repetition (the overlapping of all N bursts of a frame) is not possible. A later example shows based on the cross-correlation that, in the worst case, a maximum of C burst (of a cluster) may meet. If the hopping patterns to be used for the case of the repetition also have (slightly) different time intervals between the bursts in the cluster, the average number of hits may again be reduced. In the following, the interference immunity of transmitters that use the same hopping pattern in the repetition mode is considered. If two transmitters with identical hopping patterns were to start at the same time $T_0$ (cf. FIG. 8b) in the same frequency band, without any countermeasures, all 2N bursts in both frames of the repetition mode would be completely superimposed. Such a situation may be almost entirely prevented by means of parameter variation. For example, diversity may be achieved by introducing a variable, multi-staged time offset $T_W$ (cf. FIG. 2), or by the random start of the first burst in one of the two frequency bands A or B. Additionally, for example a random positive or negative frequency offset (e.g. in multiples of the carrier distance $B_C$) may also be applied to the TSMA pattern. According to the specifications in [ETSI TS 103 357 V0.0.5 (2017-03), "ERM-Short Range Devices—Low Throughput Networks; Protocols for Interfaces A, B and C", Chapter 7 "Telegram splitting ultra-narrow band (TS-UNB) family, March 2017], an additional specification of eight different repetition hopping patterns would result in a residual probability of 0.2% that two hopping patterns would be completely cancel each other out at a randomly equal $T_0$. A random coincidence of the transmissions of two data transmitters at $T_0$ depends on the duty cycle and the burst duration and is usually already in the low PTT range.

In the following, restrictions in the time domain behavior are described. As time restrictions, the subdivision of the frame into N/C clusters with C bursts each was introduced under point 2), wherein the individual bursts of the clusters have the same time intervals relative to their neighboring bursts. In point 3), a minimum time $T_{A\_min}$ between the bursts was introduced due to the current economy that should not be undercut. Generally, it may be stated that the smaller the frequency band available for the N bursts with its (L−2·S) possible frequencies to be occupied, the more important the pseudo-random principle of the time intervals $t_{n,(n+1)}$ between the clusters. To what extent this random principle may be maintained due to the variable, multi-stage time offset $T_W$ (cf. FIG. 8b) requested in point 4) for the repetition hopping patterns has to be clarified. The fact that the same hopping pattern is to be used in the repetition case may be regarded as positive with respect to the pseudo-random principle in any case.

Taking into account the above-mentioned restrictions, the structure of a TSMA pattern 142 shown in FIG. 9 arises.

In detail, FIG. 9 shows in a diagram a schematic view of a structure of a TSMA hopping pattern 142. In this case, the ordinate describes the frequency in frequency channels, and the abscissa describes the time. In other words, FIG. 9 shows a structure of the TSMA hopping pattern 142 with a cluster arrangement and frequency occupancy.

For better comprehensibility, the values in FIG. 9 are purely exemplary supplemented with concrete figures as needed: L=44, S=4, N=24, C=3. Due to the frequency deviation of the oscillator from its nominal frequency, S=4 frequency bands each are blocked for the burst occupancy, leaving 36 frequency bands for the 24 bursts or the 8 clusters.

This results in the following degrees of freedom with respect to the frequency channel occupancy. Since the 3 bursts in the 8 clusters each have a same frequency interval relative to each other, at least 8 further frequency bands may be reserved, leaving a maximum swing of 28 frequency bands for the base assignment of the 3 bursts. For example, any relative assignment with 3 different frequency bands may be performed. As is the case in the base assignments (1,28,14) or (1,24,12), for example, a largest possible frequency swing in neighboring bursts proves to be advantageous with regard to the later optimizations. The assignment of the individual clusters with respect to each other may also take place randomly. For example, in the base assignments (1,28,14), the order of the numbers {1,2,3,4,5,6,7,8} may be arbitrarily permuted with each other (Matlab command: randperm(8)) and these 8 different values each be added to a base assignment in order to obtain the frequency assignment of the bursts in the 8 clusters. In the base assignments (1,24,12), even a permutation of 12 start values (Matlab command: randperm(12)) is possible. and the first 8 values may again be added with the corresponding base assignment (1,24,12). If two groups of hopping patterns are to be designed, e.g. two groups of 8 hopping patterns with and without repetition, the use of two base assignments with a different frequency sweep is recommended. In this case, complete clusters may not be collided between the groups.

This results in the following degrees of freedom with respect to the time intervals. Here, the two time intervals between the 3 bursts of the clusters as well as the 7 time intervals between the 8 clusters have to be determined. A certain minimum time $T_{A\_min}$ should not be undercut. An upper time limit $T_{A\_max}$ results from the specification of the frame duration $T_{frame}$. The determination of the random time intervals may also be performed by throwing a dice (Matlab command: $\Delta T = T_{A\_min} + (T_{A\_max} - T_{A\_min}) \cdot \text{rand}(7,1)$). Here, the use of different burst time intervals in the clusters is also recommended if a design of two different hopping pattern groups is planned. With respect to the time intervals between the clusters, in the repetition hopping patterns, one may check to what extent the shift by means of the multi-stage time offset $T_W$ leads to no burst overlaps and to what extent $T_{A\_min}$ is adhered to between all interleaved bursts. If this is not the case, time scaling may be performed again. It is also to be noted that, in the above Matlab command, equidistant time intervals $\Delta T$ may be achieved when setting $T_{A\_max} = T_{A\_min}$ to be equal.

In the "Telegram Splitting Multiple Access (TSMA)" method, the message is split into many small bursts 142 both in the time direction and the frequency direction according to the hopping pattern 140. Due to the asynchronous transmission and the different frequency departures of the individual sensor nodes 100, the bursts 142 are smeared across time and also across the available frequency spectrum. If all sensor nodes 100 have the same hopping pattern, with increasing number of participants, bursts of different participants (in the worst case fully) overlap in time more and more frequently and therefore interfere with each other. The more bursts 142 within a frame 120 are disturbed by bursts of other participants, the higher the probability that the receiver-side error correction fails and that transmission errors occur.

Embodiments provide a set of hopping patterns which ideally minimize the packet error rate (frame or packet error rate, FER, PER) of the radio transmission system. This is done under the assumption that all radio participants use the same set of hopping patterns. Although, with respect to the arrangement of the radio frequencies in a hopping pattern, only a finite (albeit usually relatively large) number of permutations is possible by introducing discrete radio channels, the temporal arrangement of the bursts 142 leads to an extremely large number of permutation possibilities, i.e. hopping patterns, due to a continuous time axis. Thus, a "full search" across all possible hopping patterns is almost impossible. The method underlying the invention is therefore based on a Monte Carlo approach which selects, from a very large number of (pseudo) randomly generated hopping patterns, a set with the best characteristics as to an expected minimum error rate using suitable design criteria. The number of hopping patterns in this set amounts to $P_{selection}$.

In order to create suitable hopping patterns 142, a matrix that is ideally strictly monotonously related to the expected packet error rate, i.e. whose minimization ideally also minimizes the packet error rate, is needed. In embodiments, the two-dimensional (2D) autocorrelation and/or cross-correlation of the hopping pattern may be considered as a design criterium.

The 2D-autocorrelation (ACF) $\Theta_{x,x}$ of the matrix X of the hopping pattern 142, which spans the area across the duration $T_{frame}$ sampled with multiples of $T_A$ and the occupied frequency spectrum with the L frequency bands, may be specified as follows:

$$\Theta_{x,x}(f, t) = \sum_{l=0}^{L-1} \sum_{m=0}^{M-1} x_{l,m} \cdot x_{l+f,m+t}$$

wherein L is the number of lines of the matrix X and $M=T_{frame}/T_A$ is the number of columns of the matrix X. If a burst is located at the respective position x(l,m) of the matrix X, an entry takes place at this location in X with x(l,m)=1, otherwise x(l,m)=0. The indexed elements of X outside the occupied range are also zero:

$x(l,m)=0, l<0$ or $l \geq L$ or $m<0$ or $m \geq M$

Since the oscillator frequency error per participant may amount by definition to a maximum deviation of S frequency channels, the frequency index f in the ACF extends from −2S to +2S. On the other hand, the time index t runs from $-T_{frame}$ to $T_{frame}$ in steps of $T_{frame}/T_A$. Die ACF dimension of $\Theta_{x,x}$ is therefore (4S+1)×(2M+1).

In the time and frequency information matrix X, if desired, the influence of neighboring channel interferences may also be taken into account. This is important if the reception filters in the receiver 110 do not have any particular selectivity with respect to neighboring channel interferences. For this, a matrix vector $m_{Met}$={cochannel, first neighboring channel, second neighboring channel, . . . } that inserts the corresponding information into the matrix X may be introduced. For example, if a matrix with $m_{Met}$={1, 0.5, 0.1} is specified, in X, there is a 1 at the point x(l,m) where the presence of a burst is assumed there is a 0.5 at the two positions of the neighboring frequencies x(l−1,m) and x(l+1,m). Accordingly, further on the outside, at x(l−2,m) and x(l+2,m) there is the value 0.1 for the 2nd neighboring channel. This indexing may be done at all positions where a burst is located in X.

Figure 10A:
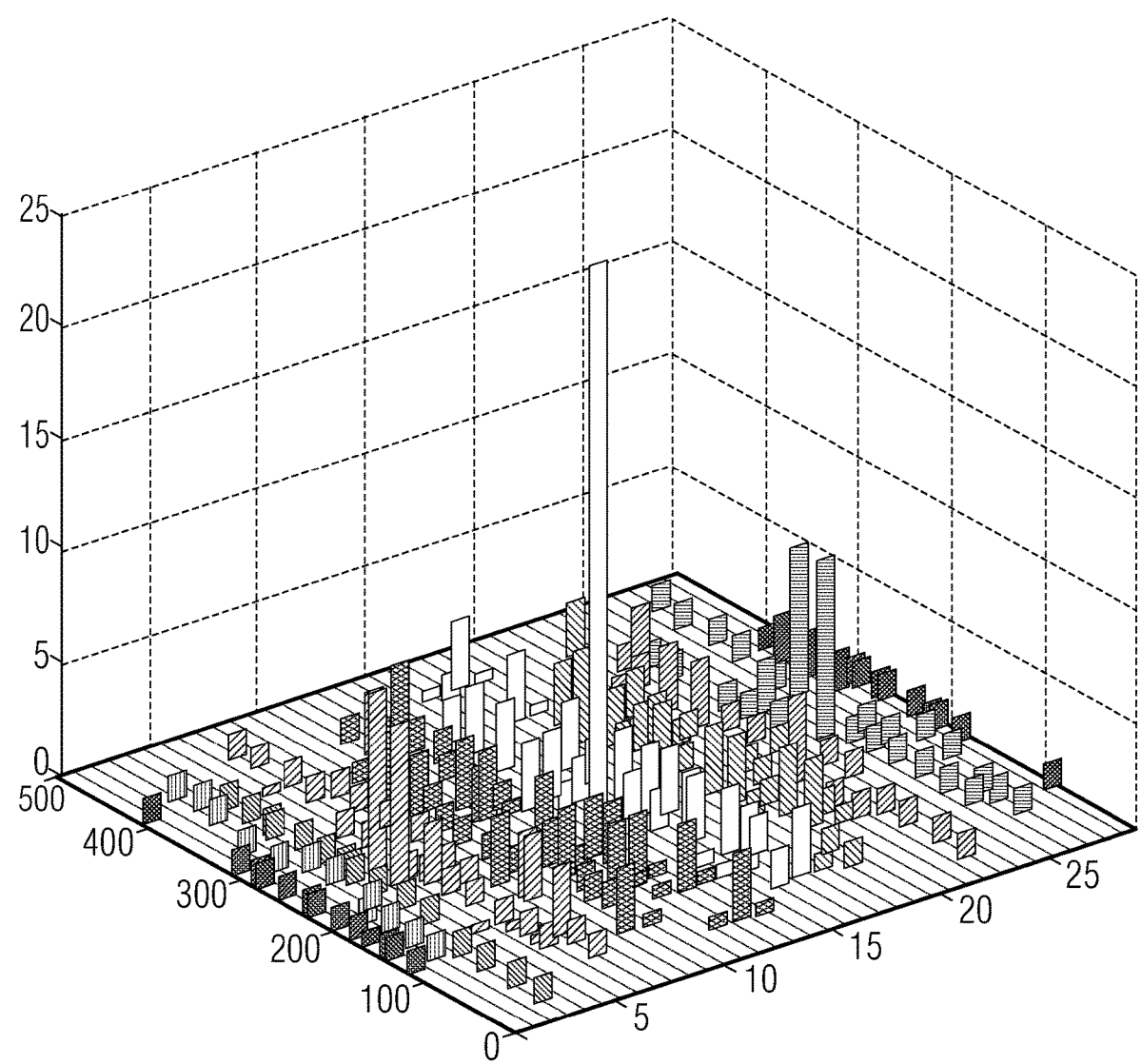
FIG. 10*a* shows in a diagram primary and secondary maximums of an autocorrelation function of a hopping pattern that comprises preset autocorrelation characteristics, plotted across frequency and time.
Figure 10B:
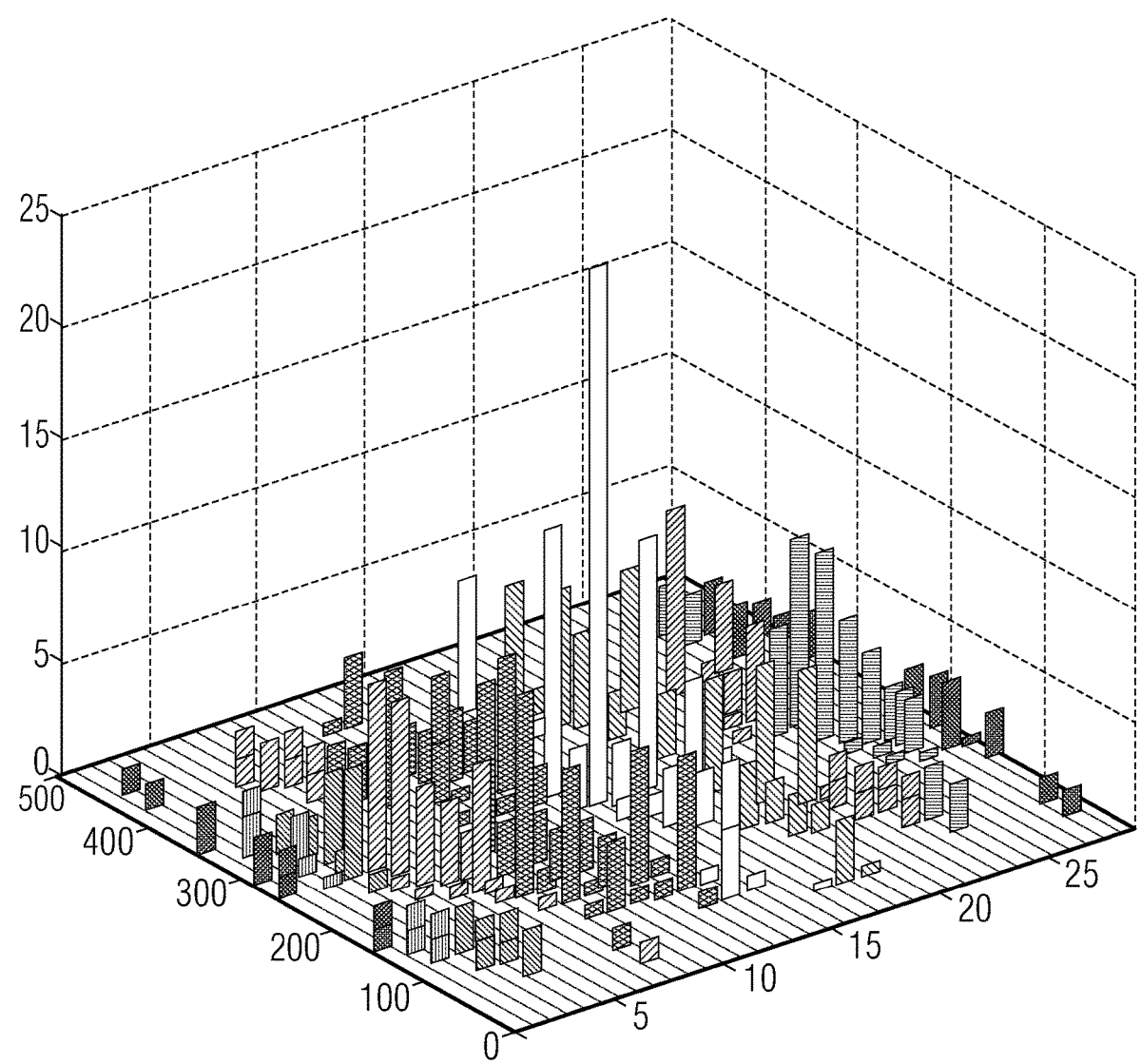
FIG. 10*b* shows in a diagram primary and secondary maximums of an autocorrelation function of a hopping pattern that does not comprise preset autocorrelation characteristics, plotted across frequency and time.

FIGS. 10a and 10b show two ACF examples. In FIG. 10a, beside the unavoidable main maximum at t=f=0 (since the non-shifted sequence is most similar with itself, the 2D-ACF has the highest value for the sequence non-shifted in both dimensions (time and frequency), in this case N burst collisions) and the 2 or 4 possible side maximums with the amplitudes of N/C each due to the cluster formation, there are only values that are smaller than or equal to a threshold value $N_{threshold}$. The lower this threshold, the fewer bursts are disturbed in a frame, while the probability of a transmission error is reduced. On the other hand, FIG. 10b shows a more unfavorable hopping pattern in which the threshold value is, e.g. significantly, exceeded in some places. This increases the probability of transmission errors.

In the following, the individual design steps are described in detail.

In a first design step, $P_{optimum}$ candidates of the hopping patterns whose ACF side maximums do not exceed a specified minimum amplitude threshold value $N_{threshold} \geq C$ (C is the cluster size) may be generated. The generation of candidates of the hopping patterns is done in the context of a Monte Carlo simulation in which hopping patterns having random time and frequency patterns (in the context of the mentioned edge conditions, see above) are generated. If $N_{threshold} > C$ applies for the threshold value, the number of values exceeding the value C should be as small as possible.

For this, the (4S+1)×(2M+1) elements of the 2D autocorrelation $\Theta_{x,x}$ may be sorted in ascending order in a vector $V_{sort}$. Since the total sum remains approximately constant across all ACF elements for all hopping patterns and most ACF elements have values of 0, 1 or C (full cluster collision), only the values larger than C are of interest, if available. In this regard, it is sufficient to only consider the last $v_{ACF}$ elements of $V_{sort}$, i. e. $V_{sort}$(end−$v_{ACF}$+1:end). As a criterion (specified autocorrelation characteristic), it may therefore be determined that the sum $SUM_{ACF}$ of these $v_{ACF}$ elements is not to exceed a threshold value of $S_{sum\_ACF\_threshold}=(v_{ACF}-1) \cdot C+N$, if possible. If not enough different hopping patterns are found for this, the value of $S_{sum\_ACF\_threshold}$ may be incrementally increased by 1 until a sufficient number of $P_{optimum}$ of hopping patterns is available. Particularly, if neighboring channel interferences are included into the calculation of the 2D-ACF by means of the matrix vector $m_{Met}$, the sum threshold value $S_{sum\_ACF\_threshold}$ may significantly increase.

If different sets of hopping patterns 142 are to be searched for, the first design step may be repeated with a new parameter set. For example, there may be the desire to generate several sets of hopping patterns with different oscillator deviations and optimize them together. Different oscillator deviations may cause different guard strips S, resulting in a change of the degree of freedom of the possible burst occupancy. In this respect, some parameters within the ACF calculation also change. Or a new hopping pattern set that enables multiple repetitions using a multi-stage time offset $T_W$ is to be generated. Here, the requirements change with respect to the time behavior. If a burst-wise alternating interleaved arrangement of the hopping patterns is intended, the shortest distance between two original bursts of a hopping pattern may be determined and specified, which then sets the time offset $T_W$. In this case, the time offset $T_W$ is to be selected to be significantly larger than the minimum time $T_{A\_min}$.

The first design step, i.e. finding $P^1_{optimum}$ candidates of a set of hopping patterns, is performed fully independently from finding $P^2_{optimum}$ candidates of a different pattern set. In this respect, all parameter specifications in the patterns (cluster, frequency pattern, time intervals, etc.) and the design parameters ($N_{threshold}$, $V_{sort}$, number of lines and columns of the 2D-ACF $\Theta_{x,x}$, etc.) may be arbitrarily changed. A combination of all design candidates is only performed in the second design step, i.e. the calculation of the cross-correlation.

Figure 11A:
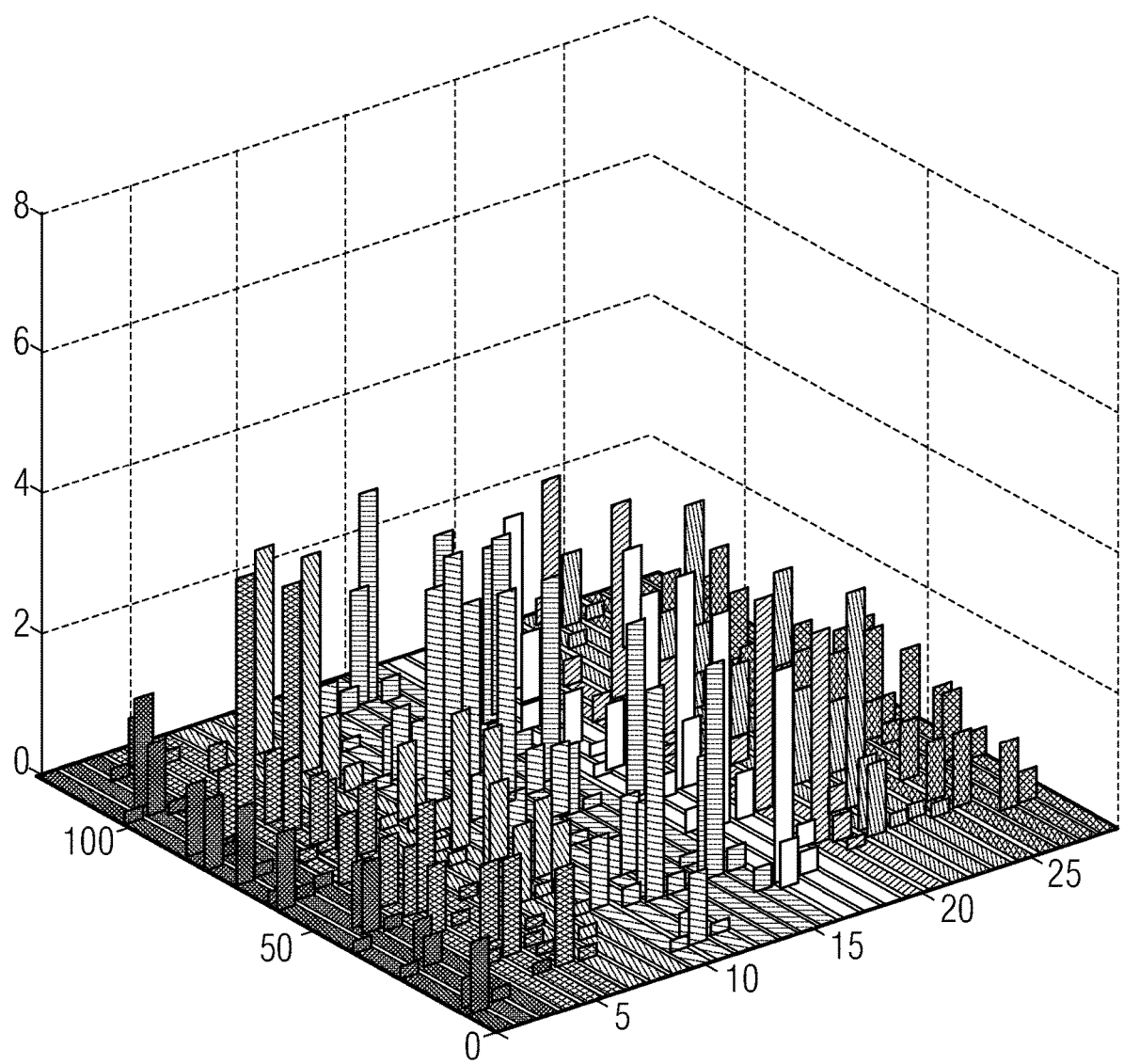
FIG. 11*a* shows in a diagram primary and secondary maximums of a cross-correlation function of two hopping patterns that comprises preset cross-correlation characteristics, plotted across frequency and time.
Figure 11B:
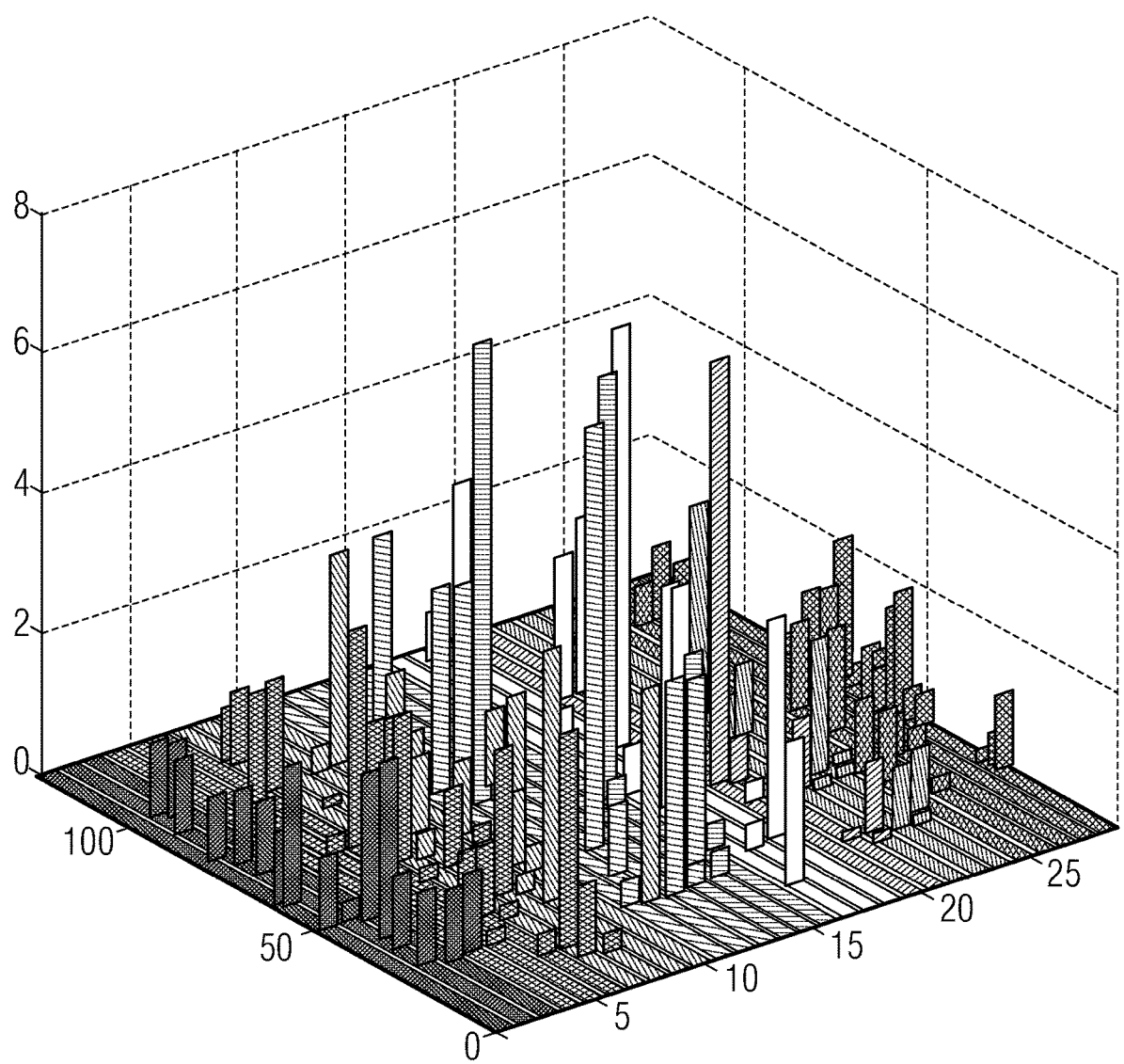
FIG. 11*b* shows in a diagram primary and secondary maximums of a cross-correlation function of two hopping patterns that dies not comprise preset cross-correlation characteristics, applied across frequency and time.

If a given number $P_{selection}$ of different hopping patterns is searched for, each individual hopping pattern pair should be as orthogonal to each other as possible, and the individual 2D cross-correlation matrices (2D-CCF)

$$\Theta_{x,y}(f, t) = \sum_{l=0}^{L-1} \sum_{m=0}^{M-1} x_{l,m} \cdot y_{l+f,m+t}$$

of the two hopping patterns with the matrices X and Y should comprise the lowest possible maximum values since high maximum values potentially correspond to a large number of colliding bursts in a single frame in the radio transmission. The time index of the $\Theta_{x,y}$ continues in an unvaried manner in steps of $T_{frame}/T_A$ from $-T_{frame}$ to $T_{frame}$. The CCF frequency index f, on the other hand, extends in general from $-(S_x+S_y)$ to $+(S_x+S_y)$ since the two considered hopping patterns may comprise different deviations in their frequency error behavior (oscillator frequency deviations). FIGS. 11a and 11b again show two 2D-CCF examples, a favorable case (FIG. 11a) and an unfavorable case (FIG. 11b).

In a second design step, starting from the $P_{optimum}$ previously selected hopping pattern candidates with their associated 2D autocorrelation sequences $\Theta_{x,x}$, all $(P_{optimum}-1) \times (P_{optimum})$ possible, generally different cross-correlation sequences $\Theta_{x,y}$ may be calculated. In each 2D-CCF, the values of $\Theta_{x,y}$ may subsequently be again sorted in ascending order (analogously to the process in 2D-ACF), the sum of the last $v_{CCF}$ elements may be calculated, i.e. $SUM_{CCF}=sum(V_{sort}(end-v_{CCF}+1:end))$ and be stored in a quadratic $(P_{optimum} \times P_{optimum})$ matrix $O_{vCCF}$.

If the 2D-autocorrelation sequences $\Theta_{x,x}$ of different sets of hopping patterns were calculated in the first design step, the different candidate sets ($P^1_{optimum}$ and $P^2_{optimum}$) are processed in sequence, and a square matrix $O_{vCCF}$ of the dimension $((P^1_{optimum}+P^2_{optimum}) \times (P^1_{optimum}+P^2_{optimum}))$ having all cross-correlation sequences $\Theta_{x,y}$ of all possible combinations is created as a result.

In a third step, the $P_{selection}$ different hopping patterns 142 that comprise the most favorable 2D-CCF characteristics with respect to each other since they correlate with a comparably low maximum number of colliding bursts in a frame are to be searched for. For this, the characteristics of $((P_{selection}-1) \cdot P_{selection})/2$ different 2D-CCF may be evaluated based on the stored sums $SUM_{CCF}$ in the matrix $O_{vCCF}$. The $P_{selection}$ different hopping patterns whose total sum across the $((P_{selection}-1) \cdot P_{selection})/2$ different subtotals $SUM_{CCF}$ from $O_{vCCF}$ is a minimum result in the optimum $P_{selection}$ hopping patterns. Since, in the context of an extensive Monte Carlo simulation, $P_{selection} \ll P_{optimum}$ is the aim, according to the binomial coefficient "$P_{optimum}$ over $P_{selection}$", there are different combination possibilities, an extent that usually does not have to be fully processed. In this respect, $P_{selection}$ hopping patterns may be newly and randomly selected from the $P_{optimum}$ present hopping patterns (Matlab commands: F=randperm(1:$P_{optimum}$) and Pattern$_{selection}$=F(1:$P_{selection}$)) and the total sum TS may be calculated from the different subtotals $SUM_{CCF}$. With a correspondingly large sample size, there is a local minimum of the total sum, which then delivers the desired set of $P_{selection}$ hopping patterns.

If the 2D-autocorrelation sequences $\Theta_{x,x}$ of different sets of hopping patterns were calculated in the first design step, a random, permutable selection of $P^1_{selection}$ from the $P^1_{optimum}$ present hopping patterns of set 1, as well as a random, permuted selection of $P^2_{selection}$ from the $P^2_{optimum}$ present hopping patterns of set 2. Through this hopping pattern set [$P^1_{selection}$, $P^2_{selection}$], the total TS is calculated from the different subtotals $SUM_{CCF}$ and the set with the local minimum is subsequently selected.

Figure 12:
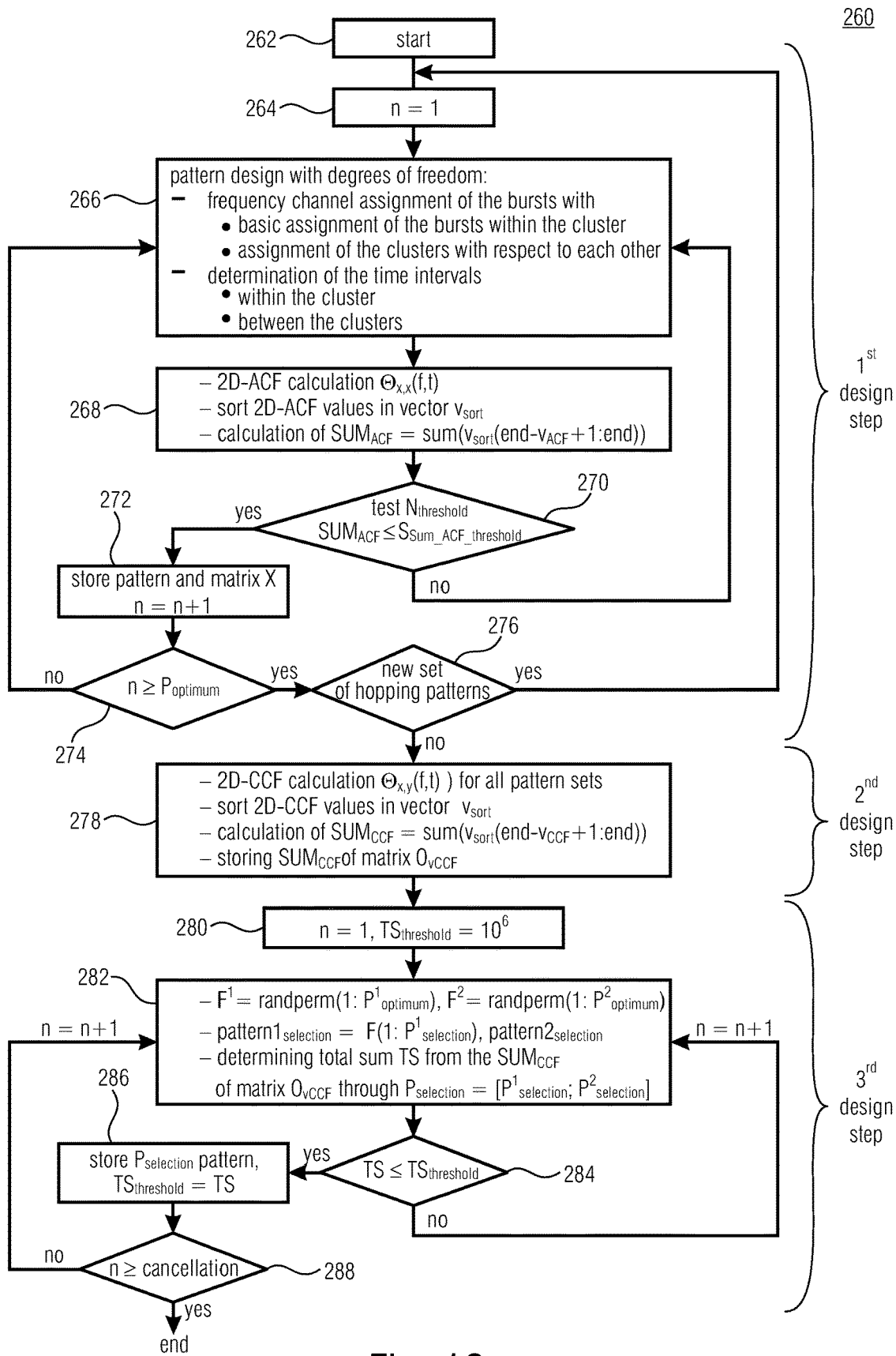
FIG. 12 shows a flow diagram of a method 260 for generating hopping patterns according to an embodiment.

The full design process and the degrees of freedom when determining the hopping patterns are again illustrated in FIG. 12. The possibility to optimize several sets of hopping patterns at the same time is considered, but only indicated.

In detail, FIG. 12 shows a flow diagram of a method 260 for generating hopping patterns according to an embodiment.

In a first step 262, the method 260 is started.

In a second step 264, n is set to be equal one, wherein n is a running variable.

In a third step 266, a hopping pattern may be randomly generated. Here, the above-mentioned degrees of freedom with respect to the frequency channel occupancy may be considered, e.g. a frequency channel assignment of the bursts with a base assignment of the bursts within the cluster and an assignment of the clusters with respect to each another. Furthermore, the above-mentioned degrees of freedom with respect to the time intervals may be considered, e.g. a determination of the time intervals within the cluster and between the clusters.

In a fourth step 268, the autocorrelation function of the randomly generated hopping pattern may be calculated. For example, a 2D-ACF calculation $\Theta_{x,x}(f,t)$ may be carried out. Furthermore, the 2D-ACF values may be sorted in a vector $v_{sort}$. Furthermore, a subtotal may be formed across a specified number of largest amplitude values of the autocorrelation function, $SUM_{ACF}=sum(v_{sort}(end-v_{ACF}+1:end))$.

In a fifth step 270, it may be determined whether the randomly generated hopping pattern comprises the specified autocorrelation characteristics. For example, it may be determined whether the ACF side maximums of the hopping pattern do not exceed a specified minimum amplitude threshold value $N_{threshold} \geq C$ (C is the cluster size), in detail, it may be determined whether the sum $SUM_{ACF}$ of these $v_{ACF}$ elements (subtotal) does not exceed the sum threshold value of $S_{sum\_ACF\_threshold}$ of, e.g., $(v_{ACF}-1) \cdot C+N$.

If the hopping pattern does not comprise the specified autocorrelation characteristics, the third step is repeated. If the hopping pattern comprises the specified autocorrelation characteristics, the method is continued.

In a sixth step 272, the hopping pattern (with the specified autocorrelation characteristics) and the matrix X may be stored. Furthermore, the index n may be increased by one, n=n+1.

In a seventh step 274, it may be checked whether an optimum number $P_{optimum}$ of hopping patterns is available.

If no optimum number $P_{optimum}$ of hopping patterns is available, the third step 266 is repeated. If an optimum number $P_{optimum}$ of hopping patterns is available, the method is continued. In an eighth step 276, it is determined whether a new set of hopping patterns is to be generated. If this is the case, the second step 264 is repeated. If this is not the case, the method is continued. Furthermore, it may be determined whether a further set of hopping patterns is to be optionally generated for another parameter set, e.g. another oscillator offset or another cluster design having varied time intervals or frequency hops.

In a ninth step 278, the cross-correlation functions between the hopping patterns with specified autocorrelation characteristics are calculated. For example, a 2D-CCF calculation $\Theta_{x,y}(f,t)$ for all hopping pattern sets may be carried out, the 2D-CCF values may be stored in a vector $v_{sort}$, the subtotals $SUM_{CCF}=sum(v_{sort}(end-v_{CCF}+1:end))$ may be calculated, and the subtotals $SUM_{CCF}$ may be stored in a matrix $O_{vCCF}$.

In a tenth step 280, n may be set to be equal one and $TS_{threshold}$ may be set to a large threshold, e. g. $10^6$.

In an eleventh step 282, $P^1_{selection}$ hopping patterns are newly and randomly selected from the $P^1_{optimum}$ present first hopping patterns, and $P^2_{selection}$ hopping patterns are newly and randomly selected from the $P^2_{optimum}$ present second hopping patterns. For this, $P^1_{optimum}$ different numbers are randomly selected in a random sequence, $F^1$=randperm(1:

$P^1_{optimum}$), by throwing a dice and $P^2_{optimum}$ different numbers are randomly selected in a random sequence, $F^2$=randperm(1: $P^2_{optimum}$), by throwing a dice. From this, the first $P^1_{selection}$ may e selected, pattern Pattern1$_{selection}$=F (1: $P^1_{Selection}$), and the first $P^2_{selection}$ may be selected, Pattern2$_{selection}$=F(1: $P^2_{selection}$). Based on Pattern1$_{selection}$ and Pattern2$_{selection}$, the total TS may be calculated from the individual subtotals SUM$_{CCF}$ that are in the matrix O$_{vCCF}$, via $P_{selection}$=[$P^1_{selection}$; $P^2_{selection}$].

In a twelfth step 282, it may be determined whether TS≤TS$_{threshold}$. If TS≤TS$_{threshold}$ is not satisfied, n is increased by one, n=n+1, and the eleventh step 282 is repeated. If TS≤TS$_{threshold}$, the threshold TS$_{threshold}$ is overwritten with TS, and the method is continued.

In a thirteenth step 286 the selected hopping pattern may be stored.

In a fourteenth step 288, it may be determined whether n≥cancellation. If n≥cancellation is not satisfied, n is increased by one, n=n+1, and the eleventh step 282 is repeated. If n≥cancellation is satisfied, the method is completed.

In the following, hopping patterns that will be generated with the above mentioned method are exemplarily described.

3.2 Hopping Patterns for a Single Transmission of Data

In embodiments, a time hopping pattern, a frequency hopping pattern or a combination of a time hopping pattern and the frequency hopping pattern may be used for the single transfer of data by means of a hopping pattern.

The time hopping pattern may be one of the following eight time hopping patterns having 24 hops each:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 330 | 387 | 388 | 330 | 387 | 354 | 330 | 387 | 356 | 330 | 387 | 432 | 330 | 387 | 352 | 330 | 387 | 467 | 330 | 387 | 620 | 330 | 387 |
| 2 | 330 | 387 | 435 | 330 | 387 | 409 | 330 | 387 | 398 | 330 | 387 | 370 | 330 | 387 | 361 | 330 | 387 | 472 | 330 | 387 | 522 | 330 | 387 |
| 3 | 330 | 387 | 356 | 330 | 387 | 439 | 330 | 387 | 413 | 330 | 387 | 352 | 330 | 387 | 485 | 330 | 387 | 397 | 330 | 387 | 444 | 330 | 387 |
| 4 | 330 | 387 | 352 | 330 | 387 | 382 | 330 | 387 | 381 | 330 | 387 | 365 | 330 | 387 | 595 | 330 | 387 | 604 | 330 | 387 | 352 | 330 | 387 |
| 5 | 330 | 387 | 380 | 330 | 387 | 634 | 330 | 387 | 360 | 330 | 387 | 393 | 330 | 387 | 352 | 330 | 387 | 373 | 330 | 387 | 490 | 330 | 387 |
| 6 | 330 | 387 | 364 | 330 | 387 | 375 | 330 | 387 | 474 | 330 | 387 | 355 | 330 | 387 | 478 | 330 | 387 | 464 | 330 | 387 | 513 | 330 | 387 |
| 7 | 330 | 387 | 472 | 330 | 387 | 546 | 330 | 387 | 501 | 330 | 387 | 356 | 330 | 387 | 359 | 330 | 387 | 359 | 330 | 387 | 364 | 330 | 387 |
| 8 | 330 | 387 | 391 | 330 | 387 | 468 | 330 | 387 | 512 | 330 | 387 | 543 | 330 | 387 | 354 | 330 | 387 | 391 | 330 | 387 | 368 | 330 | 387 |

In the table, each line is a time hopping pattern, wherein each column in the table is a hop of the respective time hopping pattern starting from a second hop so that each time hopping pattern comprises 24 hops, wherein each cell in the table indicates a time interval of a reference point of the respective hop to a same reference point of an immediately subsequent hop in—advantageously multitudes of—symbol durations.

The frequency hopping pattern may be one of the following eight frequency hopping patterns having 24 hops each:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 5 | 21 | 13 | 6 | 22 | 14 | 1 | 17 | 9 | 0 | 16 | 8 | 7 | 23 | 15 | 4 | 20 | 12 | 3 | 19 | 11 | 2 | 18 | 10 |
| 2 | 4 | 20 | 12 | 1 | 17 | 9 | 0 | 16 | 8 | 6 | 22 | 14 | 7 | 23 | 15 | 2 | 18 | 10 | 5 | 21 | 13 | 3 | 19 | 11 |
| 3 | 4 | 20 | 12 | 3 | 19 | 11 | 6 | 22 | 14 | 7 | 23 | 15 | 0 | 16 | 8 | 5 | 21 | 13 | 2 | 18 | 10 | 1 | 17 | 9 |
| 4 | 6 | 22 | 14 | 2 | 18 | 10 | 7 | 23 | 15 | 0 | 16 | 8 | 1 | 17 | 9 | 4 | 20 | 12 | 5 | 21 | 13 | 3 | 19 | 11 |
| 5 | 7 | 23 | 15 | 4 | 20 | 12 | 3 | 19 | 11 | 2 | 18 | 10 | 6 | 22 | 14 | 0 | 16 | 8 | 1 | 17 | 9 | 5 | 21 | 13 |
| 6 | 3 | 19 | 11 | 6 | 22 | 14 | 2 | 18 | 10 | 0 | 16 | 8 | 7 | 23 | 15 | 1 | 17 | 9 | 4 | 20 | 12 | 5 | 21 | 13 |
| 7 | 3 | 19 | 11 | 1 | 17 | 9 | 5 | 21 | 13 | 7 | 23 | 15 | 0 | 16 | 8 | 2 | 18 | 10 | 6 | 22 | 14 | 4 | 20 | 12 |
| 8 | 0 | 16 | 8 | 6 | 22 | 14 | 3 | 19 | 11 | 2 | 18 | 10 | 4 | 20 | 12 | 7 | 23 | 15 | 5 | 21 | 13 | 1 | 17 | 9 |

Each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_23.

In a combination of the hopping pattern from a time hopping pattern and a frequency hopping pattern, the respective time hopping pattern and the respective frequency hopping pattern may have the same line number in the respective table.

3.3 Hopping Patterns for a Repeated Transmission of Data

In embodiments, for the repeated transfer of data by means of two hopping patterns (e.g. a first hopping pattern and a second hopping pattern), a time hopping pattern, a frequency hopping pattern or a combination of the time hopping pattern and the frequency hopping pattern, respectively, may be used.

The time hopping pattern may be one of the following eight time hopping patterns having 24 hops each:

| | # of sub-data packets in the core frame SC | | | | | | | | | | | | | | | | | | | | | | |
|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 373 | 319 | 545 | 373 | 319 | 443 | 373 | 319 | 349 | 373 | 319 | 454 | 373 | 319 | 578 | 373 | 319 | 436 | 373 | 319 | 398 | 373 | 319 |
| 2 | 373 | 319 | 371 | 373 | 319 | 410 | 373 | 319 | 363 | 373 | 319 | 354 | 373 | 319 | 379 | 373 | 319 | 657 | 373 | 319 | 376 | 373 | 319 |
| 3 | 373 | 319 | 414 | 373 | 319 | 502 | 373 | 319 | 433 | 373 | 319 | 540 | 373 | 319 | 428 | 373 | 319 | 467 | 373 | 319 | 409 | 373 | 319 |
| 4 | 373 | 319 | 396 | 373 | 319 | 516 | 373 | 319 | 631 | 373 | 319 | 471 | 373 | 319 | 457 | 373 | 319 | 416 | 373 | 319 | 354 | 373 | 319 |
| 5 | 373 | 319 | 655 | 373 | 319 | 416 | 373 | 319 | 367 | 373 | 319 | 400 | 373 | 319 | 415 | 373 | 319 | 342 | 373 | 319 | 560 | 373 | 319 |
| 6 | 373 | 319 | 370 | 373 | 319 | 451 | 373 | 319 | 465 | 373 | 319 | 593 | 373 | 319 | 545 | 373 | 319 | 380 | 373 | 319 | 365 | 373 | 319 |
| 7 | 373 | 319 | 393 | 373 | 319 | 374 | 373 | 319 | 344 | 373 | 319 | 353 | 373 | 319 | 620 | 373 | 319 | 503 | 373 | 319 | 546 | 373 | 319 |
| 8 | 373 | 319 | 367 | 373 | 319 | 346 | 373 | 319 | 584 | 373 | 319 | 579 | 373 | 319 | 519 | 373 | 319 | 351 | 373 | 319 | 486 | 373 | 319 |

Each line in the table is a time hopping pattern, wherein each column in the table is a hop of the respective time hopping pattern starting from a second hop so that each time hopping pattern comprises 24 hops, wherein each cell in the table indicates a time interval of a reference point of the respective hop to a same reference point of an immediately subsequent hop in—advantageously multiples of—symbol durations.

The frequency hopping pattern may be one of the following eight frequency hopping patterns having 24 hops each:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 4 | 20 | 12 | 0 | 16 | 8 | 3 | 19 | 11 | 5 | 21 | 13 | 1 | 17 | 9 | 7 | 23 | 15 | 2 | 18 | 10 | 6 | 22 | 14 |
| 2 | 3 | 19 | 11 | 7 | 23 | 15 | 2 | 18 | 10 | 5 | 21 | 13 | 4 | 20 | 12 | 0 | 16 | 8 | 1 | 17 | 9 | 6 | 22 | 14 |
| 3 | 6 | 22 | 14 | 0 | 16 | 8 | 1 | 17 | 9 | 4 | 20 | 12 | 3 | 19 | 11 | 5 | 21 | 13 | 2 | 18 | 10 | 7 | 23 | 15 |
| 4 | 3 | 19 | 11 | 1 | 17 | 9 | 4 | 20 | 12 | 5 | 21 | 13 | 2 | 18 | 10 | 7 | 23 | 15 | 6 | 22 | 14 | 0 | 16 | 8 |
| 5 | 5 | 21 | 13 | 2 | 18 | 10 | 0 | 16 | 8 | 6 | 22 | 14 | 7 | 23 | 15 | 1 | 17 | 9 | 4 | 20 | 12 | 3 | 19 | 11 |
| 6 | 1 | 17 | 9 | 3 | 19 | 11 | 4 | 20 | 12 | 6 | 22 | 14 | 7 | 23 | 15 | 5 | 21 | 13 | 2 | 18 | 10 | 0 | 16 | 8 |
| 7 | 5 | 21 | 13 | 1 | 17 | 9 | 2 | 18 | 10 | 4 | 20 | 12 | 3 | 19 | 11 | 0 | 16 | 8 | 6 | 22 | 14 | 7 | 23 | 15 |
| 8 | 3 | 19 | 11 | 6 | 22 | 14 | 5 | 21 | 13 | 1 | 17 | 9 | 7 | 23 | 15 | 2 | 18 | 10 | 0 | 16 | 8 | 4 | 20 | 12 |

Each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_23.

In a combination of the hopping pattern from a time hopping pattern and a frequency hopping pattern, the respective time hopping pattern and the respective frequency hopping pattern may have the same line number in the respective table.

In embodiments, a data packet may be transmitted divided into a plurality of sub-data packets according to the hopping patterns so that a sub-data packet of the plurality of sub-data packets is transmitted in each hop of the hopping pattern.

4. Further Embodiments

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

For example, the apparatuses described herein may be implemented using a hardware device, or using a computer, or using a combination of a hardware device and a computer.

The apparatuses described herein, or any components of the apparatuses described herein, may at least be partially implement in hardware and/or software (computer program).

For example, the methods described herein may be implemented using a hardware device, or using a computer, or using a combination of a hardware device and a computer.

The methods described herein, or any components of the methods described herein, may at least be partially implement by performed and/or software (computer program).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF ABBREVIATIONS $B_C$ frequency carrier distance, corresponds to the distance between two neighboring frequency channels
BS base station
C number of bursts forming a cluster
Frame data packet consisting of N bursts
L number of frequency bands available
MRC maximum ratio combining
N number of bursts a frame consists of
$N_{threshold}$ amplitude threshold value in generation of ACF candidates
$P_{selection}$ number of hopping patterns optimizing as to 2D-ACF and CCF characteristics
S number of frequency bands which, due to oscillator frequency errors, as guard strips, must not contain any bursts
$S_R$ symbol rate used
$T_0$ start time of a frame
$T_A$ sample rate of the time axis
$T_{burst}$ duration of a bursts
$T_{frame}$ duration of a frame
TSMA Telegram Splitting Multiple Access
TSMA pattern hopping pattern of a frame in time and frequency ranges
X matrix including time and frequency information of hopping patterns
$\Theta_{x,x}$ 2D autocorrelation function (2D-ACF)
$\Theta_{x,y}$ 2D cross-correlation function (2D-CCF)

The invention claimed is:

1. A data transmitter configured to, in a first mode, transmit data repeatedly using a first hopping pattern and a second hopping pattern;
wherein the data transmitter is configured to, in a second mode, transmit data once using a third hopping pattern;
wherein the hopping patterns of the first mode and the second mode are different so that hops of the hopping patterns of the first mode and hops of the hopping pattern of the second mode are differently distributed in at least one of time and frequency;
wherein the data transmitter is configured to select the first hopping pattern and the second hopping pattern from a first set of hopping patterns, and to select the third hopping pattern from a second set of hopping patterns;
wherein hopping patterns of the first set of hopping patterns and hopping patterns of the second set of hopping patterns are different.

2. The data transmitter according to claim 1, wherein the data transmitter is configured to, in order to establish a connection to a data receiver, select at least one of the first hopping pattern, the second hopping pattern and the third hopping pattern from a third set of hopping patterns.

3. The data transmitter according to claim 1, wherein the first hopping pattern and the second hopping pattern are shifted relative to each other in at least one of frequency and/or time, and wherein the first hopping pattern and the second hopping pattern are at least partially interleaved.

4. The data transmitter according to claim 1, wherein the first hopping pattern and the second hopping pattern are different.

5. The data transmitter according to claim 1, wherein the second hopping pattern is at least one of a frequency-shifted and time-shifted version of the first hopping pattern.

6. The data transmitter according to claim 5, wherein the first hopping pattern and the second hopping pattern are the same and are only shifted in at least one of time and frequency.

7. The data transmitter according to claim 1, wherein the data transmitter is configured to transmit the first hopping pattern and the second hopping pattern in different frequency bands.

8. The data transmitter according to claim 7, wherein the data transmitter is configured to transmit the first hopping pattern or the second hopping pattern randomly in one of at least two different frequency bands.

9. The data transmitter according to claim 1, wherein the data transmitter is configured to transmit the first hopping pattern and the second hopping pattern in at least partially overlapping frequency bands.

10. The data transmitter according to claim 1, wherein the data transmitter is configured to determine a time offset between the first hopping pattern and the second hopping pattern in dependence on an operation parameter of the data transmitter.

11. The data transmitter according to claim 1, wherein the data transmitter is configured to determine a frequency offset between the first hopping pattern and the second hopping pattern in dependence on an operation parameter of the data transmitter.

12. The data transmitter according to claim 10, wherein the operation parameter of the data transmitter is an intrinsic parameter of the data transmitter itself.

13. The data transmitter according to claim 12, wherein the intrinsic parameter of the data transmitter is addressing information, identification information, a quartz tolerance, a frequency offset or available transmission energy.

14. The data transmitter according to claim 10, wherein the operation parameter of the data transmitter is a parameter assigned to the data transmitter.

15. The data transmitter according to claim 14, wherein the parameter assigned to the data transmitter is an assigned frequency offset, an assigned time offset, a radio cell, a geographical position, a system time or a priority of the data transmitter or of the data.

16. The data transmitter according to claim 10, wherein the operation parameter of the data transmitter is at least a part of payload data or error protection data.

17. The data transmitter according to claim 10, wherein the operation parameter of the data transmitter is a random frequency offset or a random time offset.

18. The data transmitter according to claim 1, wherein the first hopping pattern and the second hopping pattern are a frequency hopping pattern, a time hopping pattern or a combination of a frequency hopping pattern and a time hopping pattern, respectively.

19. The data transmitter according to claim 1, wherein the data is a data packet, wherein the data transmitter is configured to divide the data packet into a plurality of sub-data packets, wherein each of the sub-data packets is shorter than the data packet;
wherein the data transmitter is configured to transmit the plurality of sub-data packets distributed in at least one of frequency and/or time according to the first hopping pattern, and to repeatedly transmit the same distributed in at least one of frequency and time according to the second hopping pattern.

20. The data transmitter according to claim 1, wherein
the first hopping pattern and the second hopping pattern each,
or the third hopping pattern,
is a time hopping pattern, a frequency hopping pattern or a combination of the time hopping pattern and the frequency hopping pattern;
wherein the time hopping pattern is one of the following eight time hopping patterns comprising 24 hops each:

| # of sub-data packets in the core frame SC | | | | | | | | | | | | | | | | | | | | | | | |
|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 373 | 319 | 545 | 373 | 319 | 443 | 373 | 319 | 349 | 373 | 319 | 454 | 373 | 319 | 578 | 373 | 319 | 436 | 373 | 319 | 398 | 373 | 319 |
| 2 | 373 | 319 | 371 | 373 | 319 | 410 | 373 | 319 | 363 | 373 | 319 | 354 | 373 | 319 | 379 | 373 | 319 | 657 | 373 | 319 | 376 | 373 | 319 |
| 3 | 373 | 319 | 414 | 373 | 319 | 502 | 373 | 319 | 433 | 373 | 319 | 540 | 373 | 319 | 428 | 373 | 319 | 467 | 373 | 319 | 409 | 373 | 319 |
| 4 | 373 | 319 | 396 | 373 | 319 | 516 | 373 | 319 | 631 | 373 | 319 | 471 | 373 | 319 | 457 | 373 | 319 | 416 | 373 | 319 | 354 | 373 | 319 |
| 5 | 373 | 319 | 655 | 373 | 319 | 416 | 373 | 319 | 367 | 373 | 319 | 400 | 373 | 319 | 415 | 373 | 319 | 342 | 373 | 319 | 560 | 373 | 319 |
| 6 | 373 | 319 | 370 | 373 | 319 | 451 | 373 | 319 | 465 | 373 | 319 | 593 | 373 | 319 | 545 | 373 | 319 | 380 | 373 | 319 | 365 | 373 | 319 |
| 7 | 373 | 319 | 393 | 373 | 319 | 374 | 373 | 319 | 344 | 373 | 319 | 353 | 373 | 319 | 620 | 373 | 319 | 503 | 373 | 319 | 546 | 373 | 319 |
| 8 | 373 | 319 | 367 | 373 | 319 | 346 | 373 | 319 | 584 | 373 | 319 | 579 | 373 | 319 | 519 | 373 | 319 | 351 | 373 | 319 | 486 | 373 | 319 | wherein each line in the table is a time hopping pattern, wherein each column in the table is a hop of the respective time hopping pattern starting from a second hop so that each time hopping pattern comprises 24 hops, wherein each cell in the table indicates a time interval of a reference point of the respective hop to a same reference point of an immediately subsequent hop in—multiples of—symbol durations;
wherein the frequency hopping pattern is one of the following eight frequency hopping patterns comprising 24 hops each:

| # of sub-data packets in the core frame SC | | | | | | | | | | | | | | | | | | | | | | | | |
|---|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 4 | 20 | 12 | 0 | 16 | 8 | 3 | 19 | 11 | 5 | 21 | 13 | 1 | 17 | 9 | 7 | 23 | 15 | 2 | 18 | 10 | 6 | 22 | 14 |
| 2 | 3 | 19 | 11 | 7 | 23 | 15 | 2 | 18 | 10 | 5 | 21 | 13 | 4 | 20 | 12 | 0 | 16 | 8 | 1 | 17 | 9 | 6 | 22 | 14 |
| 3 | 6 | 22 | 14 | 0 | 16 | 8 | 1 | 17 | 9 | 4 | 20 | 12 | 3 | 19 | 11 | 5 | 21 | 13 | 2 | 18 | 10 | 7 | 23 | 15 |
| 4 | 3 | 19 | 11 | 1 | 17 | 9 | 4 | 20 | 12 | 5 | 21 | 13 | 2 | 18 | 10 | 7 | 23 | 15 | 6 | 22 | 14 | 0 | 16 | 8 |
| 5 | 5 | 21 | 13 | 2 | 18 | 10 | 0 | 16 | 8 | 6 | 22 | 14 | 7 | 23 | 15 | 1 | 17 | 9 | 4 | 20 | 12 | 3 | 19 | 11 |
| 6 | 1 | 17 | 9 | 3 | 19 | 11 | 4 | 20 | 12 | 6 | 22 | 14 | 7 | 23 | 15 | 5 | 21 | 13 | 2 | 18 | 10 | 0 | 16 | 8 |
| 7 | 5 | 21 | 13 | 1 | 17 | 9 | 2 | 18 | 10 | 4 | 20 | 12 | 3 | 19 | 11 | 0 | 16 | 8 | 6 | 22 | 14 | 7 | 23 | 15 |
| 8 | 3 | 19 | 11 | 6 | 22 | 14 | 5 | 21 | 13 | 1 | 17 | 9 | 7 | 23 | 15 | 2 | 18 | 10 | 0 | 16 | 8 | 4 | 20 | 12 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_23.

21. The data transmitter according to claim 20, wherein, in a combination of the time hopping pattern and the frequency hopping pattern, the time hopping pattern and the frequency hopping pattern comprise the same line number in the respective table.

22. The data transmitter according to claim 1, wherein
the third hopping pattern,
or the first hopping pattern and the second hopping pattern each,
is a time hopping pattern, a frequency hopping pattern or a combination of the time hopping pattern and the frequency hopping pattern;
wherein the time hopping pattern is one of the following eight time hopping patterns comprising 24 hops each:

| | # of sub-data packets in the core frame SC | | | | | | | | | | | | | | | | | | | | | | |
|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 330 | 387 | 388 | 330 | 387 | 354 | 330 | 387 | 356 | 330 | 387 | 432 | 330 | 387 | 352 | 330 | 387 | 467 | 330 | 387 | 620 | 330 | 387 |
| 2 | 330 | 387 | 435 | 330 | 387 | 409 | 330 | 387 | 398 | 330 | 387 | 370 | 330 | 387 | 361 | 330 | 387 | 472 | 330 | 387 | 522 | 330 | 387 |
| 3 | 330 | 387 | 356 | 330 | 387 | 439 | 330 | 387 | 413 | 330 | 387 | 352 | 330 | 387 | 485 | 330 | 387 | 397 | 330 | 387 | 444 | 330 | 387 |
| 4 | 330 | 387 | 352 | 330 | 387 | 382 | 330 | 387 | 381 | 330 | 387 | 365 | 330 | 387 | 595 | 330 | 387 | 604 | 330 | 387 | 352 | 330 | 387 |
| 5 | 330 | 387 | 380 | 330 | 387 | 634 | 330 | 387 | 360 | 330 | 387 | 393 | 330 | 387 | 352 | 330 | 387 | 373 | 330 | 387 | 490 | 330 | 387 |
| 6 | 330 | 387 | 364 | 330 | 387 | 375 | 330 | 387 | 474 | 330 | 387 | 355 | 330 | 387 | 478 | 330 | 387 | 464 | 330 | 387 | 513 | 330 | 387 |
| 7 | 330 | 387 | 472 | 330 | 387 | 546 | 330 | 387 | 501 | 330 | 387 | 356 | 330 | 387 | 359 | 330 | 387 | 359 | 330 | 387 | 364 | 330 | 387 |
| 8 | 330 | 387 | 391 | 330 | 387 | 468 | 330 | 387 | 512 | 330 | 387 | 543 | 330 | 387 | 354 | 330 | 387 | 391 | 330 | 387 | 368 | 330 | 387 | wherein each line in the table is a time hopping pattern, wherein each column in the table is a hop of the respective time hopping pattern starting from a second hop so that each time hopping pattern comprises 24 hops, wherein each cell in the table indicates a time interval of a reference point of the respective hop to a same reference point of an immediately subsequent hop in multitudes of symbol durations;
wherein frequency hopping pattern is one of the following eight frequency hopping patterns comprising 24 hops each:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 5 | 21 | 13 | 6 | 22 | 14 | 1 | 17 | 9 | 0 | 16 | 8 | 7 | 23 | 15 | 4 | 20 | 12 | 3 | 19 | 11 | 2 | 18 | 10 |
| 2 | 4 | 20 | 12 | 1 | 17 | 9 | 0 | 16 | 8 | 6 | 22 | 14 | 7 | 23 | 15 | 2 | 18 | 10 | 5 | 21 | 13 | 3 | 19 | 11 |
| 3 | 4 | 20 | 12 | 3 | 19 | 11 | 6 | 22 | 14 | 7 | 23 | 15 | 0 | 16 | 8 | 5 | 21 | 13 | 2 | 18 | 10 | 1 | 17 | 9 |
| 4 | 6 | 22 | 14 | 2 | 18 | 10 | 7 | 23 | 15 | 0 | 16 | 8 | 1 | 17 | 9 | 4 | 20 | 12 | 5 | 21 | 13 | 3 | 19 | 11 |
| 5 | 7 | 23 | 15 | 4 | 20 | 12 | 3 | 19 | 11 | 2 | 18 | 10 | 6 | 22 | 14 | 0 | 16 | 8 | 1 | 17 | 9 | 5 | 21 | 13 |
| 6 | 3 | 19 | 11 | 6 | 22 | 14 | 2 | 18 | 10 | 0 | 16 | 8 | 7 | 23 | 15 | 1 | 17 | 9 | 4 | 20 | 12 | 5 | 21 | 13 |
| 7 | 3 | 19 | 11 | 1 | 17 | 9 | 5 | 21 | 13 | 7 | 23 | 15 | 0 | 16 | 8 | 2 | 18 | 10 | 6 | 22 | 14 | 4 | 20 | 12 |
| 8 | 0 | 16 | 8 | 6 | 22 | 14 | 3 | 19 | 11 | 2 | 18 | 10 | 4 | 20 | 12 | 7 | 23 | 15 | 5 | 21 | 13 | 1 | 17 | 9 | wherein each line in the table in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_23.

23. The data transmitter according to claim 22, wherein, in a combination of the time hopping pattern and the frequency hopping pattern, the time hopping pattern and the frequency hopping pattern comprise the same line number in the respective table.

24. A data receiver configured to, in a first mode, receive data repeatedly using a first hopping pattern and a second hopping pattern;
wherein the data receiver is configured to, in a second mode, receive data once using a third hopping pattern;
wherein the hopping patterns of the first mode and the second mode are different so that hops of the hopping patterns of the first mode and hops of the hopping pattern of the second mode are differently distributed in at least one of time and frequency;
wherein the data receiver is configured to select the first hopping pattern and the second hopping pattern from a first set of hopping patterns, and to select the third hopping pattern from a second set of hopping patterns;
wherein hopping patterns of the first set of hopping patterns and hopping patterns of the second set of hopping patterns are different.

25. The data receiver according to claim 24, wherein the first hopping pattern and the second hopping pattern are shifted from each other in frequency and/or time, and wherein the first hopping pattern and the second hopping pattern are at least partially interleaved.

26. The data receiver according to claim 24, wherein the first hopping pattern and the second hopping pattern are different.

27. The data receiver according to claim 24, wherein the second hopping pattern is at least one of a frequency-shifted and time-shifted version of the first hopping pattern.

28. The data receiver according to claim 27, wherein the first hopping pattern and the second hopping pattern are the same and are just shifted in at least one of time and frequency.

29. The data receiver according to claim 24, wherein the data receiver is configured to detect one of the first hopping pattern and the second hopping pattern in a reception data stream in order to receive the data transferred with the one hopping pattern;
wherein the data receiver is configured to determine the other one of the first hopping pattern and the second hopping pattern in the reception data stream using the previously detected hopping pattern in order to receive the data transferred with the other hopping pattern.

30. The data receiver according to claim 24, wherein the data receiver is configured to determine a time offset between the first hopping pattern and the second hopping pattern in dependence on an operation parameter of a data transmitter that transmits the data.

31. The data receiver according to claim 24, wherein the data receiver is configured to determine a frequency offset between the first hopping pattern and the second hopping pattern in dependence on an operation parameter of a data transmitter that transmits the data.

32. The data receiver according to claim 30, wherein the operation parameter of the data transmitter is known to the data receiver.

33. The data receiver according to claim 30, wherein the data receiver is configured to determine the operation parameter by means of a hypothesis test.

34. The data receiver according to claim 30, wherein the operation parameter of the data transmitter is an intrinsic parameter of the data transmitter itself.

35. The data receiver according to claim 34, wherein the intrinsic parameter of the data transmitter is addressing information, identification information, a quartz tolerance, a frequency offset or available transmission energy.

36. The data receiver according to claim 30, wherein the operation parameter of the data transmitter is a parameter assigned to the data transmitter.

37. The data receiver according to claim 36, wherein the parameter assigned to the data transmitter is an assigned frequency offset, an assigned time offset, a radio cell, a geographical position, a system time or a priority of the data transmitter or of the data.

38. The data receiver according to claim 30, wherein the operation parameter of the data transmitter is at least a part of payload data or error protection data.

39. The data receiver according to claim 30, wherein the operation parameter of the data transmitter is a random frequency offset or a random time offset.

40. The data receiver according to claim 24, wherein the data receiver is configured to receive the first hopping pattern and the second hopping pattern in different frequency bands.

41. The data receiver according to claim 24, wherein the data receiver is configured to detect a repeated transfer of data based on at least one of the first hopping pattern and/or the second hopping pattern; or
wherein the data receiver is configured to detect a single transfer of data based on the third hopping pattern.

42. The data receiver according to claim 24, wherein the first hopping pattern and the second hopping pattern are each a frequency hopping pattern, a time hopping pattern or a combination of a frequency hopping pattern and a time hopping pattern.

43. The data receiver according to claim 24, wherein
the first hopping pattern and the second hopping pattern each,
or the third hopping pattern
is a time hopping pattern, a frequency hopping pattern or a combination of the time hopping pattern and the frequency hopping pattern;
wherein the time hopping pattern is one of the following eight time hopping patterns comprising 24 hops each:

| # of sub-data packets in the core frame SC | | | | | | | | | | | | | | | | | | | | | | | |
|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 373 | 319 | 545 | 373 | 319 | 443 | 373 | 319 | 349 | 373 | 319 | 454 | 373 | 319 | 578 | 373 | 319 | 436 | 373 | 319 | 398 | 373 | 319 |
| 2 | 373 | 319 | 371 | 373 | 319 | 410 | 373 | 319 | 363 | 373 | 319 | 354 | 373 | 319 | 379 | 373 | 319 | 657 | 373 | 319 | 376 | 373 | 319 |
| 3 | 373 | 319 | 414 | 373 | 319 | 502 | 373 | 319 | 433 | 373 | 319 | 540 | 373 | 319 | 428 | 373 | 319 | 467 | 373 | 319 | 409 | 373 | 319 |
| 4 | 373 | 319 | 396 | 373 | 319 | 516 | 373 | 319 | 631 | 373 | 319 | 471 | 373 | 319 | 457 | 373 | 319 | 416 | 373 | 319 | 354 | 373 | 319 |
| 5 | 373 | 319 | 655 | 373 | 319 | 416 | 373 | 319 | 367 | 373 | 319 | 400 | 373 | 319 | 415 | 373 | 319 | 342 | 373 | 319 | 560 | 373 | 319 |
| 6 | 373 | 319 | 370 | 373 | 319 | 451 | 373 | 319 | 465 | 373 | 319 | 593 | 373 | 319 | 545 | 373 | 319 | 380 | 373 | 319 | 365 | 373 | 319 |
| 7 | 373 | 319 | 393 | 373 | 319 | 374 | 373 | 319 | 344 | 373 | 319 | 353 | 373 | 319 | 620 | 373 | 319 | 503 | 373 | 319 | 546 | 373 | 319 |
| 8 | 373 | 319 | 367 | 373 | 319 | 346 | 373 | 319 | 584 | 373 | 319 | 579 | 373 | 319 | 519 | 373 | 319 | 351 | 373 | 319 | 486 | 373 | 319 | wherein each line in the table is a time hopping pattern, wherein each column in the table is a hop of the respective time hopping pattern starting from a second hop so that each time hopping pattern comprises 24 hops, wherein each cell in the table indicates a time interval of a reference point of the respective hop to a same reference point of an immediately subsequent hop in—multiples of—symbol durations;
wherein the frequency hopping pattern is one of the following eight frequency hopping patterns comprising 24 hops each:

| # of sub-data packets in the core frame SC | | | | | | | | | | | | | | | | | | | | | | | | |
|---|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 4 | 20 | 12 | 0 | 16 | 8 | 3 | 19 | 11 | 5 | 21 | 13 | 1 | 17 | 9 | 7 | 23 | 15 | 2 | 18 | 10 | 6 | 22 | 14 |
| 2 | 3 | 19 | 11 | 7 | 23 | 15 | 2 | 18 | 10 | 5 | 21 | 13 | 4 | 20 | 12 | 0 | 16 | 8 | 1 | 17 | 9 | 6 | 22 | 14 |
| 3 | 6 | 22 | 14 | 0 | 16 | 8 | 1 | 17 | 9 | 4 | 20 | 12 | 3 | 19 | 11 | 5 | 21 | 13 | 2 | 18 | 10 | 7 | 23 | 15 |
| 4 | 3 | 19 | 11 | 1 | 17 | 9 | 4 | 20 | 12 | 5 | 21 | 13 | 2 | 18 | 10 | 7 | 23 | 15 | 6 | 22 | 14 | 0 | 16 | 8 |
| 5 | 5 | 21 | 13 | 2 | 18 | 10 | 0 | 16 | 8 | 6 | 22 | 14 | 7 | 23 | 15 | 1 | 17 | 9 | 4 | 20 | 12 | 3 | 19 | 11 |
| 6 | 1 | 17 | 9 | 3 | 19 | 11 | 4 | 20 | 12 | 6 | 22 | 14 | 7 | 23 | 15 | 5 | 21 | 13 | 2 | 18 | 10 | 0 | 16 | 8 |
| 7 | 5 | 21 | 13 | 1 | 17 | 9 | 2 | 18 | 10 | 4 | 20 | 12 | 3 | 19 | 11 | 0 | 16 | 8 | 6 | 22 | 14 | 7 | 23 | 15 |
| 8 | 3 | 19 | 11 | 6 | 22 | 14 | 5 | 21 | 13 | 1 | 17 | 9 | 7 | 23 | 15 | 2 | 18 | 10 | 0 | 16 | 8 | 4 | 20 | 12 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_23.

44. The data receiver according to claim 43, wherein, in a combination of the time hopping pattern and the frequency hopping pattern, the time hopping pattern and the frequency hopping pattern comprise the same line number in the respective table.

45. The data receiver according to claim 24, wherein
the third hopping pattern,
or the first hopping pattern and the second hopping pattern each,
is a time hopping pattern, a frequency hopping pattern or a combination of the time hopping pattern and the frequency hopping pattern;
wherein the time hopping pattern is one of the following eight time hopping patterns comprising 24 hops each:

| | # of sub-data packets in the core frame SC | | | | | | | | | | | | | | | | | | | | | | |
|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 330 | 387 | 388 | 330 | 387 | 354 | 330 | 387 | 356 | 330 | 387 | 432 | 330 | 387 | 352 | 330 | 387 | 467 | 330 | 387 | 620 | 330 | 387 |
| 2 | 330 | 387 | 435 | 330 | 387 | 409 | 330 | 387 | 398 | 330 | 387 | 370 | 330 | 387 | 361 | 330 | 387 | 472 | 330 | 387 | 522 | 330 | 387 |
| 3 | 330 | 387 | 356 | 330 | 387 | 439 | 330 | 387 | 413 | 330 | 387 | 352 | 330 | 387 | 485 | 330 | 387 | 397 | 330 | 387 | 444 | 330 | 387 |
| 4 | 330 | 387 | 352 | 330 | 387 | 382 | 330 | 387 | 381 | 330 | 387 | 365 | 330 | 387 | 595 | 330 | 387 | 604 | 330 | 387 | 352 | 330 | 387 |
| 5 | 330 | 387 | 380 | 330 | 387 | 634 | 330 | 387 | 360 | 330 | 387 | 393 | 330 | 387 | 352 | 330 | 387 | 373 | 330 | 387 | 490 | 330 | 387 |
| 6 | 330 | 387 | 364 | 330 | 387 | 375 | 330 | 387 | 474 | 330 | 387 | 355 | 330 | 387 | 478 | 330 | 387 | 464 | 330 | 387 | 513 | 330 | 387 |
| 7 | 330 | 387 | 472 | 330 | 387 | 546 | 330 | 387 | 501 | 330 | 387 | 356 | 330 | 387 | 359 | 330 | 387 | 359 | 330 | 387 | 364 | 330 | 387 |
| 8 | 330 | 387 | 391 | 330 | 387 | 468 | 330 | 387 | 512 | 330 | 387 | 543 | 330 | 387 | 354 | 330 | 387 | 391 | 330 | 387 | 368 | 330 | 387 | wherein each line in the table is a time hopping pattern, wherein each column in the table is a hop of the respective time hopping pattern starting from a second hop so that each time hopping pattern comprises 24 hops, wherein each cell in the table indicates a time interval of a reference point of the respective hop to a same reference point of an immediately subsequent hop in—multitudes of—symbol durations;
wherein frequency hopping pattern is one of the following eight frequency hopping patterns comprising 24 hops each:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 5 | 21 | 13 | 6 | 22 | 14 | 1 | 17 | 9 | 0 | 16 | 8 | 7 | 23 | 15 | 4 | 20 | 12 | 3 | 19 | 11 | 2 | 18 | 10 |
| 2 | 4 | 20 | 12 | 1 | 17 | 9 | 0 | 16 | 8 | 6 | 22 | 14 | 7 | 23 | 15 | 2 | 18 | 10 | 5 | 21 | 13 | 3 | 19 | 11 |
| 3 | 4 | 20 | 12 | 3 | 19 | 11 | 6 | 22 | 14 | 7 | 23 | 15 | 0 | 16 | 8 | 5 | 21 | 13 | 2 | 18 | 10 | 1 | 17 | 9 |
| 4 | 6 | 22 | 14 | 2 | 18 | 10 | 7 | 23 | 15 | 0 | 16 | 8 | 1 | 17 | 9 | 4 | 20 | 12 | 5 | 21 | 13 | 3 | 19 | 11 |
| 5 | 7 | 23 | 15 | 4 | 20 | 12 | 3 | 19 | 11 | 2 | 18 | 10 | 6 | 22 | 14 | 0 | 16 | 8 | 1 | 17 | 9 | 5 | 21 | 13 |
| 6 | 3 | 19 | 11 | 6 | 22 | 14 | 2 | 18 | 10 | 0 | 16 | 8 | 7 | 23 | 15 | 1 | 17 | 9 | 4 | 20 | 12 | 5 | 21 | 13 |
| 7 | 3 | 19 | 11 | 1 | 17 | 9 | 5 | 21 | 13 | 7 | 23 | 15 | 0 | 16 | 8 | 2 | 18 | 10 | 6 | 22 | 14 | 4 | 20 | 12 |
| 8 | 0 | 16 | 8 | 6 | 22 | 14 | 3 | 19 | 11 | 2 | 18 | 10 | 4 | 20 | 12 | 7 | 23 | 15 | 5 | 21 | 13 | 1 | 17 | 9 | wherein each line in the table in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_23.

46. The data receiver according to claim 45, wherein, in a combination of the time hopping pattern and the frequency hopping pattern, the time hopping pattern and the frequency hopping pattern comprise the same line number in the respective table.

47. A system, comprising:
a data transmitter configured to, in a first mode, transmit data repeatedly using a first hopping pattern and a second hopping pattern;
wherein the data transmitter is configured to, in a second mode, transmit data once using a third hopping pattern;
wherein the hopping patterns of the first mode and the second mode are different so that hops of the hopping patterns of the first mode and hops of the hopping pattern of the second mode are differently distributed in at least one of time and frequency;
wherein the data transmitter is configured to select the first hopping pattern and the second hopping pattern from a first set of hopping patterns, and to select the third hopping pattern from a second set of hopping patterns;
wherein hopping patterns of the first set of hopping patterns and hopping patterns of the second set of hopping patterns are different; and
a data receiver configured to, in a first mode, receive data repeatedly using a first hopping pattern and a second hopping pattern;
wherein the data receiver is configured to, in a second mode, receive data once using a third hopping pattern;
wherein the hopping patterns of the first mode and the second mode are different so that hops of the hopping patterns of the first mode and hops of the hopping pattern of the second mode are differently distributed in at least one of time and frequency;
wherein the data receiver is configured to select the first hopping pattern and the second hopping pattern from a first set of hopping patterns, and to select the third hopping pattern from a second set of hopping patterns;
wherein hopping patterns of the first set of hopping patterns and hopping patterns of the second set of hopping patterns are different.

48. A method for transmitting data, comprising:
transmitting, in a first mode, data repeatedly using a first hopping pattern and a second hopping pattern;
transmitting, in a second mode, data once using a third hopping pattern;
wherein the hopping patterns of the first mode and the second mode are different so that hops of the hopping patterns of the first mode and hops of the hopping pattern of the second mode are differently distributed in at least one of time and frequency, wherein the first hopping pattern and the second hopping pattern are selected from a first set of hopping patterns, and wherein the third hopping pattern is selected from a second set of hopping patterns, wherein hopping patterns of the first set of hopping patterns and hopping patterns of the second set of hopping patterns are different.

49. A method for receiving data, comprising:

receiving, in a first mode, data repeatedly using a first hopping pattern and a second hopping pattern;

receiving, in a second mode, data once using a third hopping pattern;

wherein the hopping patterns of the first mode and the second mode are different so that hops of the hopping patterns of the first mode and hops of the hopping pattern of the second mode are differently distributed in at least one of time and frequency, wherein the first hopping pattern and the second hopping pattern are selected from a first set of hopping patterns, and wherein the third hopping pattern is selected from a second set of hopping patterns, wherein hopping patterns of the first set of hopping patterns and hopping patterns of the second set of hopping patterns are different.

50. A non-transitory digital storage medium having a computer program stored thereon to perform the method for transmitting data, comprising:

transmitting, in a first mode, data repeatedly using a first hopping pattern and a second hopping pattern;

transmitting, in a second mode, data once using a third hopping pattern;

wherein the hopping patterns of the first mode and the second mode are different so that hops of the hopping patterns of the first mode and hops of the hopping pattern of the second mode are differently distributed in at least one of time and frequency, wherein the first hopping pattern and the second hopping pattern are selected from a first set of hopping patterns, and wherein the third hopping pattern is selected from a second set of hopping patterns, wherein hopping patterns of the first set of hopping patterns and hopping patterns of the second set of hopping patterns are different, when said computer program is run by a computer.

51. A non-transitory digital storage medium having a computer program stored thereon to perform the method for receiving data, comprising:

receiving, in a first mode, data repeatedly using a first hopping pattern and a second hopping pattern;

receiving, in a second mode, data once using a third hopping pattern;

wherein the hopping patterns of the first mode and the second mode are different so that hops of the hopping patterns of the first mode and hops of the hopping pattern of the second mode are differently distributed in at least one of time and frequency, wherein the first hopping pattern and the second hopping pattern are selected from a first set of hopping patterns, and wherein the third hopping pattern is selected from a second set of hopping patterns, wherein hopping patterns of the first set of hopping patterns and hopping patterns of the second set of hopping patterns are different, when said computer program is run by a computer.

52. Transmitting data using a first hopping pattern and a second hopping pattern;

wherein the data is transmitted using the first hopping pattern, and wherein the data is transmitted repeatedly using the second hopping pattern;

wherein the first hopping pattern and the second hopping pattern are a time hopping pattern, a frequency hopping pattern or a combination of the time hopping pattern and the frequency hopping pattern, respectively;

wherein the time hopping pattern is one of the following eight time hopping patterns comprising 24 hops each:

| | # of sub-data packets in the core frame SC | | | | | | | | | | | | | | | | | | | | | | |
|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 373 | 319 | 545 | 373 | 319 | 443 | 373 | 319 | 349 | 373 | 319 | 454 | 373 | 319 | 578 | 373 | 319 | 436 | 373 | 319 | 398 | 373 | 319 |
| 2 | 373 | 319 | 371 | 373 | 319 | 410 | 373 | 319 | 363 | 373 | 319 | 354 | 373 | 319 | 379 | 373 | 319 | 657 | 373 | 319 | 376 | 373 | 319 |
| 3 | 373 | 319 | 414 | 373 | 319 | 502 | 373 | 319 | 433 | 373 | 319 | 540 | 373 | 319 | 428 | 373 | 319 | 467 | 373 | 319 | 409 | 373 | 319 |
| 4 | 373 | 319 | 396 | 373 | 319 | 516 | 373 | 319 | 631 | 373 | 319 | 471 | 373 | 319 | 457 | 373 | 319 | 416 | 373 | 319 | 354 | 373 | 319 |
| 5 | 373 | 319 | 655 | 373 | 319 | 416 | 373 | 319 | 367 | 373 | 319 | 400 | 373 | 319 | 415 | 373 | 319 | 342 | 373 | 319 | 560 | 373 | 319 |
| 6 | 373 | 319 | 370 | 373 | 319 | 451 | 373 | 319 | 465 | 373 | 319 | 593 | 373 | 319 | 545 | 373 | 319 | 380 | 373 | 319 | 365 | 373 | 319 |
| 7 | 373 | 319 | 393 | 373 | 319 | 374 | 373 | 319 | 344 | 373 | 319 | 353 | 373 | 319 | 620 | 373 | 319 | 503 | 373 | 319 | 546 | 373 | 319 |
| 8 | 373 | 319 | 367 | 373 | 319 | 346 | 373 | 319 | 584 | 373 | 319 | 579 | 373 | 319 | 519 | 373 | 319 | 351 | 373 | 319 | 486 | 373 | 319 | wherein each line in the table is a time hopping pattern, wherein each column in the table is a hop of the respective time hopping pattern starting from a second hop so that each time hopping pattern comprises 24 hops, wherein each cell in the table indicates a time interval of a reference point of the respective hop to a same reference point of an immediately subsequent hop in—multiples of—symbol durations;

wherein the frequency hopping pattern is one of the following eight frequency hopping patterns comprising 24 hops each:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 4 | 20 | 12 | 0 | 16 | 8 | 3 | 19 | 11 | 5 | 21 | 13 | 1 | 17 | 9 | 7 | 23 | 15 | 2 | 18 | 10 | 6 | 22 | 14 |
| 2 | 3 | 19 | 11 | 7 | 23 | 15 | 2 | 18 | 10 | 5 | 21 | 13 | 4 | 20 | 12 | 0 | 16 | 8 | 1 | 17 | 9 | 6 | 22 | 14 |
| 3 | 6 | 22 | 14 | 0 | 16 | 8 | 1 | 17 | 9 | 4 | 20 | 12 | 3 | 19 | 11 | 5 | 21 | 13 | 2 | 18 | 10 | 7 | 23 | 15 |
| 4 | 3 | 19 | 11 | 1 | 17 | 9 | 4 | 20 | 12 | 5 | 21 | 13 | 2 | 18 | 10 | 7 | 23 | 15 | 6 | 22 | 14 | 0 | 16 | 8 |
| 5 | 5 | 21 | 13 | 2 | 18 | 10 | 0 | 16 | 8 | 6 | 22 | 14 | 7 | 23 | 15 | 1 | 17 | 9 | 4 | 20 | 12 | 3 | 19 | 11 |
| 6 | 1 | 17 | 9 | 3 | 19 | 11 | 4 | 20 | 12 | 6 | 22 | 14 | 7 | 23 | 15 | 5 | 21 | 13 | 2 | 18 | 10 | 0 | 16 | 8 |
| 7 | 5 | 21 | 13 | 1 | 17 | 9 | 2 | 18 | 10 | 4 | 20 | 12 | 3 | 19 | 11 | 0 | 16 | 8 | 6 | 22 | 14 | 7 | 23 | 15 |
| 8 | 3 | 19 | 11 | 6 | 22 | 14 | 5 | 21 | 13 | 1 | 17 | 9 | 7 | 23 | 15 | 2 | 18 | 10 | 0 | 16 | 8 | 4 | 20 | 12 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_23.

53. Transmitting according to claim 52, wherein the hopping pattern is a combination of the time hopping pattern and the frequency hopping pattern, wherein the time hopping pattern and the frequency hopping pattern comprise the same line number in the respective table.

54. Transmitting according to claim 52, wherein a data packet is transmitted divided into a plurality of sub-data packets according to the hopping patterns so that a sub-data packet of the plurality of sub-data packets is transmitted in each hop of the hopping pattern.

55. Receiving data using a first time hopping pattern and a second time hopping pattern;
wherein the data is received using the first hopping pattern, and wherein the data is received repeatedly using the second hopping pattern;
wherein the first hopping pattern and the second hopping pattern are a time hopping pattern, a frequency hopping pattern or a combination of the time hopping pattern and the frequency hopping pattern, respectively;
wherein the time hopping pattern is one of the following eight time hopping patterns comprising 24 hops each:

| | # of sub-data packets in the core frame SC | | | | | | | | | | | | | | | | | | | | | | |
|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 373 | 319 | 545 | 373 | 319 | 443 | 373 | 319 | 349 | 373 | 319 | 454 | 373 | 319 | 578 | 373 | 319 | 436 | 373 | 319 | 398 | 373 | 319 |
| 2 | 373 | 319 | 371 | 373 | 319 | 410 | 373 | 319 | 363 | 373 | 319 | 354 | 373 | 319 | 379 | 373 | 319 | 657 | 373 | 319 | 376 | 373 | 319 |
| 3 | 373 | 319 | 414 | 373 | 319 | 502 | 373 | 319 | 433 | 373 | 319 | 540 | 373 | 319 | 428 | 373 | 319 | 467 | 373 | 319 | 409 | 373 | 319 |
| 4 | 373 | 319 | 396 | 373 | 319 | 516 | 373 | 319 | 631 | 373 | 319 | 471 | 373 | 319 | 457 | 373 | 319 | 416 | 373 | 319 | 354 | 373 | 319 |
| 5 | 373 | 319 | 655 | 373 | 319 | 416 | 373 | 319 | 367 | 373 | 319 | 400 | 373 | 319 | 415 | 373 | 319 | 342 | 373 | 319 | 560 | 373 | 319 |
| 6 | 373 | 319 | 370 | 373 | 319 | 451 | 373 | 319 | 465 | 373 | 319 | 593 | 373 | 319 | 545 | 373 | 319 | 380 | 373 | 319 | 365 | 373 | 319 |
| 7 | 373 | 319 | 393 | 373 | 319 | 374 | 373 | 319 | 344 | 373 | 319 | 353 | 373 | 319 | 620 | 373 | 319 | 503 | 373 | 319 | 546 | 373 | 319 |
| 8 | 373 | 319 | 367 | 373 | 319 | 346 | 373 | 319 | 584 | 373 | 319 | 579 | 373 | 319 | 519 | 373 | 319 | 351 | 373 | 319 | 486 | 373 | 319 | wherein each line in the table is a time hopping pattern, wherein each column in the table is a hop of the respective time hopping pattern starting from a second hop so that each time hopping pattern comprises 24 hops, wherein each cell in the table indicates a time interval of a reference point of the respective hop to a same reference point of an immediately subsequent hop in—multiples of—symbol durations;
wherein the frequency hopping pattern is one of the following eight frequency hopping patterns comprising 24 hops each:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 4 | 20 | 12 | 0 | 16 | 8 | 3 | 19 | 11 | 5 | 21 | 13 | 1 | 17 | 9 | 7 | 23 | 15 | 2 | 18 | 10 | 6 | 22 | 14 |
| 2 | 3 | 19 | 11 | 7 | 23 | 15 | 2 | 18 | 10 | 5 | 21 | 13 | 4 | 20 | 12 | 0 | 16 | 8 | 1 | 17 | 9 | 6 | 22 | 14 |
| 3 | 6 | 22 | 14 | 0 | 16 | 8 | 1 | 17 | 9 | 4 | 20 | 12 | 3 | 19 | 11 | 5 | 21 | 13 | 2 | 18 | 10 | 7 | 23 | 15 |
| 4 | 3 | 19 | 11 | 1 | 17 | 9 | 4 | 20 | 12 | 5 | 21 | 13 | 2 | 18 | 10 | 7 | 23 | 15 | 6 | 22 | 14 | 0 | 16 | 8 |
| 5 | 5 | 21 | 13 | 2 | 18 | 10 | 0 | 16 | 8 | 6 | 22 | 14 | 7 | 23 | 15 | 1 | 17 | 9 | 4 | 20 | 12 | 3 | 19 | 11 |
| 6 | 1 | 17 | 9 | 3 | 19 | 11 | 4 | 20 | 12 | 6 | 22 | 14 | 7 | 23 | 15 | 5 | 21 | 13 | 2 | 18 | 10 | 0 | 16 | 8 |
| 7 | 5 | 21 | 13 | 1 | 17 | 9 | 2 | 18 | 10 | 4 | 20 | 12 | 3 | 19 | 11 | 0 | 16 | 8 | 6 | 22 | 14 | 7 | 23 | 15 |
| 8 | 3 | 19 | 11 | 6 | 22 | 14 | 5 | 21 | 13 | 1 | 17 | 9 | 7 | 23 | 15 | 2 | 18 | 10 | 0 | 16 | 8 | 4 | 20 | 12 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_C23.

56. Receiving according to claim 55, wherein the hopping pattern is a combination of the time hopping pattern and the frequency hopping pattern, wherein the time hopping pattern and the frequency hopping pattern comprise the same line number in the respective table.

57. Receiving according to claim 55, wherein a data packet is received divided into a plurality of sub-data packets according to the hopping patterns so that a sub-data packet of the plurality of sub-data packets is received in each hop of the hopping pattern.

58. A data receiver configured to, in a first mode, receive data repeatedly using a first hopping pattern and a second hopping pattern;
wherein the data receiver is configured to, in a second mode, receive data once using a third hopping pattern;
wherein the hopping patterns of the first mode and the second mode are different,
wherein the data receiver is configured to detect one of the first hopping pattern and of the second hopping pattern in a reception data stream in order to receive the data transferred with the one hopping pattern;
wherein the data receiver is configured to determine the other one of the first hopping pattern and the second hopping pattern in the reception data stream using the previously detected hopping pattern in order to receive the data transferred with the other hopping pattern.

59. A data receiver configured to, in a first mode, receive data repeatedly using a first hopping pattern and a second hopping pattern;
wherein the data receiver is configured to, in a second mode, receive data once using a third hopping pattern;
wherein the data receiver is configured to detect a repeated transfer of data based on at least one of the first hopping pattern and the second hopping pattern; or
wherein the data receiver is configured to detect a single transfer of data based on the third hopping pattern.

60. A data transmitter configured to, in a first mode, transmit data repeatedly using a first hopping pattern and a second hopping pattern;
wherein the data transmitter is configured to, in a second mode, transmit data once using a third hopping pattern;
wherein the hopping patterns of the first mode and the second mode are different so that hops of the hopping patterns of the first mode and hops of the hopping pattern of the second mode are differently distributed in at least one of time and frequency;
wherein the first hopping pattern and the second hopping pattern are shifted relative to each other in at least one of frequency and time, and wherein the first hopping pattern and the second hopping pattern are at least partially interleaved.

61. A data receiver configured to, in a first mode, receive data repeatedly using a first hopping pattern and a second hopping pattern;
wherein the data receiver is configured to, in a second mode, receive data once using a third hopping pattern;
wherein the hopping patterns of the first mode and the second mode are different so that hops of the hopping patterns of the first mode and hops of the hopping pattern of the second mode are differently distributed in at least one of time and in frequency;
wherein the first hopping pattern and the second hopping pattern are shifted relative to each other in at least one of frequency and/or time, and wherein the first hopping pattern and the second hopping pattern are at least partially interleaved.

* * * * *